(12) United States Patent
Anderson et al.

(10) Patent No.: US 9,782,746 B2
(45) Date of Patent: Oct. 10, 2017

(54) POLYMERIC IONIC LIQUIDS, METHODS OF MAKING AND METHODS OF USE THEREOF

(71) Applicant: The University of Toledo, Toledo, OH (US)

(72) Inventors: Jared L. Anderson, Toledo, OH (US); Fei Zhao, Foster City, CA (US); Yunjing Meng, Toledo, OH (US); Qichao Zhao, Toledo, OH (US)

(73) Assignee: The University of Toledo, Toledo, OH (US)

( * ) Notice: Subject to any disclaimer, the term of this patent is extended or adjusted under 35 U.S.C. 154(b) by 61 days.

(21) Appl. No.: 14/969,895

(22) Filed: Dec. 15, 2015

(65) Prior Publication Data

US 2016/0114309 A1    Apr. 28, 2016

Related U.S. Application Data

(62) Division of application No. 13/058,088, filed as application No. PCT/US2009/053319 on Aug. 10, 2009, now Pat. No. 9,249,261.

(60) Provisional application No. 61/087,411, filed on Aug. 8, 2008.

(51) Int. Cl.
| | | |
|---|---|---|
| *B01J 20/26* | (2006.01) | |
| *B01J 20/28* | (2006.01) | |
| *B01J 31/02* | (2006.01) | |
| *C08F 26/06* | (2006.01) | |
| *C08G 65/323* | (2006.01) | |
| *C08F 226/06* | (2006.01) | |

(52) U.S. Cl.
CPC ....... *B01J 20/261* (2013.01); *B01J 20/28023* (2013.01); *B01J 20/28033* (2013.01); *B01J 20/28042* (2013.01); *C08F 226/06* (2013.01); *C08G 65/323* (2013.01)

(58) Field of Classification Search
None
See application file for complete search history.

(56) References Cited

U.S. PATENT DOCUMENTS

| | | | | |
|---|---|---|---|---|
| 8,734,673 | B2 * | 5/2014 | Anderson | C08G 65/323 210/502.1 |
| 2006/0025598 | A1 * | 2/2006 | Armstrong | B01J 20/22 548/101 |
| 2015/0119231 | A1 * | 4/2015 | Anderson | B01J 20/267 502/5 |

FOREIGN PATENT DOCUMENTS

WO  WO2006/038013  *  4/2006 ............. B01J 31/02

OTHER PUBLICATIONS

Tang et al., "Poly(ionic liquid)s: a new material with enhanced and fast CO2 absorption." Chem. Commun., 2005, 3325-3327.*

* cited by examiner

*Primary Examiner* — Daniel Berns
(74) *Attorney, Agent, or Firm* — MacMillan, Sobanski & Todd, LLC

(57) ABSTRACT

Polymeric ionic liquids, methods of making and methods of using the same are disclosed.

13 Claims, 37 Drawing Sheets

TIME (MIN)

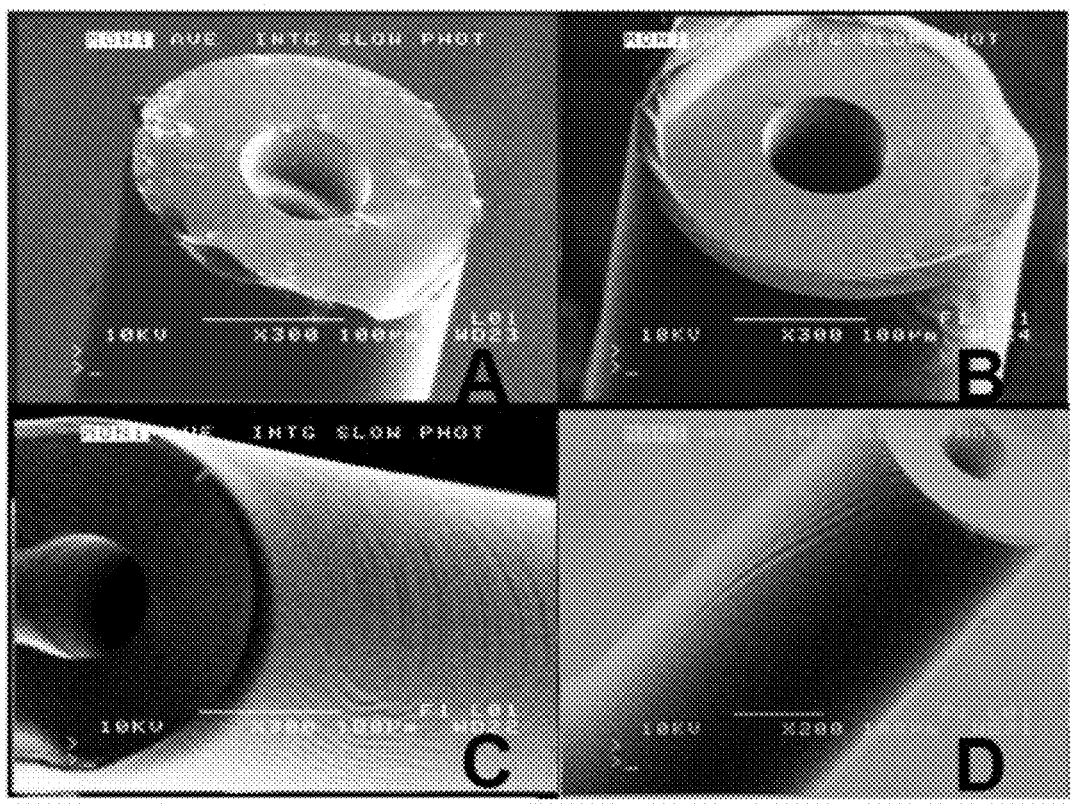
Figure 13A-D

| Sample name | C₈ PIL 100μm I.D. R | Sensitivity PA/[mg/L] | Rec (%) | R | C₉ PIL 100μm I.D. Sensitivity PA/[mg/L] | Rec (%) | R | C₉ PIL 65μm I.D. Sensitivity PA/[mg/L] | Rec (%) | R | C₉ PIL 30μm I.D. Sensitivity PA/[mg/L] | Rec (%) |
|---|---|---|---|---|---|---|---|---|---|---|---|---|
| Isopropyl butyrate | 0.9950 | 0.026 | 96.5 | 0.9855 | 0.020 | 99.9 | 0.9444 | 0.026 | 69.0 | 0.9978 | 0.101 | 85.6 |
| Methyl caproate | 0.9887 | 0.049 | 91.5 | 0.9892 | 0.038 | 88.4 | 0.9849 | 0.054 | 73.6 | 0.9985 | 0.191 | 85.7 |
| Methyl enanthate | 0.9959 | 0.191 | 82.8 | 0.9922 | 0.161 | 94.8 | 0.9917 | 0.245 | 87.3 | 0.9994 | 0.673 | 96.3 |
| Methyl caprylate | 0.9977 | 0.809 | 87.4 | 0.9951 | 0.762 | 90.8 | 0.9978 | 1.105 | 87.4 | 0.9994 | 3.153 | 96.3 |
| Hexyl butyrate | 0.9982 | 2.3150 | 78.3 | 0.9965 | 1.909 | 85.8 | 0.9942 | 2.577 | 95.7 | 0.9994 | 5.072 | 82.6 |
| Methyl nonanoate | 0.9988 | 2.885 | 82.4 | 0.9969 | 2.825 | 86.3 | 0.9984 | 3.869 | 87.6 | 0.9994 | 8.965 | 97.5 |
| Methyl decanoate | 0.9992 | 8.985 | 80.9 | 0.9988 | 9.264 | 85.1 | 0.9982 | 11.853 | 89.6 | 0.9984 | 26.038 | 93.7 |
| Hexyl tiglate | 0.9996 | 5.725 | 82.7 | 0.9972 | 5.446 | 85.4 | 0.9982 | 6.749 | 89.5 | 0.9984 | 12.87 | 91.8 |
| Benzyl butyrate | 0.9992 | 0.351 | 91.0 | 0.9972 | 0.281 | 93.0 | 0.9984 | 0.358 | 96.2 | 0.9986 | 0.730 | 72.3 |
| Methyl undecanoate | 0.9975 | 22.334 | 81.9 | 0.9988 | 23.842 | 84.5 | 0.9960 | 30.991 | 86.5 | 0.9988 | 26.336 | 91.8 |
| Methyl laurate | 0.9909 | 29.941 | 78.6 | 0.9988 | 37.842 | 70.2 | 0.9814 | 31.527 | 84.5 | 0.9809 | 20.445 | 80.8 |
| Furfuryl octanoate | 0.9990 | 2.573 | 98.7 | 0.9981 | 2.627 | 90.7 | 0.9945 | 2.738 | 108.9 | 0.9856 | 2.784 | 72.3 |

Figure 18

◆ Benzene ■ Toluene ▓ Ethyl benzene × m.p-Xylene * o-Xylene

1. Benzene, 2. Toluene, 3. Ethyl benzene, 4. m,p-xylene, 5. o-xylene

| Sample name | Linear range (mg/L) | R | Sensitivity [PA/(mg/L)] | LOD] (mg/L) | Rec (%) | RSD (%) | Conc. in gasoline (mg/L) |
|---|---|---|---|---|---|---|---|
| Benzene | 25-5000 | 0.9939 | 0.295 | 581.6 | 91.9 | 2.9 | 712.3 |
| Toluene | 25-5000 | 0.9963 | 0.842 | 452.3 | 100.1 | 0.9 | 567.9 |
| Ethyl benzene | 25-5000 | 0.9964 | 1.957 | 444.7 | 92.8 | 2.9 | 170.2 |
| m,p-Xylene | 25-5000 | 0.9964 | 4.974 | 449.4 | 93.6 | 2.9 | 199.3 |
| o-Xylene | 25-5000 | 0.9951 | 2.413 | 521.1 | 94.5 | 2.4 | 252.1 |

Table 1: Correlation coefficient, sensitivity, and detection limit of esters and FAMEs in Milli-Q water extracted by headspace sampling using three PIL coated fibers

| Sample Name | Poly(ViHIm⁺ NTf₂⁻) PIL[i] | | | | Poly(ViDDIm⁺ NTf₂⁻) PIL[ii] | | | | Poly(ViHDIm⁺ NTf₂⁻) PIL[iii] | | | |
|---|---|---|---|---|---|---|---|---|---|---|---|---|
| | R² | Calibration range (μg L⁻¹) | Sensitivity [PA/(μg L⁻¹)] | DL (μg L⁻¹) | R² | Calibration Range (μg L⁻¹) | Sensitivity [PA/(μg L⁻¹)] | DL (μg L⁻¹) | R² | Calibration Range (μg L⁻¹) | Sensitivity [PA/(μg L⁻¹)] | DL (μg L⁻¹) |
| Isopropyl butyrate | 0.997 | 100 – 4000 | 0.0543 | 50 | 0.995 | 100 – 5000 | 0.0454 | 50 | 0.999 | 100 – 500 | 0.0692 | 50 |
| Ethyl valerate | 0.999 | 100 – 4000 | 0.0619 | 50 | 0.998 | 100 – 5000 | 0.0643 | 50 | 0.999 | 100 – 500 | 0.0764 | 50 |
| Methyl caproate | 0.999 | 50 – 4000 | 0.0911 | 25 | 0.998 | 50 – 5000 | 0.0786 | 25 | 0.999 | 50 – 500 | 0.1143 | 25 |
| Methyl enanthate | 0.998 | 50 – 4000 | 0.3393 | 25 | 0.999 | 50 – 5000 | 0.3086 | 25 | 0.999 | 50 – 500 | 0.4234 | 25 |
| Methyl caprylate | 0.996 | 5 – 4000 | 1.3465 | 2.5 | 0.999 | 5 – 3000 | 1.1412 | 2.5 | 0.999 | 5 – 500 | 1.6888 | 2.5 |
| Hexyl butyrate | 0.998 | 5 – 2000 | 3.8694 | 2.5 | 0.999 | 5 – 2000 | 3.9465 | 2.5 | 0.999 | 5 – 500 | 3.8626 | 2.5 |
| Methyl nonanoate | 0.999 | 5 – 2000 | 4.9492 | 2.5 | 0.999 | 5 – 2000 | 5.2307 | 2.5 | 0.999 | 5 – 500 | 5.6651 | 2.5 |
| Methyl decanoate | 0.999 | 5 – 1000 | 15.381 | 2.5 | 0.998 | 5 – 1000 | 16.961 | 2.5 | 0.999 | 5 – 500 | 18.486 | 2.5 |
| Hexyl tiglate | 0.999 | 5 – 1000 | 10.926 | 2.5 | 0.998 | 5 – 1000 | 11.241 | 2.5 | 0.999 | 5 – 500 | 11.077 | 2.5 |
| Benzyl butyrate | 0.997 | 5 – 5000 | 0.5577 | 5 | 0.997 | 5 – 5000 | 0.4902 | 5 | 0.999 | 5 – 500 | 0.4707 | 5 |
| Methyl undecanoate | 0.988 | 5 – 900 | 31.022 | 2.5 | 0.997 | 5 – 600 | 42.653 | 2.5 | 0.997 | 5 – 500 | 43.697 | 2.5 |
| Methyl laurate | 0.998 | 5 – 400 | 44.093 | 2.5 | 0.996 | 5 – 600 | 41.483 | 2.5 | 0.997 | 5 – 500 | 39.74 | 2.5 |
| Furfuryl octanoate | 0.990 | 5 – 1000 | 4.9192 | 2.5 | 0.996 | 5 – 600 | 5.9463 | 2.5 | 0.997 | 5 – 500 | 6.0621 | 2.5 |

[i] poly(1-vinyl-3-hexylimidazolium) bis[(trifluoromethyl)sulfonyl]imide

[ii] poly(1-vinyl-3-dodecylimidazolium) bis[(trifluoromethyl)sulfonyl]imide

Figure 21

Table 2: Correlation coefficient, sensitivity, and detection limit of esters and FAMEs in Milli-Q water extracted by headspace sampling using three commercial fibers

| Sample Name | PDMS (100 μm) | | | | PDMS (7 μm) | | | | PA (75 μm) | | | |
|---|---|---|---|---|---|---|---|---|---|---|---|---|
| | R | Calibration range (μg L⁻¹) | Sensitivity [PA/(μg L⁻¹)] | DL (μg L⁻¹) | R | Calibration Range (μg L⁻¹) | Sensitivity [PA/(μg L⁻¹)] | DL (μg L⁻¹) | R | Calibration Range (μg L⁻¹) | Sensitivity [PA/(μg L⁻¹)] | DL (μg L⁻¹) |
| Isopropyl butyrate | 0.999 | 50-3000 | 0.5001 | 5 | 0.993 | 100-2000 | 0.0233 | 100 | 0.997 | 50-2000 | 0.1030 | 20 |
| Ethyl valerate | 0.999 | 50-3000 | 0.5775 | 5 | 0.991 | 100-2000 | 0.0379 | 100 | 0.998 | 50-2000 | 0.2355 | 10 |
| Methyl caproate | 0.999 | 5-3000 | 0.7860 | 2.5 | 0.991 | 100-2000 | 0.1766 | 50 | 0.998 | 5-2000 | 0.3822 | 5 |
| Methyl enanthate | 0.999 | 5-3000 | 2.7467 | 2.5 | 0.996 | 100-2000 | 0.8118 | 50 | 0.999 | 5-2000 | 1.5758 | 2.5 |
| Methyl caprylate | 0.998 | 0.5-3000 | 10.2930 | 0.25 | 0.996 | 10-2000 | 2.4835 | 10 | 0.999 | 5-2000 | 4.5801 | 0.5 |
| Hexyl butyrate | 0.995 | 0.5-3000 | 20.8620 | 0.25 | 0.997 | 10-2000 | 4.5144 | 5 | 0.999 | 5-2000 | 7.8787 | 0.5 |
| Methyl nonanoate | 0.999 | 0.5-800 | 31.9530 | 0.25 | 0.994 | 10-2000 | 7.8852 | 5 | 0.998 | 5-1000 | 12.7080 | 0.5 |
| Methyl decanoate | 0.997 | 0.5-800 | 58.9980 | 0.25 | 0.997 | 10-2000 | 4.8429 | 5 | 0.999 | 5-1000 | 30.5280 | 0.5 |
| Hexyl tiglate | 0.998 | 0.5-800 | 56.8401 | 0.25 | 0.996 | 100-2000 | 0.2861 | 100 | 0.999 | 0.5-1000 | 16.9690 | 0.25 |
| Benzyl butyrate | 0.996 | 5-800 | 20.154 | 2.5 | 0.998 | 10-800 | 24.107 | 5 | 0.996 | 0.5-2000 | 1.6209 | 0.25 |
| Methyl undecanoate | 0.992 | 0.5-800 | 72.1070 | 0.25 | 0.988 | 10-600 | 25.546 | 5 | 0.989 | 0.5-1000 | 42.9260 | 0.25 |
| Methyl laurate | 0.995 | 0.5-600 | 61.1830 | 0.25 | 0.996 | 10-1500 | 2.8486 | 10 | 0.988 | 0.5-400 | 59.3940 | 0.25 |
| Furfuryl octanoate | 0.999 | 0.5-800 | 9.1494 | 0.25 | | | | | 0.993 | 0.5-1000 | 7.3446 | 0.25 |

Figure 22

Table 3: Figures of merit of calibration curves obtained for three PIL coated fibers in a synthetic wine solution

| Sample Name | poly(VHIm⁺ NTf₂⁻) PIL | | | | poly(ViEDIm⁺ NTf₂⁻) PIL | | | | Poly(ViHDIm⁺ NTf₂⁻) PIL | | | |
|---|---|---|---|---|---|---|---|---|---|---|---|---|
| | R | Calibration range (µg L⁻¹) | Sensitivity [PA/(µg L⁻¹)] | DL (µg L⁻¹) | R | Calibration Range (µg L⁻¹) | Sensitivity [PA/(µg L⁻¹)] | DL (µg L⁻¹) | R | Calibration Range (µg L⁻¹) | Sensitivity [PA/(µg L⁻¹)] | DL (µg L⁻¹) |
| Isopropyl butyrate | 0.985 | 100 – 1000 | 0.0258 | 50 | 0.985 | 100 – 1000 | 0.02 | 50 | 0.944 | 100 – 1000 | 0.0258 | 50 |
| Ethyl valerate | 0.988 | 100 – 1000 | 0.0376 | 50 | 0.989 | 100 – 1000 | 0.0375 | 50 | 0.980 | 100 – 1000 | 0.0370 | 50 |
| Methyl caproate | 0.989 | 100 – 1000 | 0.0488 | 50 | 0.989 | 100 – 1000 | 0.0376 | 50 | 0.944 | 100 – 1000 | 0.0541 | 50 |
| Methyl enanthate | 0.996 | 50 – 1000 | 0.1914 | 25 | 0.992 | 50 – 1000 | 0.1007 | 25 | 0.992 | 50 – 1000 | 0.2426 | 25 |
| Methyl caprylate | 0.998 | 5 – 1000 | 0.8698 | 5 | 0.995 | 5 – 1000 | 0.7022 | 5 | 0.998 | 5 – 1000 | 1.105 | 5 |
| Hexyl butyrate | 0.998 | 5 – 1000 | 2.3159 | 2.5 | 0.998 | 5 – 1000 | 1.909 | 2.5 | 0.994 | 5 – 1000 | 2.5774 | 2.5 |
| Methyl octanoate | 0.999 | 5 – 1000 | 2.8878 | 2.5 | 0.997 | 5 – 1000 | 2.8252 | 2.5 | 0.999 | 5 – 1000 | 3.8097 | 2.5 |
| Methyl decanoate | 0.999 | 5 – 1000 | 8.9448 | 2.5 | 0.999 | 5 – 1000 | 9.2635 | 2.5 | 0.998 | 5 – 1000 | 11.853 | 2.5 |
| Hexyl tiglate | 0.999 | 5 – 1000 | 5.725 | 2.5 | 0.999 | 5 – 1000 | 5.4462 | 2.5 | 0.999 | 5 – 1000 | 6.7497 | 2.5 |
| Benzyl butyrate | 0.999 | 5 – 1000 | 0.3506 | 5 | 0.997 | 50 – 1000 | 0.2812 | 50 | 0.999 | 5 – 1000 | 0.3616 | 5 |
| Methyl undecanoate | 0.998 | 5 – 1000 | 22.334 | 2.5 | 0.997 | 5 – 1000 | 23.842 | 2.5 | 0.996 | 5 – 600 | 30.991 | 2.5 |
| Methyl laurate | 0.991 | 5 – 700 | 39.941 | 2.5 | 0.989 | 5 – 500 | 37.842 | 2.5 | 0.981 | 5 – 600 | 31.527 | 2.5 |
| Furfuryl octanoate | 0.999 | 5 – 1000 | 2.5728 | 5 | 0.998 | 5 – 1000 | 2.6273 | 2.5 | 0.995 | 5 – 1000 | 2.7886 | 2.5 |

Figure 23

Table 4: Figures of merit of calibration curves obtained for two commercial fibers in a synthetic wine solution

| Sample Name | PDMS (100 μm) | | | | PDMS (7 μm) | | | |
|---|---|---|---|---|---|---|---|---|
| | R | Calibration range (μg L$^{-1}$) | Sensitivity [PA/(μg L$^{-1}$)] | DL (μg L$^{-1}$) | R | Calibration Range (μg L$^{-1}$) | Sensitivity [PA/(μg L$^{-1}$)] | DL (μg L$^{-1}$) |
| Isopropyl butyrate | 0.999 | 5 – 600 | 0.3319 | 5 | 0.986 | 100-1000 | 0.0161 | 100 |
| Ethyl valerate | 0.999 | 5 – 600 | 0.3720 | 5 | | | | 100 |
| Methyl caproate | 0.999 | 5 – 600 | 0.4947 | 2.5 | 0.989 | 100-1000 | 0.0252 | 100 |
| Methyl enanthate | 0.999 | 5 – 600 | 1.8843 | 2.5 | 0.994 | 100-1000 | 0.099 | 50 |
| Methyl caprylate | 0.999 | 5 – 600 | 7.5799 | 2.5 | 0.998 | 100-1000 | 0.4025 | 50 |
| Hexyl butyrate | 0.999 | 0.5 – 600 | 16.351 | 0.25 | 0.997 | 10-1000 | 1.116 | 5 |
| Methyl nonanoate | 0.999 | 0.5 – 600 | 21.68 | 0.25 | 0.999 | 10-1000 | 2.1948 | 5 |
| Methyl decanoate | 0.999 | 0.5 – 600 | 44.893 | 0.25 | 0.999 | 10-1000 | 4.5564 | 5 |
| Hexyl tiglate | 0.998 | 0.5 – 600 | 22.740 | 0.25 | 0.999 | 10-1000 | 2.1816 | 5 |
| Benzyl butyrate | 0.999 | 5 – 600 | 1.2503 | 2.5 | 0.998 | 100-1000 | 0.1201 | 100 |
| Methyl undecanoate | 0.996 | 0.5 – 600 | 63.3580 | 0.25 | 0.994 | 10-1000 | 13.14 | 5 |
| Methyl laurate | 0.985 | 0.5 – 600 | 49.386 | 0.25 | 0.993 | 10-600 | 19.197 | 5 |
| Furfuryl octanoate | 0.998 | 5 – 600 | 5.1277 | 2.5 | 0.995 | 10-1000 | 1.6317 | 10 |

Figure 24

Table 5: Recovery and reproducibility results for esters and FAMEs extracted from red wine at two calibration levels

| | 100 µg L⁻¹ | | | | | | | | 400 µg L⁻¹ | | | | | | | |
|---|---|---|---|---|---|---|---|---|---|---|---|---|---|---|---|---|
| | poly(VIIIm⁺ NTf₂⁻) | | poly(VBIm⁺ NTf₂⁻) | | poly(VBDIm⁺ NTf₂⁻) | | PDMS (7 µm) | | poly(VIIIm⁺ NTf₂⁻) | | poly(VBIm⁺ NTf₂⁻) | | poly(VBDIm⁺ NTf₂⁻) | | PDMS (7 µm) | |
| Sample Name | Rec (%) | RSD (%) | Rec (%) | RSD (%) | Rec (%) | RSD (%) | Rec (%) | RSD (%) | Rec (%) | RSD (%) | Rec (%) | RSD (%) | Rec (%) | RSD (%) | Rec (%) | RSD (%) |
| Isopropyl butyrate | 76.7 | 10.9 | 78.1 | 19.0 | 52.6 | 8.1 | 98.1 | 10.8 | 96.5 | 5.0 | 99.9 | 6.2 | 78.1 | 1.2 | 102.9 | 4.4 |
| Ethyl valerate | 74.1 | 13.8 | 68.5 | 10.9 | 61.1 | 1.7 | | | 83.9 | 2.2 | 115.1 | 12.0 | 78.2 | 9.1 | | |
| Methyl caproate | 74.0 | 19.6 | 65.9 | 17.5 | 45.1 | 2.7 | 109.4 | 4.7 | 91.5 | 2.4 | 88.4 | 7.3 | 73.6 | 10.7 | 98.1 | 3.1 |
| Methyl enanthate | 109.0 | 19.5 | 90.7 | 3.2 | 82.0 | 2.8 | 93.1 | 4.9 | 92.8 | 4.9 | 94.8 | 4.7 | 87.3 | 9.6 | 95.2 | 3.0 |
| Methyl caprylate | 84.2 | 5.8 | 93.1 | 7.2 | 81.1 | 1.6 | 92.4 | 3.2 | 87.4 | 1.5 | 90.8 | 4.4 | 87.4 | 6.6 | 89.7 | 1.0 |
| Hexyl butyrate | 80.0 | 4.2 | 64.5 | 17.6 | 59.6 | 1.9 | 59.9 | 3.3 | 78.3 | 1.8 | 85.8 | 3.4 | 93.7 | 3.6 | 82.0 | 0.3 |
| Methyl nonanoate | 87.5 | 4.7 | 92.4 | 5.2 | 81.3 | 1.4 | 90.0 | 2.3 | 82.4 | 2.2 | 86.3 | 2.7 | 87.6 | 4.7 | 85.4 | 1.0 |
| Methyl decanoate | 84.9 | 3.8 | 83.4 | 3.2 | 73.4 | 1.2 | 81.4 | 2.5 | 80.9 | 2.6 | 85.1 | 1.5 | 89.6 | 2.9 | 82.5 | 1.8 |
| Hexyl tiglate | 84.3 | 2.9 | 87.4 | 2.6 | 76.5 | 0.9 | 85.5 | 3.0 | 82.7 | 2.5 | 85.4 | 1.8 | 89.5 | 3.0 | 82.7 | 1.7 |
| Benzyl butyrate | 104.9 | 4.7 | 114.0 | 5.5 | 98.0 | 1.5 | 123.5 | 3.7 | 91.0 | 2.2 | 95.0 | 2.2 | 98.2 | 2.7 | 88.1 | 1.4 |
| Methyl undecanoate | 65.3 | 3.0 | 61.2 | 2.7 | 71.9 | 3.3 | 62.7 | 2.2 | 81.9 | 3.4 | 84.5 | 1.9 | 86.6 | 1.5 | 82.7 | 3.4 |
| Methyl laurate | 60.7 | 2.2 | 59.7 | 10.1 | 62.8 | 11.6 | 33.3 | 3.0 | 78.6 | 4.2 | 70.2 | 3.3 | 84.5 | 0.2 | 74.9 | 0.3 |
| Furfuryl octanoate | 84.9 | 10.3 | 54.8 | 3.3 | 79.1 | 2.3 | 60.5 | 4.3 | 98.7 | 8.6 | 90.7 | 2.5 | 106.9 | 1.8 | 68.4 | 6.2 |

| Analyte | $R^2$ | Sensitivity [PA/(µg/L)] | Detection Limit (µg/L) |
|---|---|---|---|
| Methyl caproate | 0.99 | 0.06 | 175.5 |
| Methyl nonanoate | 0.99 | 1.26 | 191.1 |
| Methyl decanoate | 0.99 | 2.27 | 223.2 |
| Hexyl butyrate | 0.98 | 0.32 | 277.4 |
| Methyl undecanoate | 0.98 | 3.23 | 252.0 |
| Methyl laurate | 0.98 | 3.21 | 208.1 |

Figure 29 - Table 7

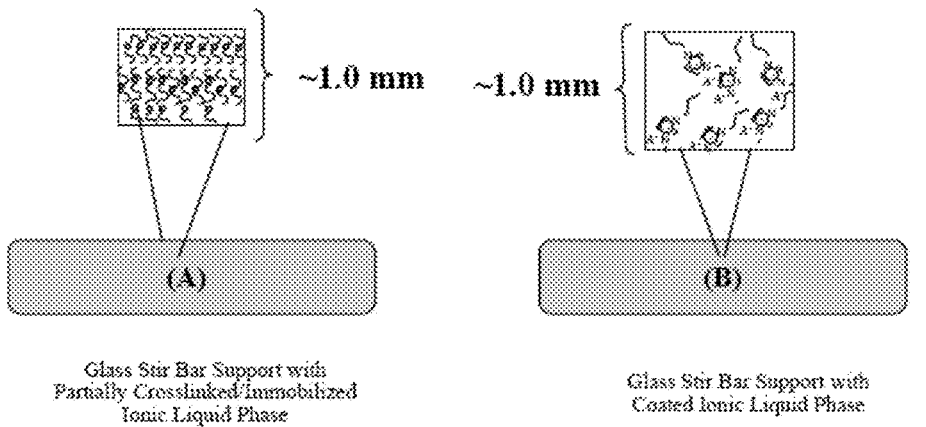
Figure 32A-B
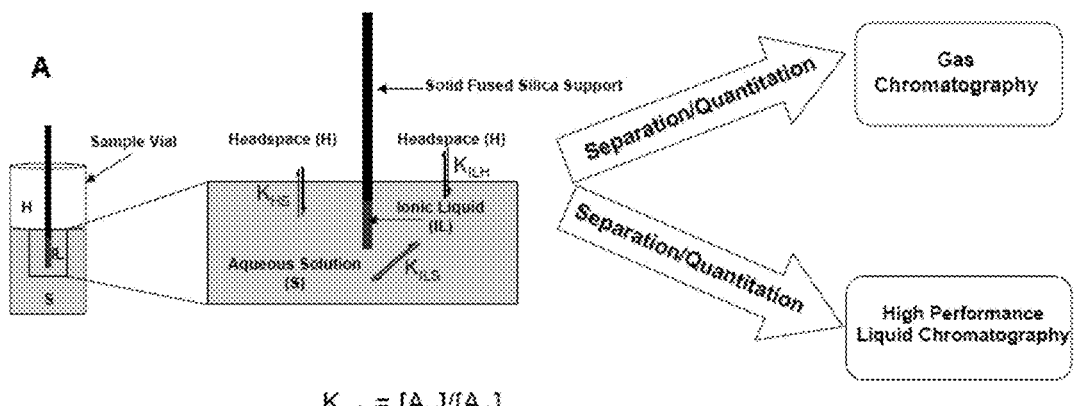
$K_{HS} = [A_H]/[A_S]$
$K_{ILS} = [A_{IL}]/[A_S]$
$K_{ILH} = [A_{IL}]/[A_H]$
Figure 33A
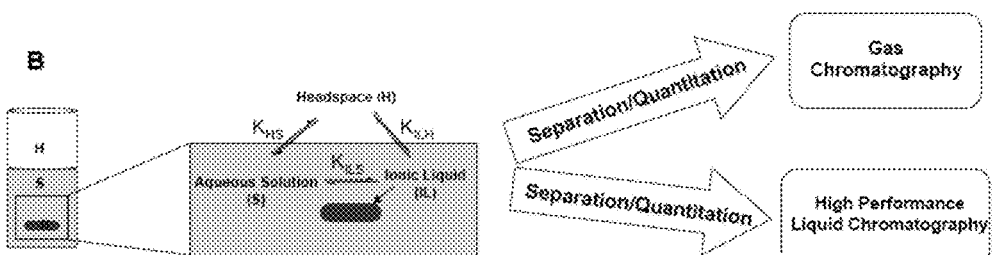
Figure 33B

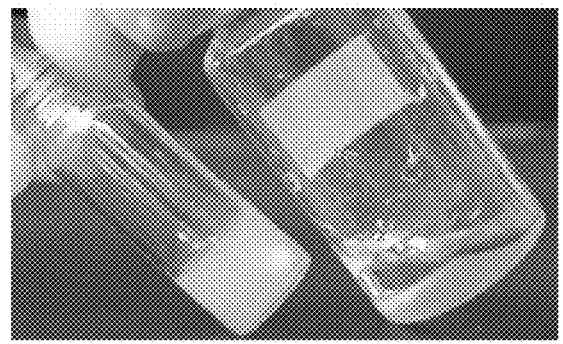
Figure 39
|  | C$_6$ Taurate | C$_6$ NTf$_2$ | Carboxen | PDMS |
|---|---|---|---|---|
| High Pressure | 8.0 (1 min) | | | |
| | 5.9 (30 min) | 6.5 (20 min) | 7.4 (5 min) | 10.0 (5 min) |
| Low Pressure | 5.8 (1 min) | | 4.8 (1 min) | |
| | 6.8 (30 min) | 5.3 (20 min) | 9.0 (5 min) | 8.7 (5 min) |
Figure 40
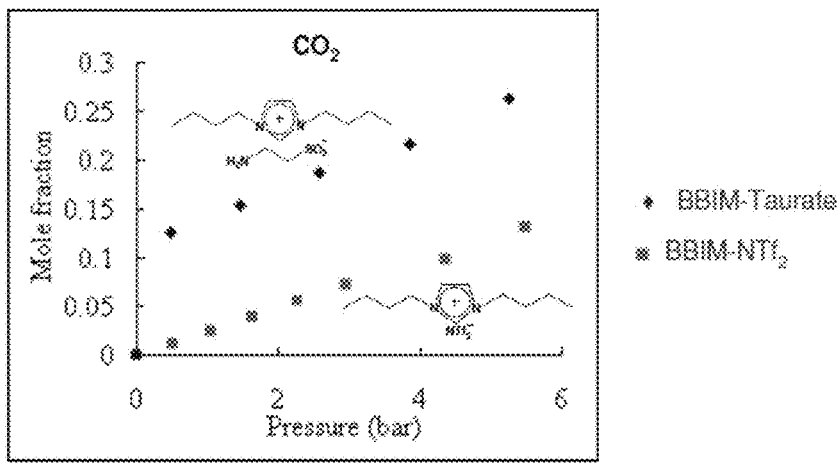
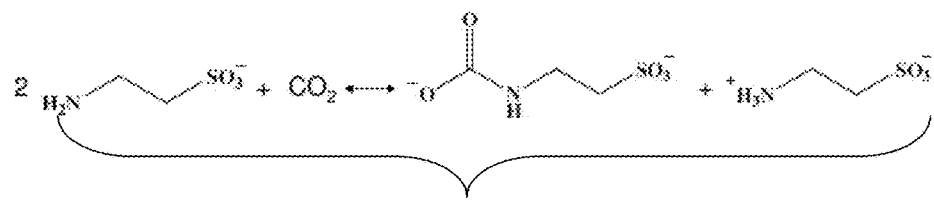
Figure 41

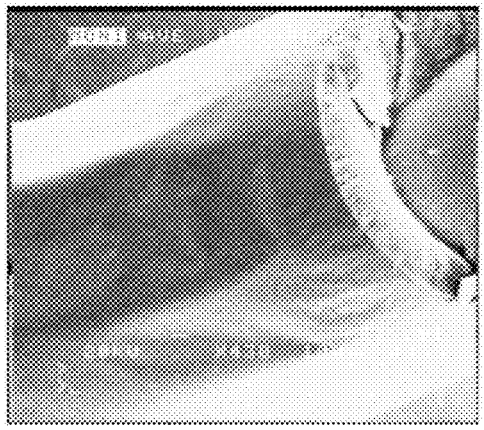
Before exposure to CO$_2$
Figure 46
After desorption
Figure 48
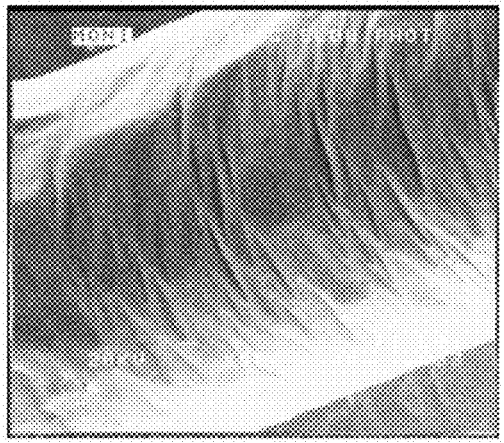
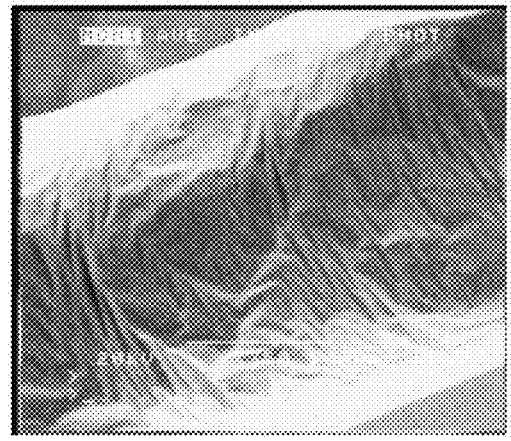
After exposure to CO$_2$
Figure 47A    Figure 47B

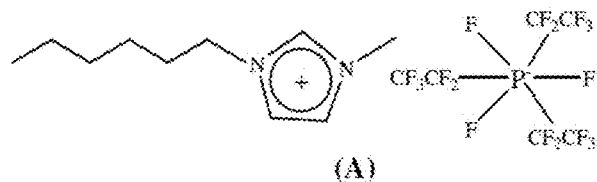
(A)
1-Hexyl-3-methylimidazolium tris(pentafluoroethyl)trifluorophosphate [HMIM][FAP]
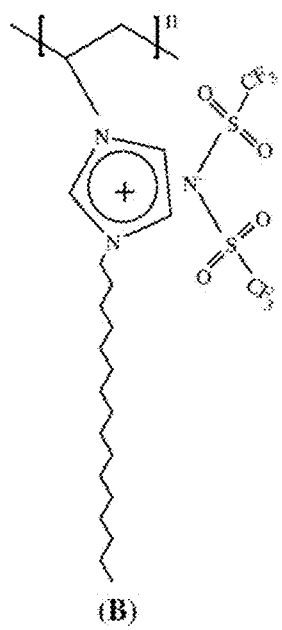
(B)
poly(1-vinyl-3-hexadecylimidazolium bis[(trifluoromethyl)sulfonyl]imide) (poly[ViHDIM][NTf$_2$])
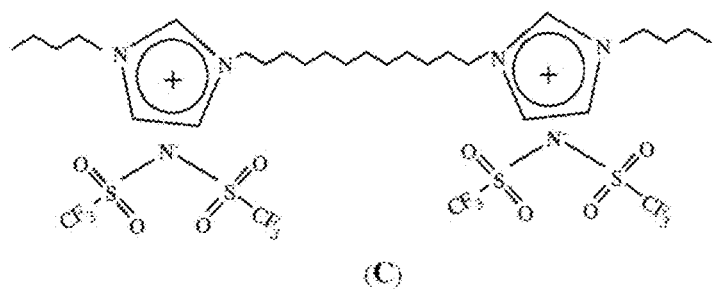
(C)
1,12-Di-(3-butylimidazolium)dodecane bis[(trifluoromethyl)sulfonyl]imide [C$_{12}$(BIM)$_2$][NTf$_2$]
Figure 52

POLYMERIC IONIC LIQUIDS, METHODS OF MAKING AND METHODS OF USE THEREOF

CROSS-REFERENCE TO RELATED APPLICATIONS

The present application is a divisional application of U.S. Ser. No. 13/058,088 filed Jun. 16, 2011, now allowed, which claims the benefit of the PCT/US2009/053319 filed Aug. 10, 2009, which also claims the benefit of the provisional patent application Ser. No. 61/087,411 filed Aug. 8, 2008 which is also expressly incorporated herein, by reference, in its entirety.

STATEMENT REGARDING SPONSORED RESEARCH

This invention was made with government support under National Science Foundation, Grant No. CHE-0748612. The government has certain rights in this invention.

BACKGROUND OF THE INVENTION

There is no admission that the background art disclosed in this section legally constitutes prior art. Solid phase microextraction (SPME) is a popular solvent-free sampling technique developed by Pawliszyn and co-workers in the early 1990s. SPME has gained widespread acceptance and use in laboratories due to the fact that it is a solvent-less extraction technique, its mode of operation is relatively simple and easy to automate, and sampling and sample preparation are combined into one single step.

SPME consists of a fiber that is coated with a stationary phase material, typically composed of a liquid polymer, solid sorbent, or a mixture of both. Equilibrium is established between an analyte and the coating material when the fiber is exposed to a solution, which allows the technique to be applied to both headspace and direct-immersion sampling. When SPME is coupled with gas chromatography (GC), the analytes are desorbed from the fiber coating by thermal desorption in the injection port of the GC.

The development of new coating materials for SPME has flourished in the past decade as the technique continues to gain wide-spread popularity. The need for new coating materials is underscored by the fact that SPME methods must achieve high sensitivity and selectivity. The coating material must be designed to be resistant to extreme chemical conditions, such as pH, salts, organic solvents, and modifiers.

To achieve long fiber lifetimes, the coating should be thermally stable to avoid excessive losses during the high temperature desorption step, while also maintaining physical integrity of the film.

As SPME methods become more developed in sampling complicated environmental and biological matrices, structural tunability is a desirable means of modulating specific properties of the coating material while retaining others.

Further, a major challenge facing the world today is the development of a sustainable civilization. An integral component to maintaining sustainability lies with the replacement of polluting processes by benign or "green" alternatives. As industrial practices investigate new green processes, key variables such as cost, feasibility, and significance of improvements are all considerations that influence the adoption of any feasible process.

Description and Properties of Ionic Liquids (ILs)

Ionic liquids (ILs) are a class of compounds that can be tailor synthesized to exhibit unique solvent properties while retaining many green characteristics. Despite widespread interest in ILs, there continue to be many properties of ILs that are not well-understood. Paramount of these properties is how the structures of the cationic and anionic moieties comprising the IL influence the partitioning behavior of various molecules. No single study or collection of studies performed to this date can be used to conclusively predict or explain the role of the IL cation and/or anion on the observed partitioning behavior.

Ionic liquids (IL) and their polymerized analogs constitute a class of non-molecular, ionic solvents with low melting points. Also known as liquid organic, molten, or fused salts, most ILs possess melting points lower than 100° C. Most widely studied ILs are comprised of bulky, asymmetric N-containing organic cations (e.g., imidazole, pyrrolidine, pyridine) in combination with any wide variety of anions, ranging from simple inorganic ions (e.g., halides) to more complex organic species (e.g., triflate).

ILs have negligible vapor pressures at room temperature, possess a wide range of viscosities, can be custom-synthesized to be miscible or immiscible with water and organic solvents, often have high thermal stability, and are capable of undergoing multiple solvation interactions with many types of molecules. The plethora of interaction capabilities ILs are capable of undergoing include: hydrogen bond acidity, hydrogen bond basicity, $\pi$-$\pi$, dipolar, and dispersion interactions. These interactions are directly related to the structures of the cationic/anionic moieties that comprise the IL.

The aforementioned properties have made molten organic salts and imidazolium and pyrrolidinium-based ILs an interesting and useful class of stationary phase materials in GC. In particular, it has been shown that the separation selectivity and thermal stability can be altered by changes to the cation and/or anion, polymerization and immobilization of the IL, and by blending different ILs to form stationary phases with varied composition. While a series of reports have described the use of ILs in single drop microextraction (SDME) and liquid phase microextraction (LPME), only two reports have studied the use of ILs in SPME.

Liu and co-workers reported the development of a disposable IL coating for the headspace extraction of benzene, toluene, ethylbenzene, and xylenes. The resulting fibers possessed comparable recoveries to the commercial fibers coated with polydimethylsiloxane (PDMS).

To allow for a better wetting and increased loading of the IL on the fused silica fiber, Hsieh and co-workers utilized a Nafion membrane followed by dip coating of the SPME fiber in an IL. The fibers were used to extract polycyclic aromatic hydrocarbons (PAHs) from aqueous solution. Using GC-MS, detection limits of around 4-5 ng $L^{-1}$ were obtained with relative standard deviations ranging from 6-12%. In both of these reports, the IL had to be re-coated on the fiber after each extraction and desorption step, which significantly reduces the convenience and high-throughput nature inherent to SPME.

It has been observed that many classes of neat ILs have a strong propensity to flow off the fiber when employing moderate to high desorption temperatures (200° C. and above) and desorption times of 4 minutes or longer. Several complications arise from the loss of the IL during the desorption step: (1) a compromise between the desorption time and temperature must be achieved; (2) due to the fact that the IL drips into the injection port and contaminates the liner, it must be constantly removed and cleaned to prevent unwanted IL-decomposition products to appear as chromatographic ghost peaks; and, (3) the SPME fiber needs to be re-coated with the IL, thereby making it inconvenient while also decreasing fiber-to-fiber reproducibility.

Due to the negligible vapor pressure inherent to ILs, ILs are not lost at high temperatures and may be recovered and re-used, demonstrating their potential as green solvents. In addition, the implementation of processes using many classes of ILs may minimize the potential for explosions due to the lack of flashpoint and reduced flammability of many ILs. Numerous reports have demonstrated enhanced reaction kinetics and favorable product ratios when performing various organic reactions in an IL instead of traditional organic solvents.

Uses of Ionic Liquids in Analytical Extractions

The initial impetuses for the widespread interest in ILs were organic synthesis and the growth of green chemistry. Research interest in ILs has extended into many fields of science involving an interdisciplinary group of researchers. The numbers of publications examining basic properties and novel applications of ILs have increased over 850% from 2000 to 2006. The study and applications involving ILs in analytical chemistry has been lagging despite the vast opportunities offered by these designer solvents.

In an attempt to better understand the solvation properties of ILs, prior studies have set out to compare the partitioning behavior of neutral, amino-aromatic compounds, and compounds containing mixed acidic and basic functionality in octanol/water and ionic liquid/water systems. While the aforementioned compounds seemed to correlate well between the two systems, a considerable divergence was noted for acidic compounds as well as a strong pH dependence on overall partitioning. Other studies have explored the partitioning of metal ions by task-specific ILs, the use of ILs as extraction media in deep desulfurization of diesel fuels, as well as the use of extractants to remove ions from aqueous solutions.

However, no single study or collection of studies can be used to conclusively predict or explain the role of the IL cation and/or anion on the observed partitioning behavior. Due to recent rapid advances in IL synthesis, it has been proposed that the extensive range of available cations and anions could produce up to $10^{18}$ different ILs. A relationship between the structure of ILs and their corresponding physicochemical and solvation properties is desperately needed to intelligently design new classes of ILs for specific applications.

Task-Specific Ionic Liquids

The term "task-specific ionic liquids" (TSILs) relates to salts that incorporate functional groups into one or both of the ions to impart specific interactions with dissolved substrates; e.g., the use of urea, thiourea, and thioether functional groups to remove $Hg^{2+}$ and $Cd^{2+}$ from aqueous solutions. In another example, the reactive capture of $CO_2$ was demonstrated by a TSIL containing a tethered amine group. The amine sequesters $CO_2$ through the formation of an ammonium carbamate complex with the TSIL. While many of these elegant compounds have been studied in synthetic reactions and in large scale extraction processes, there has been little work that investigates the incorporation of these compounds into task-specific microextraction devices or applications in other areas of separation science.

Absorbent Coatings for Solid Phase Microextraction and Stir Bar Sorptive Extraction Solid phase microextraction (SPME) and stir bar sorptive extraction (SBSE) are two solvent-free sampling techniques in which sampling and sample preparation are combined into one single step. SPME consists of a fused silica fiber that is coated with an absorbent or adsorbent coating material, typically polydimethylsiloxane (PDMS), polyacrylate, or carbowax divinylbenzene. Depending on the mode of extraction (headspace or direct immersion), the analytes are sampled due to their partitioning to the coating material, typically under equilibrium conditions. The analytes are desorbed from the fiber using either thermal desorption (i.e., injection port of a gas chromatograph) or by solvent desorption (i.e., solvent chamber coupled to a high performance liquid chromatograph).

SBSE operates in a similar manner to SPME but differs in the type of support and the amount of coating material employed in the extraction. In SBSE, the analytes are extracted into a thick polymer coating on a magnetic stir bar. The amount of coating material in SBSE is ~50-250 times larger than SPME, which produces a distinct sensitivity enhancement.

Polymer coating materials used in SBSE have largely focused on PDMS, although there has been a report of incorporating sol-gel technology into the PDMS coating material. The development of new coating materials for SPME has flourished in the past five years as the technique has gained wide-spread popularity.

As described above, only two reports have studied the use of ILs in SPME. In both cases, several ILs were chosen and coated on the support to carry out the extraction. Both reports indicated the extraction efficiencies obtained were superior to commercial SPME coating materials. No reports have yet used IL-SPME for the determination of analyte partition coefficients. There have also been no studies reported on the use of TSILs in SPME. Moreover, to the best of the inventors' knowledge, no SPME or SBSE coating material has yet been shown to effectively extract nucleic acids, which has tremendous opportunity in all aspects of bioscience.

There is a need for new coating materials which is underscored by the fact that SPME methods must achieve high sensitivity and selectivity. In addition, the coating material must be designed to be resistant to extreme chemical conditions, such as pH, salts, organic solvents, and modifiers. Additionally, the coating must be thermally stable to maintain physical integrity during the lifetime of the fiber.

There is a further need for ILs that possess the ability to be structurally tuned to effectively meet any physical or chemical requirements.

There is also a need for improved solvent-free sampling techniques. In particular, there is a need for improved the solid phase microextraction (SPME) methods.

SUMMARY OF THE INVENTION

The present invention is based, at least in part, on the inventors' discovery of the ion exchange mechanism occurring between IL-based materials and aqueous solutions of nucleic acids. The inventors' discovery provides a fundamental understanding into the preferential extraction of biomolecules. In addition, the inventors' discovery is especially useful in the realm of ionic liquids and separation science, particularly in the areas of biology and biochemistry, and in the general environmentally sustainable areas.

In a first broad aspect, there is provided herein a polymeric ionic liquid (PIL) comprising: i) a cationic component comprised of an ionic liquid (IL) that is polymerized, and ii) one or more anionic components, wherein the anionic components can be the same or different.

In another broad aspect, there is provided herein a mixture comprising one or more of: i) mixtures of PILs, ii) mixtures of PILs and neat ILs, iii) mixtures of PILs and at least one organic solvent, iv) mixtures of PILs, ILs, and at least one organic solvent, iv) mixtures of PILs, ILs, at least one organic solvent, and at least one other polymeric system, including, but not limited to PDMS, PEG, PA, and silicone oils.

In certain embodiments, the cationic component comprises least one or more: quaternary ammonium, protonated tertiary amine, thionium, phosphonium, arsonium, carboxylate, sulfate or sulfonate groups which may be substituted or unsubstituted, saturated or unsaturated, linear, branched, cyclic or aromatic.

In certain embodiments, the cationic component is described by the general formula of $(XRR'R''H)^+$, where X is N, P, or As, and where each of R, R', R'' is selected from the group consisting of proton, aliphatic group, cyclic group and aromatic group.

In certain embodiments, the cationic component is described by the formula of $XR_4^+$, wherein R is proton, aliphatic group (e.g., propyl, butyl), cyclic group (e.g., cyclohexane) or aromatic group (e.g., vinyl, phenyl). For example, in certain embodiments, the R, R' and R'' are different from each other.

In certain embodiments, the cationic component comprises: a quaternary ammonium, a protonated tertiary amine, imidazolium (IM) or substituted IM, pyrrolidinium or substituted pyrrolidinium, or pyridinium or substituted pyridinium.

In certain embodiments, wherein the cationic component includes one or more amine functional groups within the cation.

In certain embodiments, the PIL is polymerized to form linear polymers and/or cross-linked using varying ratios of monocationic/dicationic/tricationic/multcationic crosslinking molecules.

In certain embodiments, the cationic component comprises one or more of: monocationic components, dicationic components, tricationic components, other multicationic components, and mixtures thereof.

In certain embodiments, the cationic component comprises an IL monomer modified through one or more of: incorporation of longer alkyl chains, aromatic components, and/or hydroxyl-functionality. Non-limiting examples include where cationic component comprises one or more of: $VHIM^+$; $VDDIM^+$, $VHDIM^+$, $BBIM^+$, In addition, other non-limiting examples include where the PIL includes one or more of: poly($VHIM^+$ $NTf_2^-$); poly($VDDIM^+$ $NTf_2^-$), poly($VHDIM^+$ $NTf_2^-$), poly($BBIM^+$ $NTf_2^-$), poly($BBIM^+$ taurate$^-$), poly($BBIM^+$ $A^-$).

In another broad aspect, there is provided herein a method for preparing a polymeric ionic liquid (PIL), comprising reacting an ionic liquid monomer (IL) with RX to form a polymer, and using a metathesis anion exchange used to exchange the halide anion with a counter anion.

In certain embodiments, the PIL can be synthesized by free radical polymerization. In other embodiments, the PIL can be synthesized by a polymerization reaction involving one or more functional group attached to an aromatic ring of the cationic component. Non-limiting examples include where the polymerization reaction includes one or more of: cationic and anionic chain growth polymerization reactions, Ziegler-Natta catalytic polymerization, and step-reaction polymerization; use of two different monomers to form copolymers through addition and/or block copolymerization.

In another non-limiting example, the PIL can be synthesized using a condensation polymerization to connect through functional groups such as amines and alcohols. In another example, the PIL can be synthesized using a crosslinking reaction.

In a specific example, the PIL can be synthesized by free radical polymerization of an imidazolium salt. Non-limiting examples include where the PIL is synthesized by free radical polymerization of one or more of: 1-vinyl-3-hexylimidazolium chloride, 1-vinyl-3-dodecylimidazolium bromide, and 1-vinyl-3-hexadecylimidazolium bromide.

In certain embodiments, the anionic group comprises one or more of: carboxylate, sulfate or sulfonate groups which may be substituted or unsubstituted, saturated or unsaturated, linear, branched, cyclic or aromatic.

In certain embodiments, the anionic group comprises an amino acid component, bis[(trifluoromethyl)sulfonyl]imide, or any anion containing i) fluorine groups and ii) primary, secondary, or tertiary amine groups. In a specific example, the anionic group comprises a taurate component.

In certain embodiments, the PILs have a solid/liquid transition temperature of about 400° C. or less.

In certain embodiments, the anionic component is exchanged through biphasic anion metathesis with one or more of the cationic components.

In another broad aspect, there is provided herein a solvent comprising: at least one PIL and having a solid/liquid transition temperature is about 400° C. or less and having a liquid range of about 200° C. or more.

In another broad aspect, there is provided herein a device useful in chemical separation or analysis comprising: a support and at least one PIL adsorbed, absorbed or immobilized thereon.

In another broad aspect, there is provided herein a device comprising one or more PILs functionalized to: (1) selectively extract one or more analytes of interest and to allow all other analytes to be removed so that one or more pre-concentrated analytes can be separated, identified and/or quantified; and/or (2) to selectively extract all other molecules so that the analyte(s) of interest can be removed from other molecules thereby allowing them to be separated, identified, and/or quantified.

In another broad aspect, there is provided herein a device comprising coated or immobilized polymeric ionic liquids for solid phase microextraction (SPME), wherein one or more PILs are used in neat polymeric form, or mixed with other ionic liquids or polymeric ionic liquids, solvents, other polymers, including but not limited to PDMS, PEG, silicone oils, or other chromatographic adsorbent materials.

In another broad aspect, there is provided herein a device comprising one or more PILs chemically adsorbed onto a fiber support or chemically attached by use of any chemical reaction mechanism.

In another broad aspect, there is provided herein a separation device comprising a support at least partially coated with one or more PILs.

In another broad aspect, there is provided herein a use of the separation device in one or more of: headspace extraction, direct-immersion extraction, or membrane protected SPME extraction.

One non-limiting example includes where the separation device can be coupled to gas chromatography (GC) in which one or more analytes are thermally desorbed in a GC injection port.

Another non-limiting example includes where the separation device can be coupled to HPLC in which a HPLC mobile phase or buffered component is used to desorb molecules from the support.

Another non-limiting example includes where the separation device can be coupled to capillary electrophoresis (CE) in which a running buffer from the CE is used to remove analytes from the support.

Another non-limiting example includes where one or more analytes to be separated can exist in any forms of matter (solids, liquids, and gases) and can be of any chemical component (small molecules, ions, synthetic or natural polymers, macromolecules, biomolecules).

Another non-limiting example includes where the separation device can be used for applications in Liquid-phase microextraction and single drop microextraction.

Non-limiting examples include one or more of the following: the solid support is packed in a chromatographic column; the solid support is a capillary column useful in gas chromatography; the device is used in solid phase microextraction (SPME).

In another broad aspect, there is provided herein a device comprising an ionic liquid (IL) polymerized on a surface of a solid support. In certain embodiments, the polymerized ionic liquid (PIL) is adaptable to desorption after exposure to one or more analytes.

In certain embodiments, the IL is polymerized by reaction of at least one free silanol group on the surface of a fused silica support with at least one vinyl-terminated organoalkoxysilane. In other embodiments, the IL comprises one or more of: vinyl-substituted IL monomers and/or crosslinkers, coated on the support with an initiator and heated to induce free radical polymerization. In a particular embodiment, wherein the initiator comprises 2,2'-azo-bis(isobutyronitrile) (AIBN).

In certain embodiments, the degree of crosslinking is modified to control the consistency of the formed polymer with lower degrees of crosslinking resulting in a gel-like material. Also, in certain embodiments, the degree of crosslinking is modified to control the consistency of the formed polymer with greater degrees of crosslinking resulting in a more rigid, plastic-like coating. In other embodiments, the degree of crosslinking is modified to influence one or more of: mechanism of partitioning, including adsorption versus absorption, and overall selectivity for targeted analyte molecules.

Also provided herein is a device configured for thermally desorbing analytes from the support. In certain embodiments, the device comprises a solvent desorption device coupled to a high performance liquid chromatography column (HPLC).

In another broad aspect, there is provided herein a separation device comprising an absorbent or absorbent coating comprised of at least one polymeric ionic liquid (PIL) coated onto a support.

In certain embodiments, the separation device can comprise one or more of the following: a stationary phase coating on the support; a stationary phase coating coatings for useful for microextractions; a coating for solid phase microextraction (SPME); a support comprising one or more of: a solid fused silica support, a stir bar, a fiber, a film, a membrane, a fibrous mat, a woven or non-woven material.

In another broad aspect, there is provided herein a method comprising mixing one or more PILs with one or more solvents to vary the viscosity and surface tension of the PIL. In certain embodiments, the method can further include allowing the PIL to be suspended from a microsyringe configured for sampling of one or more analyte.

In certain embodiments, at least one suspended drop is used to sample an analyte matrix (liquid, solid, or gas) and wherein the PIL is directly injected into a GC, HPLC, or CE or mixed with a solvent and then directly injected into GC, HPLC, or CE.

In certain embodiments, the analytes to be separated can exist in any forms of matter (solids, liquids, and gases) and can be of any chemical component, including, but not limited to small molecules, ions, synthetic or natural polymers, macromolecules, biomolecules.

In another broad aspect, there is provided herein a use of at least one IL and/or PIL in an extraction process.

In another broad aspect, there is provided herein a method for forming a solvent immiscible IL using an in-situ metathesis reaction.

In another broad aspect, there is provided herein a device for selective $CO_2$ absorbance, comprising at least one PIL on a support.

In another broad aspect, there is provided herein a device for sequestration of $CO_2$, comprising at least one PIL on a support.

In another broad aspect, there is provided herein a process of $CO_2$ capture, comprising using at least one PIL as described herein.

In certain embodiments, the process can include being reversible by heating the PIL to temperatures around 70-110° C.

In another broad aspect, there is provided herein a device comprising at least one PIL on a support, and capable of an on-support metathesis exchange of anions from an immobilized PIL absorbent material.

In certain embodiments, the PIL is at least partially crosslinked to allow swelling of the PIL for complete metathesis exchange.

In another broad aspect, there is provided herein a device for extraction of one or more of DNA, RNA, protein, nucleic acids, peptides, amino acids, cellular extracts and portions thereof, comprising at least one PIL on a support.

In another broad aspect, there is provided herein a carbon sequestration method, comprising bringing at least one of a reactant gas mixture including carbon dioxide contact with a polymerized ionic liquid (PIL) carbon sequestration catalyst at a temperature wherein a solid carbon deposit is formed at the surface of the PIL carbon sequestration catalyst.

In certain embodiments, the method can include use of one or more PILs which comprise: i) a cationic component comprised of an ionic liquid (IL) that is polymerized, and ii) one or more anionic components, wherein the anionic components can be the same or different.

In a particular embodiment, the method further includes recapturing sequestered $CO_2$ and reusing the PIL carbon sequestration catalyst.

In another broad aspect, there is provided herein a method of separating one chemical from a mixture of chemicals comprising the steps of: providing a mixture of at least one first and at least one second chemical; exposing the mixture to at least one solid support including at least one PIL adsorbed, absorbed or immobilized thereon; and, retaining at least a portion of the first chemical on the solid support for some period of time. This method can also include where the PIL comprises: i) a cationic component comprised of an ionic liquid (IL) that is polymerized, and ii) one or more anionic components, wherein the anionic components can be the same or different. In certain embodiments, the method further includes at least one IL liquid mixed with the PIL and wherein the mixture is immobilized on the solid support.

In certain embodiments, the solid support is a column and further comprising and wherein the mixture is passed through the column such that elution of the first chemical is prevented or delayed. In certain embodiments, the column is a capillary.

In certain embodiments, the mixture is carried in a gaseous mobile phase.

In another broad aspect, there is provided herein a method for producing an absorbent material for solid phase microextraction, comprising: polymerizing one or more ionic liquid (IL) monomers to produce a polymeric ionic liquid (PIL) material, and forming at least a partial coating of the PIL material on a support, wherein the PIL material substantially resists large viscosity drops with elevated temperatures, and exhibits thermal stability.

In certain embodiments, the PIL material comprises two or more polymeric ionic liquids. Also, in certain embodiments, one or more ionic liquid (IL) monomers can be used to synthesize the PIL using a free radical reaction.

In certain embodiments, the PIL material is capable of incorporating simultaneous solvation interactions, depending on the analytes being extracted.

In certain embodiments, the structural design of the PIL is selected in order to achieve high thermal stability.

In certain embodiments, the PIL comprises one or more of non-molecular ionic solvents, the solvent being comprised of at least one asymmetric cation paired with at least one anion.

In certain embodiments, the method can further include tuning one or more of chemical and physical properties of the PIL through one or more of: i) choice of the anion, and ii) modification of the cation structure. Non-limiting examples include: where the cation comprises one or more of: imidazolium-based monomers including functionalized imidazolium, pyridinium, triazolium, pyrrolidinium, ammonium. Other non-limiting examples include where the anion comprises one or more of: $Cl^-$, $Br^-$, $I^-$, bis[(trifluoromethyl)sulfonyl]imide, $PF_6^-$, $BF_4^-$, $CN^-$, $SCN^-$, taurate, and/or other amino acid groups.

In certain embodiments, the PIL is substantially free of residual halides following anion metathesis.

In certain embodiments, the PIL comprises one or more of: 1-vinyl-3-hexylimidazolium chloride; 1-vinyl-3dodecylimidazolium bromide, and 1-vinyl-3-hexadecylimidazolium bromide.

In certain embodiments, the method can further include forming a mixture of PIL and one or more extraction additives or phase modifiers that aid in selectively increasing extraction efficiency or promoting wetting of glass or metal substrates.

In certain embodiments, the extraction additives or phase modifiers comprise one or more of: micelles, monomer surfactants, cyclodextrins, nanoparticles, synthetic macrocycles, or other polymer aggregates.

In certain embodiments, the support comprises one or more of: fibers at least partially coated with at least one PIL; stir bar supports; walls of fused silica capillaries; small inner diameter fused silica supports.

In another broad aspect, there is provided herein a stationary phase microextraction material (SPME) for solid phase microextraction comprising one or more poly ionic liquids (PILs). In certain embodiments, the solid phase microextraction material can further include one or more of: a support at least partially coated with the polymeric ionic liquid; fibers at least partially coated with the polymeric ionic liquid; fibers that comprise small inner diameter fused silica fibers.

In certain embodiments, the solid phase microextraction material can include ionic liquids that are comprised of one or more of non-molecular ionic solvents comprised of bulky, asymmetric cations paired with one or more types of anions. In certain embodiments, one or more of chemical and physical properties of the PILs are capable of being tunable through choice of anion and/or modification of the cation structure.

In certain embodiments, the PIL coating material includes one or more extraction additives or phase modifiers that aid in selectively increasing the extraction efficiency or promoting wetting of glass or metal substrates. In certain embodiments, the extraction additives or phase modifiers comprise one or more of: micelles, monomer surfactants, cyclodextrins, nanoparticles, synthetic macrocycles, or other polymer aggregates.

In another broad aspect, there is provided herein a method for extraction of one or more samples, wherein the samples are solid, liquid, or gas comprising using a solid phase microextraction (SPME) material comprising one or more polymeric ionic liquids (PILs). In certain embodiments, the SPME material is capable of use in remote field analysis.

In certain embodiments, the solid phase microextraction material is amenable to hyphenation with gas chromatography (GC).

In another broad aspect, there is provided herein a method for producing an absorbent material for solid phase microextraction (SPME), comprising: polymerizing one or more ionic liquid monomers to produce a polymeric ionic liquid (PIL) absorbent material, and forming at least a partial coating of the PIL absorbent material on a support, wherein the PIL absorbent material resists large viscosity drops with elevated temperatures, and exhibits thermal stability. In certain embodiments, the PIL comprises two or more PILs. Also, in certain embodiments, one or more PILs are synthesized by a free radical reaction. In certain embodiments, the PIL absorbent material comprises one or more of nonmolecular ionic solvents comprised of bulky, asymmetric cations paired with at least one type of anion.

In certain embodiments, the method can further include tuning one or more of chemical and physical properties of the PIL through the choice of anion and/or modification of cation structure. In certain embodiments, the PIL absorbent material is capable of incorporating simultaneous solvation interactions, depending on the analytes being extracted. Also, in certain embodiments, the structural design of the PIL is selected in order to achieve high thermal stability. In particular embodiments, the PIL is substantially free of residual halides following anion metathesis. Non-limiting examples include where bis[(trifluoromethyl)sulfonyl]imide salts paired with large, bulky cations are used to produce PILs with thermal stability.

Other non-limiting examples include where the PIL comprise one or more of: imidazolium-based monomers including functionalized imidazolium, pyridinium, triazolium, pyrrolidinium, ammonium cations with anions including $Cl^-$, $Br^-$, $I^-$, bis[(trifluoromethyl)sulfonyl]imide, $PF_6^-$, $BF_4^-$, $CN^-$, $SCN^-$, taurate and/or amino acids.

In certain embodiments, the desorption temperature and desorption time are optimized to prolong the lifetime of the absorbent material.

In certain embodiments, the polymeric ionic liquids comprise one or more of: 1-vinyl-3-hexylimidazolium chloride;

1-vinyl-3-dodecylimidazolium bromide, and 1-vinyl-3-hexadecylimidazolium bromide.

In certain embodiments, the PIL absorbent material includes one or more extraction additives or phase modifiers that aid in selectively increasing the extraction efficiency or promoting wetting of glass or metal substrates.

In certain embodiments, the extraction additives or phase modifiers comprise one or more of: micelles, monomer surfactants, cyclodextrins, nanoparticles, synthetic macrocycles, or other polymer aggregates.

In certain embodiments, the support comprises one or more: fibers at least partially coated with the PIL material; stir bar supports; walls of fused silica capillaries; small inner diameter fused silica supports.

In certain embodiments, the polymeric ionic liquids comprise one or more of: 1-vinyl-3-hexylimidazolium chloride; 1-vinyl-3-dodecylimidazolium bromide, and 1-vinyl-3-hexadecylimidazolium bromide.

In certain embodiments, the solid phase microextraction material is amenable to hyphenation with high performance liquid chromatography (HPLC).

In another broad aspect, there is provided herein a use of PILs in developing one or more task-specific ionic liquids (TSILs) of microextraction coatings, chromatographic media, membrane systems, and chemical sensors.

In another broad aspect, there is provided herein a process for polymerizing an ionic liquid (IL), comprising: i) attaching a vinyl (or allyl) functional group on a ionic liquid molecule; and ii) transforming the composition of step i) into a polymer in which the unit of unsaturation is gone, thereby forming a linear polymer.

In another broad aspect, there is provided herein a process for polymerizing an ionic liquid salt comprising using one or more of: living polymerization, condensation polymerization, addition of at least one crosslinker to an IL monomer solution to form crosslinked or branched-type polymers.

In one aspect, there is described herein, the incorporation of ionic liquids (ILs) and/or polymeric ionic liquid (PILs) materials into analytical microextractions. Such incorporation allows for the determination of analyte partition coefficients between these materials and other solvents, as well as, provides for the development of new, highly tunable absorbent coatings.

Described herein is the use of polymeric ionic liquids (PIL) as a novel class of stationary phase coatings for solid phase microextraction. The polymerization of IL monomers produces materials that can be coated as thin films on supports, while resisting large viscosity drops with elevated temperatures and exhibiting exceptional thermal stability.

The long lifetime and high thermal stability of the PIL-based SPME coatings may provide them particular advantages in GC-MS applications involving highly selective ester and FAME extractions from complex matrices.

Among the advantages of the present method are: fast, solvent-free extraction and one step extraction; the concentration of analytes make SPME time efficient; the samples can be solid, liquid, or gas; the compact and portable nature of SPME allows for remote field analysis; and, the method is amenable to hyphenation with gas chromatography (GC) and high performance liquid chromatography (HPLC).

The structure of the IL monomer can be custom designed to incorporate a multitude of simultaneous solvation interactions depending on the analytes being extracted and the complexity of the matrix.

In addition, the ILs described herein possess high thermal stabilities thereby limiting the bleed of the phase during the desorption step at high GC injection port temperatures.

The highly tunable structure of the ILs described herein provides varied solvation properties allowing for the development of highly selective coatings.

The highly selective IL-based absorbent coatings described herein provide opportunities for task-specific microextractions possessing low detection limits. In addition, the lifetime of IL-based coatings described herein is favorably comparable to commercial coatings.

In another aspect, there is provided a novel use of polymeric ionic liquids (PILs) which can be generally described herein as non-molecular ionic solvents comprised of bulky, asymmetric cations paired with various anions. The chemical and physical properties of the PILs described herein are highly tunable through the choice of anion and modification of the cation structure.

In another broad aspect, there is provided herein a method of using ILs as absorbent coatings in solid phase microextraction (SPME). In particular, there are provided herein PILs that are useful as selective coatings for solid phase microextraction and for stir bar sorptive extraction.

In another aspect, there is provided herein the use of PILs as selective coatings for the extraction of such analytes as esters using solid phase microextraction.

In a particular aspect, the inventors herein now show that by polymerizing IL monomers to form polymeric ionic liquids (PILs), stable absorbent coatings are developed for the analysis of esters in red and white wines as well as for the extraction of benzene, toluene, ethyl benzene, and xylenes in gasoline.

The IL monomers and their polymeric analogs (PILs) described herein possess many unique properties and characteristics that make them particularly suitable as absorbent coatings for SPME. In one non-limiting example, PILs can be coupled with GC for the development of extraction methods for the analysis of such analytes as, for example, esters in red and white wines, as well as benzenes, toluenes, ethyl benzenes and xylenes (BTEX) compounds in gasoline.

The methods described herein exhibit good analyte recovery, linearity over a wide range of concentrations, high reproducibility, and good sensitivity. In addition, the sensitivity can be further enhanced through the use of smaller inner diameter fused silica supports allowing for thicker coatings.

These absorbent coatings have particular advantages in GC-MS applications due to the fact that PIL coatings exhibit long lifetimes, low levels of thermal bleed, and high selectivity.

Various objects and advantages of this invention will become apparent to those skilled in the art from the following detailed description of the preferred embodiment, when read in light of the accompanying drawings.

BRIEF DESCRIPTION OF THE DRAWINGS

FIG. 10: The vinyl-substituted ionic liquid (IL) monomer is prepared by the reaction of 1-vinylimidazole with the corresponding halo alkane followed by free radical polymerization to form the linear polymer.

FIG. 11: Metathesis anion exchange is used to exchange the halide anion with the NTf$^-$ anion.

FIGS. 13A-13D: Scanning electron micrographs of a 100 μm inner diameter bare fused silica support (FIG. 13A) and various angles of the fused silica support coated with the poly(ViDDIm$^+$ NTf$^-$) PIL (FIG. 13B), (FIG. 13C), and (FIG. 13D). The estimated film thickness is approximately 12-18 μm.

FIG. 14A: (+) methyl nonanoate, (●) hexyl butyrate, (■) methyl caprylate, (x) methyl enanthate, (▲) methyl caproate.

FIG. 14B: (□) methyl laurate, (Δ) methyl undecanoate, (◇) methyl decanoate, (-x-) hexyl tiglate, (-●-) furfuryl octanoate, (-+-) benzyl butyrate.

FIGS. 17A-17C: The calibration curves of 100 μm I.D. solid phase microextraction (SPME) fibers. FIG. 17D: The calibration curve of 50 μm I.D. SPME fiber.

FIG. 18: Chart showing figures of merit for PIL-based extractions in wine.

FIG. 19A: The sorption time profile. FIG. 19B: The calibration curves.

FIG. 19C: The gas chromatogram of BTEX in gasoline.

FIG. 21: Table 1 showing the correlation coefficient, sensitivity, and detection limit of esters and fatty acid methyl esters (FAMEs) in Milli-Q water extracted by headspace sampling using three PIL coated fibers.

FIG. 22: Table 2 showing the correlation coefficient, sensitivity, and detection limit of esters and FAMEs in Milli-Q water extracted by headspace sampling using three commercial fibers.

FIG. 23: Table 3 showing the figures of merit of calibration curves obtained for three PIL coated fibers in a synthetic wine solution.

FIG. 24: Table 4 showing the figures of merit of calibration curves obtained for two commercial fibers in a synthetic wine solution.

FIG. 25: Table 5 showing the recovery and reproducibility results for esters and FAMEs extracted from red wine at two calibration levels.

FIG. 26: Table 6 showing the recovery and reproducibility results for esters and FAMEs extracted from white wine at two calibration levels.

FIG. 29: Table 7 showing the correlation coefficient sensitivity, and detection limit of esters and FAMEs extracted by headspace sampling using a polymerized ionic liquid absorbent coating. Each calibration curve was constructed using a minimum of 10 different concentration levels.

FIGS. 32A-32B: Schematic illustration showing the formation of a thick (1.0 mm) (FIG. 32A) immobilized or crosslinked and (FIG. 32 B) coated ionic liquid layer on a glass stir bar support.

FIGS. 33A and 33B: Schematic illustration showing partitioning equilibria for an analyte (A) molecule in aqueous solution (S), headspace (H) and IL coated/immobilized on a solid support (IL): FIG. 33A: A system in which the IL is coated/immobilized on a fused silica support. FIG. 33B: A system using a glass stir bar support.

FIG. 39: Photograph showing BBIM-taurate before (right) and after (left) $CO_2$ exposure.

FIG. 40: Chart showing sorption data of BBIM-taurate (◇) and BBIM-NTf$_2$ (☐).

FIG. 41: Graph showing mole fraction and pressure for BBIM-taurate and BBIM-NTf$_2$

FIG. 46: Scanning electron micrograph of BBIM-taurate coated fiber before exposure to $CO_2$.

FIG. 47A and FIG. 47B: Scanning electron micrographs of BBIM-taurate coated fiber after exposure to $CO_2$.

FIG. 48: Scanning electron micrograph of BBIM-taurate coated fiber after desorption.

FIG. 52: Structures of the ILs and PIL used in the HS-SPME-GC method. IL (A) was used as high temperature solvent to solubilize the analytes in the study. PIL (B) was used as a SPME sorbent coating. IL (C) was used as a low bleed, highly selective stationary phase in GC.

DETAILED DESCRIPTION OF THE PREFERRED EMBODIMENT(S)

Figure 1:
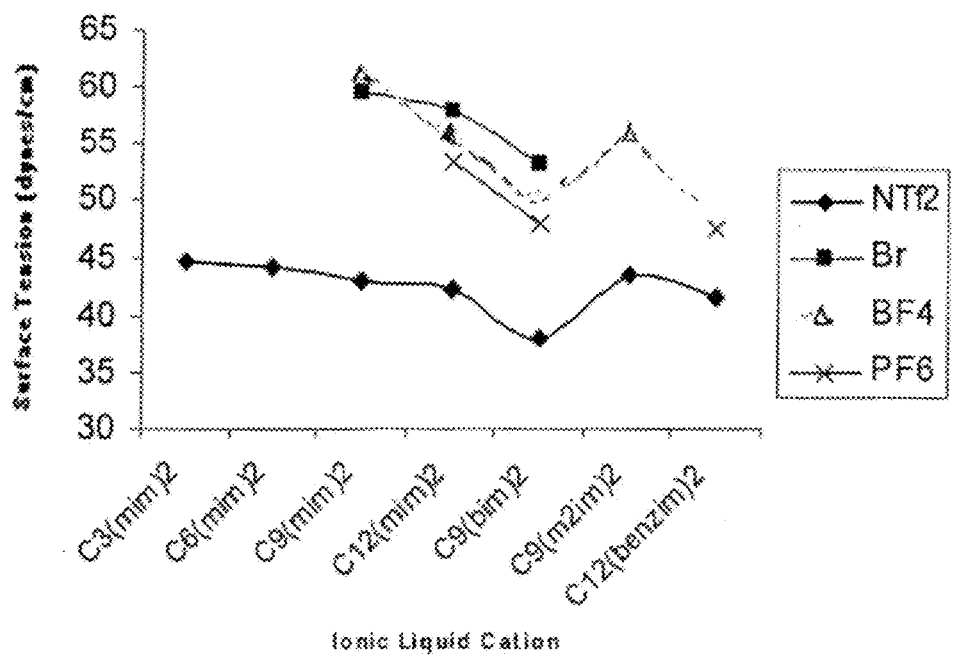
FIG. 1: Illustrates the effect of the cation and anion on the surface tension for dicationic ionic liquids.

To overcome the aforementioned challenges while retaining the unique solvation characteristics of ILs, the inventors herein now describe the development of polymeric ionic liquids (PILs). The inventors herein have now discovered that materials coated with such PILs do not need to be recoated after every extraction, possess exceptional thermal stability, highly reproducible extraction efficiencies, and long lifetimes.

In a broad aspect, there is provided herein a method for producing polymeric ionic liquids (PILs) using a free radical reaction. In certain embodiments, the ionic liquids (ILs) comprise one or more of non-molecular ionic solvents comprised of bulky, asymmetric cations paired with various anions.

In certain embodiments, the method further includes tuning one or more of the chemical and physical properties of ILs and/or PILs through the choice of anion and modification of the cation structure. The PIL materials are capable of incorporating simultaneous solvation interactions, depending on the analytes being extracted. Further, in certain embodiments, the structural design of the polymeric ionic liquid can be selected in order to achieve high thermal stability.

In certain embodiments, the PIL is substantially free of residual halides following anion metathesis.

In one example, bis[(trifluoromethyl)sulfonyl]imide salts paired with large, bulky cations are used to produce IL monomers with exceptional thermal stability.

In another example, the PILs can be comprised of one or more of: imidazolium-based monomers including functionalized imidazolium, pyridinium, triazolium, pyrrolidinium, ammonium cations with anions including, but not limited to: Cl—, Br—, I—, bis[(trifluoromethyl)sulfonyl]imide, PF6-, BF4-, CN—, SCN—. Further, in certain embodiments, the polymeric ionic liquids comprise one or more of: 1-vinyl-3-hexylimidazolium chloride; 1-vinyl-3-dodecylimidazolium bromide, and 1-vinyl-3-hexadecylimidazolium bromide.

Also provided herein is a method for producing an absorbent material for solid phase microextraction (SPME) which generally includes polymerizing ionic liquid monomers to produce an absorbent PIL material, and forming at least a partial coating of the absorbent PIL material on a support. The absorbent PIL material resists large viscosity drops with elevated temperatures, and exhibits thermal stability.

In certain embodiments, the IL and/or PIL absorbent coating material includes one or more extraction additives or phase modifiers that aid in selectively increasing the extraction efficiency or promoting wetting of glass or metal substrates.

In certain embodiments, the IL and/or PIL absorbent coating material can include one or more of: micelles, monomer surfactants, cyclodextrins, nanoparticles, synthetic macrocycles, or other polymer aggregates as extraction additives or phase modifiers that aid in selectively increasing the extraction efficiency or promoting wetting of glass or metal substrates. Further, in certain embodiments, the desorption temperature and/or desorption time can be optimized to prolong the lifetime of the coating material.

In certain embodiments, the support comprises one or more fibers at least partially coated with the PIL absorbent material. In certain embodiments, the support comprises one or more stir bar supports. In certain embodiments, the support comprises one or more walls of fused silica capillaries. In certain embodiments, the support comprises small inner diameter fused silica supports.

In another broad aspect, there is provided herein a method extraction of one or more samples where the samples are solid, liquid, or gas comprising using the PIL SPME as described herein. For example, in certain embodiments, such PIL SPME materials are capable of use in remote field analysis. Also, in certain embodiments, the PIL SPME materials are amenable to hyphenation with gas chromatography (GC).

The present invention is further defined in the following Examples, in which all parts and percentages are by weight and degrees are Celsius, unless otherwise stated. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various usages and conditions. All publications, including patents and non-patent literature, referred to in this specification are expressly incorporated by reference herein.

Example A—Diionic Salts

A "diionic salt" or "DIS" is a salt formed between a dication as described herein and a dianion or two anions or between a dianion as described herein and a dication or two cations. This term is not meant to embrace a single species that has a +2 or −2 charge such as $Mg^{+2}$ or $SO_4^{-2}$. Rather it contemplates a single molecule with two discreet mono-ionic groups, usually separated by a bridging group. The two ionic species should be of the same charge. T hey may be different types of groups or the diionic liquid salts may be "geminal" which means both ionic groups are not only the same charge, but also the same structure. The counterions need not be identical either. In one embodiment, either the diion or the salt forming species is chiral, having at least one stereogenic center. In such instances, the diionic liquid salts may be racemic (or in the case of diastereomers, each pair of enantiomers is present in equal amounts) or they may be optically enhanced. "Optically enhanced" in the case of enantiomers means that one enantiomer is present in an amount which is greater than the other. In the case of diastereomers, at least one pair of enantiomers is present in a ratio of other than 1:1. Indeed, the diionic liquid salts may be "substantially optically pure" in which one enantiomer or, if more than one stereogenic center is present, at least one of the pairs of enantiomers, is present in an amount of at least about 90% relative to the other enantiomer. The diionic liquid salts of the invention may also be optically pure, i.e., at least about 98% of one enantiomer relative to the other. Usually, the term diionic salt is used to describe a salt molecule, although, as the context suggests, it may be used synonymously with "diionic liquid" ("DIL") and "diionic liquid salt" (DILS"). A "diionic liquid" or "DIL" in accordance with the present invention is a liquid comprised of diionic salts. Thus, sufficient DS molecules are present such that they exist in liquid form at the temperatures indicated herein. This presumes that a single DS molecule is not a liquid. A DL is either a dicationic ionic liquid or a dianionic ionic liquid (a liquid comprising either dicationic salts or dianionic salts as described herein). A "dicationic ionic liquid" (used synonymously with "liquid salts of a dication") in accordance with the present invention is a liquid comprised of molecules which are salts of dicationic species. The salt forming counter-anions may be mono-ionic such as, for example only, Br—, or dianionic, such as, again for example only, succinic acid. Any dicationic ionic liquid which is stable and has a solid/liquid transformation temperature of 400° C. or less is contemplated. The same is true for "dianionic ionic liquids" also known as "liquid salts of a dianion," except the charges are reversed. Dicationic liquids and dianionic liquids can also be referred to herein as diionic liquid salts ("DILS" or "DCLS" and "DALS" depending upon charge).

Preferably, a dicationic ionic liquid or dianionic ionic liquid will not substantially decompose or volatilize (or remain substantially non-volatile) as measured by being immobilized as a thin film in a fused silica capillary or on a silica solid support as described herein, at a temperature of 200° C. or less. "Substantially" in this context means less than about 10% by weight will decompose or volatilize at 200° C. inside a capillary over the course of about one hour. Moreover, the dicationic ionic liquid in accordance with this embodiment will preferably have either a solid/liquid transformation temperature at about 100° C. or less or a liquid range (the range of temperatures over which it is in a liquid form without burning or decomposing) of at least 200° C.

In another embodiment, these dicationic ionic liquids will have both a solid/liquid transformation temperature at about 100° C. or less and a liquid range of at least 200° C.

In another aspect of the invention, a dicationic ionic liquid will not substantially volatilize or decompose, as discussed herein, at a temperature of less than about 300° C. "Substantially" in this context means that less than about 10% by weight will decompose or volatilize at 300° C. inside a capillary over the course of about one hour. Moreover, the dicationic ionic liquids in accordance with this embodiment will preferably have either a solid/liquid transformation temperature at 25° C. or less. In another embodiment, the dicationic ionic liquids will also have a liquid range of at least 200° C. In an even more preferred aspect of the invention, the liquid range will be 300° C. or above.

Preferably, a dianionic ionic liquid will not substantially decompose or volatilize as measured by being immobilized as a thin film in a fused silica capillary as described herein, at a temperature of 200° C. or less. Moreover, the dianionic ionic liquid in accordance with this embodiment will preferably have either a solid/liquid transformation temperature at about 100 C or less or a liquid range of at least 200° C.

In another embodiment, these dianionic ionic liquids will have both a solid/liquid transformation temperature at about 100° C. or less and a liquid range (diionic molecule is stable over the entire temperature range) of at least 200° C.

In another aspect of the invention, a dianionic ionic liquid will not substantially volatilize or decompose, as discussed herein, at a temperature of less than about 300° C. Moreover, the dianionic ionic liquids in accordance with this embodiment will preferably have either a solid/liquid transformation temperature at about 25° C. or less. In another embodiment, the dianionic ionic liquids will also have a liquid range of at least 200° C. In an even more preferred aspect of the invention, the liquid range will be 300° C. or above.

Thus a diionic liquid in accordance with the present invention is either a dicationic ionic liquid salt or a dianionic ionic liquid salt which will neither substantially decompose nor substantially volatilize, as measured as described herein, as a temperature of 200° C. or less and will have a temperature of solid/liquid transformation temperature at 100° C. or a liquid range of at least 200° C.

In other aspects of the invention, these diionic liquids will have both solid/liquid transformation temperature at about 100° C. or more and a liquid range of at least 200° C.

In other embodiments in accordance with the present invention, the diionic liquids, either dicationic ionic liquids or dianionic ionic liquids will be stable, that is not substantially volatilized or decomposed, as discussed herein, at a temperature of less than about 300° C. and will have a solid/liquid transformation temperature at about 25° C. or less. A particular preferred embodiment of this aspect of the present invention, the diionic liquids will have a liquid range of at least 200° C. and even more preferably at least 300° C. Any diionic compound which can form a stable liquid salt that meets the broadest parameters is contemplated.

In another embodiment, the present invention provides a stable diionic liquid comprising at least one liquid salt of dianionic molecule or dicationic molecule of the structure of formula I or II: C-A-B-A' (I) or C'-A-B-A'-C" (II) wherein A and A' are ether both anions or both cations, or are both groups which overall have an anionic or cationic charge and which may be the same or different, so long as they both have the same charge (positive of negative); B is a bridging group (also referred to as a chain or bridging moiety) that may be substituted or unsubstituted, saturated or unsaturated, aliphatic, including straight or branched chains, cyclic or aromatic, and which may contain, in addition to carbon atoms and hydrogen, N, O, S and Si atoms; and C, C' and C" are counter ions having a charge which is opposite that of A and A'. C' and C" are ether both mono-anionic or mono-cationic or groups which have a single anionic or cationic charge and may be the same or different so long as they both have the same charge (positive or negative) and C is ether dianionic or dicationic or contains two groups which each have a single anionic or cationic charge.

In another embodiment, A and A' are cationic and are, without limitation, substituted or unsubstituted, saturated or unsaturated, aliphatic including straight or branched chain, cyclic or aromatic, quaternary ammonium, protonated tertiary amine, phosphonium or arsonium groups. When A and A' are cationic, C' and C" are anionic counterions which, without limitation, include halogens, mono-carboxylates mono-sulfonates, mono-sulphates, $NTf_2^-$, $BF_4^-$, triflates or $PF_6^-$, and C is a dianionic molecule having two anionic groups each selected from, without limitation, carboxylate, sulfate or sulfonate groups. In another embodiment, A and A' are anionic and are, without limitation, substituted or unsubstituted, saturated or unsaturated, aliphatic including straight or branched chain, cyclic or aromatic, carboxylates, sulfonates, and sulphates. When A and A' anionic, C' and C" are cationic counterions which, without limitation, include quaternary ammonium, protonated tertiary amine, phosphonium or arsonium groups. C is a dicationic molecule which can be, without limitation, a compound having two cationic groups each selected from quaternary ammonium, protonated tertiary amine, phosphonium or arsonium groups. In another embodiment, these dianionic ionic liquids will have both a temperature of solid/liquid transformation of about 100° C. or less and a liquid range of at least 200.degree. C. In a particularly preferred embodiment, these liquid salts of formula I or II have a solid/liquid transition temperature of from about 100° C. or less and/or a liquid range of 200° C. or more and/or are substantially non-volatile and non-decomposable at temperatures below 200° C.

Typically, the structural considerations for diionic liquids are the same whether they are dianionic ionic liquids or dicationic ionic liquids. First, the diionic liquids will include a diionic species, either a dianionic or a dicationic molecule. The ionic species are normally separated by a chain or bridging moiety or group as discussed herein. Any anion or cation which can provide a dianionic ionic liquid or dicationic ionic liquid is contemplated. These include those that are identified above as A and A'. Possible cations include, without limitation, quaternary ammonium $(-N(R)_4)^+$, protonated tertiary amines $(-N(R)_3H)^+$, phosphonium and arsonium groups. These groups can be aliphatic, cyclic, or aromatic. Examples of aliphatic ammonium dications are found in EXAMPLE A—Table 2 and examples aromatic ammonium dications are found in EXAMPLE A—Table 1. Anions may include, for example, carboxylates, sulphonates, or sulphonates. Examples of a dicarboxylic acid dianion include, without limitation, succinic acid, nonanedioic acid, and dodecanedioic acid. Other non-limiting examples of diionic species (dianions an dications including a generic bridging group) include:

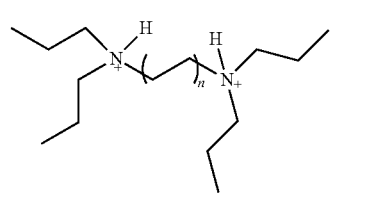

Protonated tertiary amine

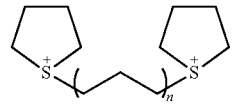

Tetrahydrothiophenium

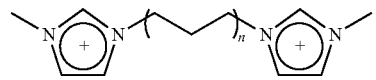

Imidazolium

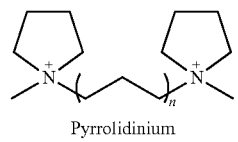

Pyrrolidinium

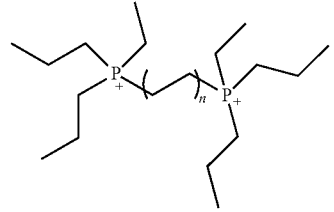

Phosphonium

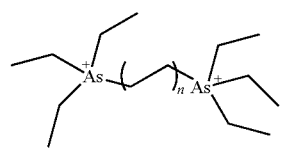

Arsonium

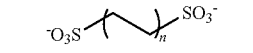

linear-terminal sulfonate groups

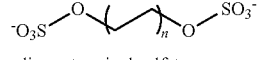

linear-terminal sulfate groups

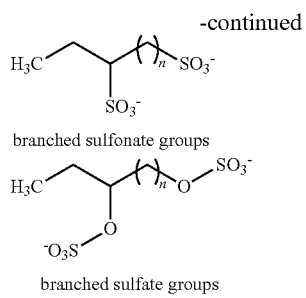

branched sulfonate groups branched sulfate groups

The value of n is discussed in connection with the length of the bridging group. In addition, hybrid dianions and dications are contemplated. Thus, for illustration only, a dication can be composed of a quaternary ammonium group and an arsonium group and a dianion can be composed of a carboxylate group and a sulphonate. The counter ions may also be different from each other.

The bridging group or chain interposed between the two ionic species can be any length or any composition which affords a diionic liquid of suitable properties. These include the groups identified as B above. There are certain factors that should be considered in selecting such a chain or bridging moiety. First, the larger the diionic molecule in general, the greater the chance that the melting point or temperature of solid/liquid transformation will be elevated. This may be less of a concern where the liquid range need not be extensive and the temperature of solid/liquid transformation need not be terribly low. If, however, one desires a liquid range of about 200° C. or more and/or a solid/liquid transformation temperature at 100° C. or less, the size of the overall molecule can become a larger and larger factor. Second, the chain should have some flexibility. An excessive degree of unsaturated groups, the use of very rigid and/or sterically bulky groups can adversely impact the ability of the resulting materials to act as solvents and reduce their overall and utility. Thus, multiple fused ring structures, such as those found in, for example, cholesterol, and polyunsaturated aliphatic groups with extensive unsaturation should generally be avoided.

In general, the length of the bridging group can range from a length equivalent to that of a saturated aliphatic carbon chain of between about 2 and about 40 carbon atoms (e.g., n=$C_2$-$C_{40}$ when bridging group is composed of carbon). More preferably, the length should be approximately that resulting from a saturated aliphatic carbon chain of about 3 to about 30 carbon atoms in length.

The chain or bridging group may be aliphatic, cyclic, or aromatic, or a mixture thereof. It may contain saturated or unsaturated carbon atoms or a mixture of same with, for example, alkoxy groups (ethoxy, propoxy, isopropoxy, butoxy, and the like). It may also include or be made completely from alkoxy groups, glycerides, glycerols, and glycols. The chain may contain hetero-atoms such as O, N, S, or Si and derivatives such as siloxanes, non-protonated tertiary amines and the like. The chain may be made from one or more cyclic or aromatic groups such as a cyclohexane, a immidazole, a benzene, a diphenol, a toluene, or a xylene group or from more complex ring-containing groups such as a bisphenol or a benzidine. These are merely representative and are not meant to be limiting. Generally, however, the bridging group will not contain an ionically charged species, other than the dianions or dications.

The diionic liquids of the present invention are generally salts, although they may exist as ions (+1, −1, +2, −2) in certain circumstances. Thus, in most instances, each ion should have a counterion, one for each anion or cation. Charge should be preserved. In the case of a dianionic ionic liquid, two cations (including those identified as C' or C") (or one dication) (including those identified as C) are required and in the case of a dicationic ionic liquid, two anions (including those identified as C' or C") (or one dianion) (including those identified as C) are required. The choice of anion can have an effect of the properties of the resulting compound and its utility as a solvent. And, while anions and cations will be described in the context of a single species used, it is possible to use a mixture of cations to form salts with a dianionic species to form a dianionic ionic liquid. The reverse is true for dications. For clarity sake, the salt-forming ions will be referred to as counterions herein.

Cationic counterions can include any of the dicationic compounds previously identified for use in the production of dicationic ionic liquids. In addition, monoionic counterparts of these may be used. Thus, for example, quaternary ammonium, protonated tertiary amines, phosphonium, and arsonium groups are useful as cationic counterions for dianionic molecules to form dianionic ionic liquids in accordance with the present invention.

Similarly, anionic counterions can be selected from any of the dianionic molecules discussed herein useful in the creation of dianionic ionic liquids. These would include dicarboxylates, disulphonates, and disulphates. The corresponding monoionic compounds may also be used including carboxylates, sulphonates, sulphates and phosphonates. Halogens may be used as can triflate, $NTf_2^-$, $PF_6^-$, $BF_4^-$ and the like. The counterions should be selected such that the diionic liquids have good thermal and/or chemical stability and have a solid/liquid transformation temperature and/or a liquid range as described herein. Finally, the ionic groups of the present invention can be substituted or unsubstituted. They may be substituted with halogens, with alkoxy groups, with aliphatic, aromatic, or cyclic groups, with nitrogen-containing species, silicon-containing species, with oxygen-containing species, and with sulphur-containing species. The degree of substitution and the selection of substituents can influence the properties of the resulting material as previously described in discussing the nature of the bridge or chain. Thus, care should be taken to ensure that excessive steric hindrance and excessive molecular weight are avoided, that resulting materials does not lose its overall flexibility and that nothing will interfere with the ionic nature of the two ionic species.

The diionic liquids of the present invention can be used in pure or in substantially pure form as carriers or as solvents. "Substantially" in this context means no more than about 10% of undesirable impurities. Such impurities can be either other undesired diionic salts, reaction by-products, contaminants or the like as the context suggests. In an intended mixture of two or more DILS, neither would be considered an impurity. Because they are non-volatile and stable, they can be recovered and recycled and pose few of the disadvantages of volatile organic solvents. Because of their stability over a wide liquid range, in some instances over 400° C., they can be used in chemical synthesis that require both heating and cooling. Indeed, these solvents may accommodate all of the multiple reaction steps of certain chemical syntheses. Of course, these diionic liquids may be used in solvent systems with cosolvents and gradient solvents and these solvents can include, without limitation, chiral ionic liquids, chiral non-ionic liquids, volatile organic solvents, non-volatile organic solvents, inorganic solvents, water, oils, etc. It is also possible to prepare solutions, suspensions, emulsions, colloids, gels and dispersions using the diionic liquids.

In addition to discrete diionic salts and diionic liquid salts, it is also possible to produce polymers of these materials. Polymers may include the diionic salts within the backbone or as pendant groups and they may be cross-linked or non-cross-linked.

In addition to being useful as solvents and reaction solvents, the dianionic liquids of the present invention can be used to perform separations as, for example, the stationary phase for gas-liquid chromatography. Dicationic ionic liquid salts, which may be used for exemplification include: (1) two vinyl imidazolium or pyrrolidinium dications separated by an alkyl linkage chain (of various length) or (2) one vinyl imidazolium or pyrrolidinium cation separated an alkyl linkage chain (of various length) and connected to a methyl, ethyl, propyl, or buylimidazolium cation or a methyl, ethyl, propyl, or butylpyrrolidinium cation. See below. Any anionic counterion discussed may be used. Note that the presence of unsaturated groups facilitates cross-linking and/or immobilization.

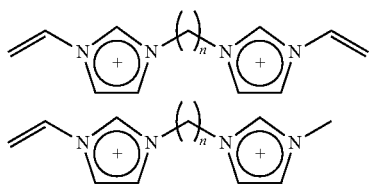

Dianionic anions can also be used with either monocations or dications to form a variety of different ionic liquid combinations. When a dication is used, anyone is used as charge balance must be preserved. The dianionic anions can be of the dicarboxylic acid type (i.e., succinic acid, nonanedioic acid, dodecanedioic acid, etc), as shown below.

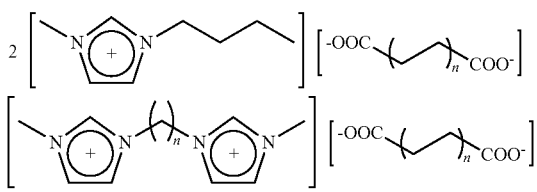

Diionic liquid salts can be coated on a capillary (or solid support) and optionally, subsequently polymerized and/or cross-linked by, for example, two general methods. In the first method, the ionic liquid are coated via the static coating method at 40° C. using coating solution concentrations ranging from 0.15-0.45% (w/w) using solutions of methylene chloride, acetone, ethyl acetate, pentane, chloroform, methanol, or mixtures thereof. After coating of the ionic liquid is complete, the column is purged with helium and baked up to 100° C. The efficiency of naphthalene is then evaluated to examine the coating efficiency of the monomer ionic liquid stationary phase. If efficiency is deemed sufficient, the column is then flushed with vapors of azo-tert-butane, a free radical initiator, at room temperature. After flushing with the vapors, the column is then fused at both ends and heated in an oven using a temperature gradient up to 200° C. for 5 hours. The column gradually cooled and then re-opened at both ends, and purged with helium gas.

After purging with helium gas overnight, the column is then heated and conditioned up to 200° C. After conditioning, the column efficiency is then examined using naphthalene at 100° C. and the stationary phase coated layer examined under a microscope. Note that the cross-linking process can, and often does, also cause immobilization "Immobilized" in the context of the invention means covalently or ionically bound to a support or to another ionic liquid (including diionic liquid salts) or both. This is to be compared with ionic liquids which may be absorbed or adsorbed on a solid support. Solid support in these particular instances were intended to include columns.

It is not necessary, however, to cross-link these materials prior to their use in GC. They may be adsorbed or absorbed in a column, or indeed on any solid support. However, at higher temperatures, their viscosity may decrease and they can, in some instances, flow and collect as droplets which can change the characteristics of the column.

Another method involves adding up to 2% of the monomer weight of 2,2'-azobisisobutyronitrile ("AIBN") free radical initiator to the coating solution of the monomer. The capillary column is then filled with this solution and coated via the static coating method. After coating, the capillary column is then sealed at both ends and placed in an oven and conditioned up to 200° C. for 5 hours. The column is gradually cooled and then re-opened at both ends, and purged with helium gas. After purging with helium gas overnight, the column is then heated and conditioned up to 200° C. After conditioning, the column efficiency is then examined using naphthalene at 100° C. and the stationary phase coated layer examined under a microscope.

In addition to the free radical polymerization of an alkene, other polymerization reactions involving other functional groups either attached to the aromatic ring of the cation, the linkage chain connecting two cations (to form a dication), or the anion can be achieved. Examples of such reactions may include cationic and anionic chain growth polymerization reactions, Ziegler-Natta catalytic polymerization, and step-reaction polymerization. The use of two different monomers to form copolymers through addition and block copolymerization can also be achieved. Additionally, condensation polymerization can be used to connect through functional groups such as amines and alcohols. All polymerization and cross-linking reactions discussed in the following 2 references can be used: "Comprehensive Polymer Science—The synthesis, Characterization, Reactions and Applications of Polymers" by Sir Geoffrey Allen, FRS; "Comprehensive Organic Transformations: a guide to functional group preparations" by Richard C. Larock. 2nd Edition. Wiley-VCH, New York. Copyright, 1999. ISBN: 0471190314.

The production of these 39 dicationic liquid: are described. The following materials were used: 1-methylimidazole; 1-methylpyrrolidine; 1-butylpyrrolidine; 1,2-dimethylimidazole; 1-butylimidazole; 1-benzylimidazole; 1,3-dibromopropane; 1,6-dibromohexane; 1,9-dibromononane; 1,12-dibromododecane; 1-bromo-3-chloropropane; hexafluorophosphoric acid, sodium tetrafluoroborate, N-lithiotrifluoromethylsulfonimide, silver nitrate, and phosphorus pentoxide were all purchased from Aldrich (Milwaukee, Wis.). Hexafluorophosphoric acid is toxic and corrosive and must be handled with care. Acetone, ethyl acetate, and 2-propanol were purchased from Fisher Scientific (Fair Lawn, N.J.). Untreated fused silica capillary tubing (0.25-mm i.d.) was purchased from Supelco (Bellefonte, Pa.).

The following diionic salts may be produced. (See Tables 1, 2 and 3.)

TABLE 1

Physicochemical properties of imidazolium-based dicationic ionic liquids[a]

| # | Ionic Liquid | Molecular Weight (g/mol) | Surface Tension (dynes/cm) | Density (g/cm$^3$) | Temperature of[b] Solid/Liquid Transformation (° C.) | Refractive Index | Miscibility with Heptane | Miscibility with Water |
|---|---|---|---|---|---|---|---|---|
| 1 | $C_3(mim)_2$-Br | 366.10 | — | — | 162[c] | — | Immiscible | Miscible |
| 2 | $C_3(mim)_2$-NTf$_2$ | 766.58 | 44.7 | 1.61 | −4 | 1.440 | Immiscible | Immiscible |
| 3 | $C_3(mim)_2$-BF$_4$ | 379.90 | — | — | 117 | — | Immiscible | Miscible |
| 4 | $C_3(mim)_2$-PF$_6$ | 496.22 | — | — | 131 | — | Immiscible | Immiscible |
| 5 | $C_6(mim)_2$-Br | 408.18 | — | — | 155 | — | Immiscible | Miscible |
| 6 | $C_6(mim)_2$-NTf$_2$ | 808.66 | 44.2 | 1.52 | >−14, <−4 | 1.441 | Immiscible | Immiscible |
| 7 | $C_6(mim)_2$-BF$_4$ | 421.98 | — | — | 92 | — | Immiscible | Miscible |
| 8 | $C_6(mim)_2$-PF$_6$ | 538.30 | — | — | 136 | — | Immiscible | Immiscible |
| 9 | $C_9(mim)_2$-Br | 450.26 | 59.6 | 1.41 | 6 | 1.549 | Immiscible | Miscible |
| 10 | $C_9(mim)_2$-NTf$_2$ | 850.74 | 43.1 | 1.47 | −14 | 1.442 | Immiscible | Immiscible |
| 11 | $C_9(mim)_2$-BF$_4$ | 464.06 | 61.2 | 1.33 | −4 | 1.469 | Immiscible | Miscible |
| 1 | $C_3(mim)_2$-Br | 366.10 | — | — | 162[c] | — | Immiscible | Miscible |
| 2 | $C_3(mim)_2$-NTf$_2$ | 766.58 | 44.7 | 1.61 | −4 | 1.440 | Immiscible | Immiscible |
| 3 | $C_3(mim)_2$-BF$_4$ | 379.90 | — | — | 117 | — | Immiscible | Miscible |
| 4 | $C_3(mim)_2$-PF$_6$ | 496.22 | — | — | 131 | — | Immiscible | Immiscible |
| 5 | $C_6(mim)_2$-Br | 408.18 | — | — | 155 | — | Immiscible | Miscible |
| 6 | $C_6(mim)_2$-NTf$_2$ | 808.66 | 44.2 | 1.52 | >−14, <−4 | 1.441 | Immiscible | Immiscible |
| 7 | $C_6(mim)_2$-BF$_4$ | 421.98 | — | — | 92 | — | Immiscible | Miscible |
| 8 | $C_6(mim)_2$-PF$_6$ | 538.30 | — | — | 136 | — | Immiscible | Immiscible |
| 9 | $C_9(mim)_2$-Br | 450.26 | 59.6 | 1.41 | 6 | 1.549 | Immiscible | Miscible |
| 10 | $C_9(mim)_2$-NTf$_2$ | 850.74 | 43.1 | 1.47 | −14 | 1.442 | Immiscible | Immiscible |
| 11 | $C_9(mim)_2$-BF$_4$ | 464.06 | 61.2 | 1.33 | −4 | 1.469 | Immiscible | Miscible |
| 12 | $C_9(mim)_2$-PF$_6$ | 580.38 | — | — | 88 | — | Immiscible | Immiscible |
| 13 | $C_{12}(mim)_2$-Br | 492.34 | 57.9 | 1.27 | −17 | 1.540 | Immiscible | Miscible |
| 14 | $C_{12}(mim)_2$-NTf$_2$ | 892.82 | 42.3 | 1.40 | −26 | 1.443 | Immiscible | Immiscible |
| 15 | $C_{12}(mim)_2$-BF$_4$ | 506.14 | 55.8 | 1.26 | −19 | 1.503 | Immiscible | Partially Miscible |
| 16 | $C_{12}(mim)_2$-PF$_6$ | 622.46 | 53.4 | 1.36 | 9 | 1.436 | Immiscible | Immiscible |
| 17 | $C_9(bim)_2$-Br | 534.42 | 53.1 | 1.27 | >0, <23 | 1.545 | Immiscible | Miscible |
| 18 | $C_9(bim)_2$-NTf$_2$ | 934.90 | 38.0 | 1.35 | >−42, <−8 | 1.446 | Immiscible | Immiscible |
| 19 | $C_9(bim)_2$-BF$_4$ | 548.22 | 50.4 | 1.20 | >−42, <−8 | 1.503 | Immiscible | Partially Miscible |
| 20 | $C_9(bim)_2$-PF$_6$ | 664.54 | 48.0 | 1.30 | >0, <23 | 1.439 | Immiscible | Immiscible |
| 21 | $C_3(m_2im)_2$-Br | 394.15 | — | — | 298 | — | Immiscible | Miscible |
| 22 | $C_3(m_2im)_2$-NTf$_2$ | 794.63 | — | — | 91 | — | Immiscible | Immiscible |
| 23 | $C_3(m_2im)_2$-PF$_6$ | 524.27 | — | — | 264 | — | Immiscible | Immiscible |
| 24 | $C_9(m_2im)_2$-Br | 478.31 | — | — | 174 | — | Immiscible | Miscible |
| 25 | $C_9(m_2im)_2$-NTf$_2$ | 878.79 | 43.5 | 1.47 | >−42, <−8 | 1.448 | Immiscible | Immiscible |
| 26 | $C_9(m_2im)_2$-BF$_4$ | 492.11 | 58.1 | 1.31 | >0, <23 | 1.456 | Immiscible | Miscible |
| 27 | $C_9(m_2im)_2$-PF$_6$ | 608.43 | — | — | 130 | — | Immiscible | Immiscible |
| 28 | $C_{12}(benzim)_2$-Br | 644.53 | — | — | 151 | — | Immiscible | Immiscible |
| 29 | $C_{12}(benzim)_2$-NTf$_2$ | 1045.01 | 41.5 | 1.37 | >−8, <0 | 1.482 | Immiscible | Immiscible |
| 30 | $C_{12}(benzim)_2$-PF$_6$ | 774.65 | 47.4 | 1.27 | −15 | 1.484 | Immiscible | Immiscible |

[a]Patents pending
[b]Difficulty arises in determining the melting points of some ionic liquids as they prefer the glass-state. Therefore, for some ionic liquids in which the exact melting point/glass transition temperature could not be easily determined, a temperature range is provided. A detailed discussion related to the polymorphic nature of many of these ionic liquids is provided in the section titled "Crystal Structures of Geminal Dicationic Ionic Liquids"
[c]This ionic liquid exhibited physico-chemical properties very similar to the 1-butyl-3-methylimidazolium chloride ionic liquid making it difficult to fully characterize.

TABLE 2

Physicochemical properties of pyrrolidinium-based dicationic ionic liquids[a]

| # | Ionic Liquid | Molecular Weight (g/mol) | Surface Tension (dynes/cm) | Density (g/cm$^3$) | Temperature of[b] Solid/Liquid Transformation (° C.) | Refractive Index | Miscibility with Heptane | Miscibility with Water |
|---|---|---|---|---|---|---|---|---|
| 31 | $C_3(mpy)_2$-Br | 372.18 | — | — | 51[c] | — | Immiscible | Miscible |
| 32 | $C_3(mpy)_2$-NTf$_2$ | 772.67 | — | — | 206 | — | Immiscible | Immiscible |
| 33 | $C_3(mpy)_2$-PF$_6$ | 502.30 | — | — | 359 | — | Immiscible | Immiscible |
| 34 | $C_9(mpy)_2$-Br | 456.34 | — | — | 257 | — | Immiscible | Miscible |
| 35 | $C_9(mpy)_2$-NTf$_2$ | 856.83 | 42.2 | 1.41 | >−8, <0 | 1.436 | Immiscible | Immiscible |
| 36 | $C_9(mpy)_2$-PF$_6$ | 586.46 | — | — | 223 | — | Immiscible | Immiscible |
| 37 | $C_9(bpy)_2$-Br | 540.50 | — | — | 216 | — | Immiscible | Miscible |

TABLE 2-continued

Physicochemical properties of pyrrolidinium-based dicationic ionic liquids[a]

| # | Ionic Liquid | Molecular Weight (g/mol) | Surface Tension (dynes/cm) | Density (g/cm³) | Temperature of[b] Solid/Liquid Transformation (° C.) | Refractive Index | Miscibility with Heptane | Miscibility with Water |
|---|---|---|---|---|---|---|---|---|
| 38 | $C_9(bpy)_2$-$NTf_2$ | 940.98 | — | — | 84 | — | Immiscible | Immiscible |
| 39 | $C_9(bpy)_2$-$PF_6$ | 670.62 | — | — | 249 | — | Immiscible | Immiscible |

[a]Patents pending

[b]Difficulty arises in determining the melting points of some ionic liquids as they prefer the glass-state. Therefore, for some ionic liquids in which the exact melting point/glass transition temperature could not be easily determined, a temperature range is provided. A detailed discussion related to the polymorphic nature of many of these ionic liquids is provided in the section titled "*Crystal Structures of Geminal Dicationic Ionic Liquids*"

[c]This ionic liquid exhibited physico-chemical properties very similar to the 1-butyl-3-methylimidazolium chloride ionic liquid making it difficult to fully characterize.

TABLE 3

Imidazolium-based Dicationic Ionic Liquids

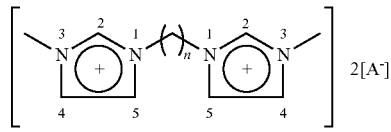

A = Br⁻, $NTf_2^-$, $BF_4^-$, $PF_6^-$
n = 3, $C_3(mim)_2$-A
n = 6, $C_6(mim)_2$-A
n = 9, $C_9(mim)_2$-A
N = 12, $C_{12}(mim)_2$-A

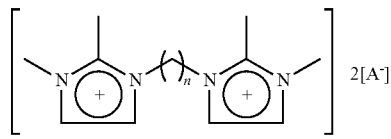

A = Br⁻, $NTf_2^-$, $BF_4^-$, $PF_6^-$
n = 3, $C_3(m_2im)_2$-A
n = 9, $C_9(m_2im)_2$-A

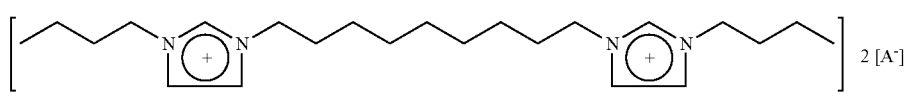

A = Br⁻, $NTf_2^-$, $BF_4^-$, $PF_6^-$
$C_9(bim)_2$-A

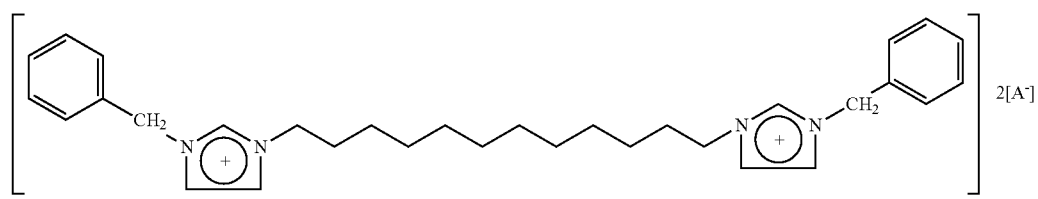

A = Br⁻, $NTf_2^-$, $PF_6^-$
$C_{12}(benzim)_2$-A

TABLE 3-continued
Pyrrolidinium-based Dicationic Ionic Liquids
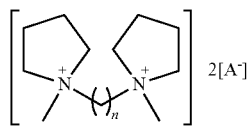
A = Br⁻, NTf$_2^-$, PF$_6^-$
n = 3, C$_3$(mpy)$_2$-A
n = 9, C$_9$(mpy)$_2$-A
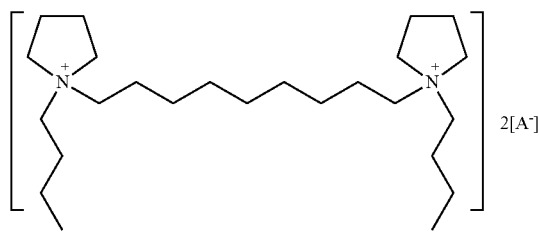
A = Br⁻, NTf$_2^-$, PF$_6^-$
C$_9$(bpy)$_2$-A
Also produced in accordance with the invention are:
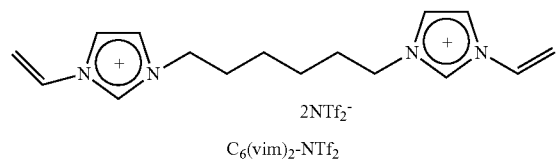
2NTf$_2^-$
C$_6$(vim)$_2$-NTf$_2$
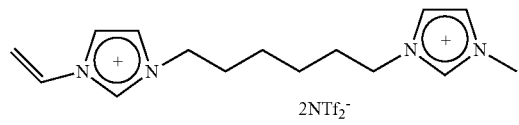
2NTf$_2^-$
C$_6$vm(im)$_2$-NTf$_2$
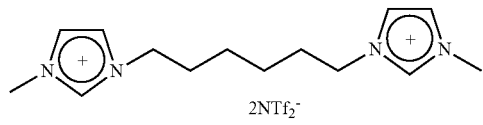
2NTf$_2^-$
C$_6$(mim)$_2$-NTf$_2$
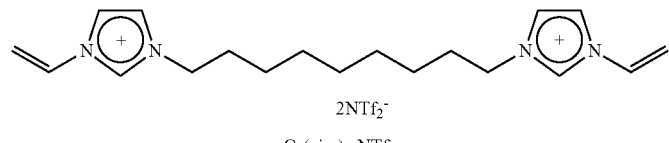
2NTf$_2^-$
C$_9$(vim)$_2$-NTf$_2$
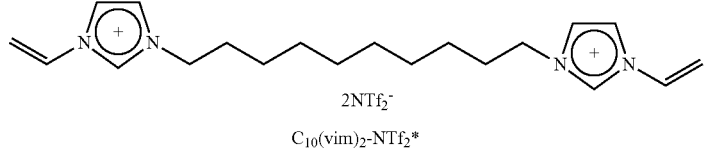
2NTf$_2^-$
C$_{10}$(vim)$_2$-NTf$_2$*

TABLE 3-continued
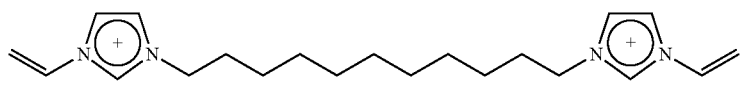
2NTf₂⁻
C₁₁(vim)₂-NTf₂
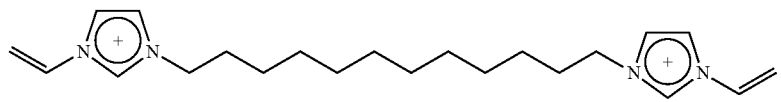
2NTf₂⁻
C₁₂(vim)₂-NTf₂*
Examples of chiral ionic liquids include the following:
Chiral dicationic IL
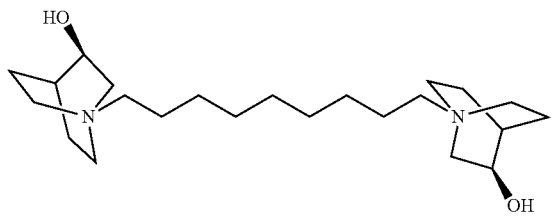
Chiral dianionic IL
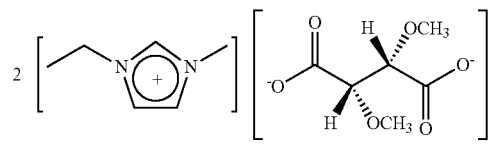
Polymerizable chiral IL
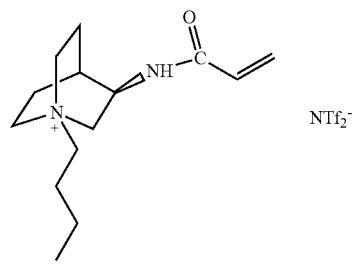
NTf₂⁻
Polymerizable dicationic dicationic IL
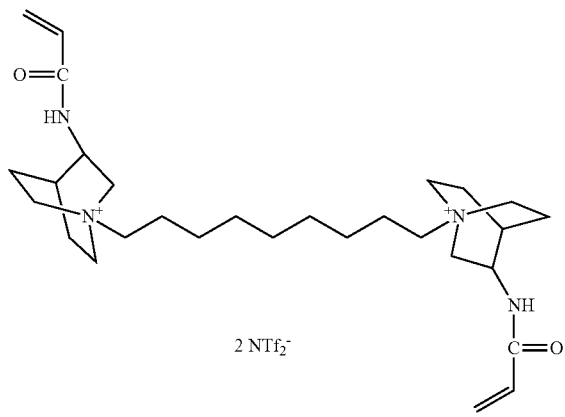 [SMILES: C=CC(=O)NC1C[N+]2(CCCCCCCCC[N+]34CCC(CC3)C(NC(=O)C=C)C4)CCC1CC2]
2 NTf₂⁻

Note that some of the salts reflected in EXAMPLE A—Tables 1 and 2 may not reflect the correct number of anions; usually 2 (see EXAMPLE A—Table 3). Note that the names of the compounds found in EXAMPLE A—Tables 1 and 2, are found in EXAMPLE A—Table F. Compounds 1, 5, 9, and 13 were synthesized by reacting one molar equivalent of 1,3-dibromopropane; 1,6-dibromohexane; 1,9-dibromononane; and 1,12-dibromododecane, respectively, with two molar equivalents of 1-methylimidazole at room temperature. Compound 17 was synthesized by reacting one molar equivalent of 1,9-dibromononane with two molar equivalents of 1-butylimidazole at room temperature. Compounds 21 and 24 were synthesized by refluxing one molar equivalent of 1,3-dibromopropane and 1,9-dibromononane, respectively, with 1,2-dimethylimidazole dissolved in 125 mL 2-propanol for 24 hours. Compound 28 was synthesized by refluxing one molar equivalent of 1,12-dibromododecane with two molar equivalents of 1-benzylimidazole in 100 mL of 2-propanol for 24 hours. Following complete reaction (as monitored by NMR), the products were all purified by extraction with ethyl acetate and dried under a $P_2O_5$ vacuum.

Compounds 31 and 34 were produced by refluxing one molar equivalent amount of 1,3-dibromopropane and 1,9-dibromononane with two equivalents of 1-methylpyrrolidine in 100 mL of 2-propanol for 24 hours. Compound 37 was synthesized by refluxing two molar equivalents of 1-butylpyrrolidine with one equivalent of 1,9-dibromononane in 100 mL of 2-propanol for 24 hours. These salts were also extracted with ethyl acetate and dried under vacuum. All metathesis reactions involving N-lithiotrifluoromethylsulfonimide, hexafluorophosphoric acid, and sodium tetrafluoroborate were performed using previously published procedures. Ionic liquids formed via metathesis reactions were tested with silver nitrate to ensure no halide impurities remained.

All thirty-nine ionic liquid samples were characterized using $^1$H NMR and electrospray ionization (ESI) mass spectrometry. $^1$H NMR spectra (400 MHz) were recorded in deuterated DMSO.

Surface tension values were measured at room temperature (23° C.) using a Model 20 DuNuoy Tensiometer (Fisher Scientific, Fair Lawn, N.J.) equipped with a platinum-iridium ring with a mean circumference of 5.940 cm and a ring/wire radius of 53.21. The densities of the ionic liquids or, more correctly, the temperature of solid/liquid transformation (used synonymously except as indicated otherwise explicitly or by context) were determined at 23° C. by placing 2.0 mL of the ionic liquid in a 2.0 mL volumetric tube and weighing by difference. The melting points of the ionic liquids were determined using a Perkin Elmer Pyris 1 Differential Scanning calorimeter (Boston, Mass.). Typical methods involved using a 10° C./min temperature ramp to determine and identify the first and second order thermal transitions. Melting points could not be easily determined for all compounds. For solid compounds, the melting points were verified using a capillary melting point apparatus. Refractive index measurements were conducted at 23° C. using a Bausch & Lomb Abbe-3L refractometer.

The preparation of the capillary columns for inverse gas-liquid chromatographic analysis was performed using a previously described procedure. All capillary columns had efficiencies between 2100 to 2500 plates/meter. Characterization of the capillary columns and probe molecule descriptions are listed in supplemental information. Multiple linear regression analysis (MLRA) and statistical calculations were performed using the program Analyse-it (Microsoft, USA).

EXAMPLE A Tables 1, 2, and 3 give the structures of the two classes (39 compounds) of geminal dicationic ionic liquids synthesized and characterized. Ionic liquids containing imidazolium-based dications with different alkyl linkage chain lengths connecting the cations and/or different alkyl substituents on the imidazolium moiety comprise one group of ionic liquids. In most cases, each geminal dicationic entity was paired with four different anions ($Br^-$, $NTf_2^-$, $BF_4^-$, and $PF_6^-$, EXAMPLE A—Table 3). Pyrrolidinium-based geminal dications with different alkyl linkage chain lengths connecting the cationic and/or different alkyl substituents on the pyrroldinium group are also shown in EXAMPLE A—Table 3. For each dication in this class, separate ionic liquids containing three anions ($Br^-$, $NTf2$, and $PF6$) were synthesized. EXAMPLE A Tables 1 and 2 give the physicochemical properties for these thirty-nine geminal ionic liquids. Surface tension, density, melting point, and refractive index values were recorded for those samples that were liquids at room temperature. For samples that were solids at room temperature, only the melting point was determined. The miscibility/solubility of all ionic liquids in both heptane and water are indicated as well.

Surface Tension. Plots of surface tension data are shown in FIG. 1 for several geminal room temperature ionic liquids. The length of the alkyl linkage chain separating the dications is observed to have only small effects on the surface tension. Considering ILs 2, 6, 10, and 14 (EXAMPLE A Tables 1, 2, and/or 3) which all contain the bis(trifluoromethylsulfonyl)imide ($NTf_2^-$) anion and 3-methylimidazolium cations separated by 3, 6, 9 and 12 carbon linkage chains, respectively, it is apparent that increasing the length of the connecting linkage chain slightly decreases the surface tension (.about.2.4 dynes/cm). A similar trend is observed for the ionic liquids containing other anions (e.g., $BF_4^-$, $Br^-$, $PF_6^-$). These results are quite different from those obtained for monocationic ionic liquids by Law, et al. It was reported that the surface tension for a series of 1-alkyl-3-methylimidazolium-based ionic liquids containing 4, 8, and 12 carbon alkyl groups in the one position of the imidazole ring (refer to EXAMPLE A Table 3 for the ring numbering of the imidazolium cation) significantly decreased with increasing alkyl chain length. The largest decrease in surface tension was observed between 1-butyl-3-methylimidazolium hexafluorophosphate and 1-dodecyl-3-methylimidazolium hexafluorophosphate in which the total decrease in surface tension was nearly 20 dynes/cm at 330 K. It was also proposed that for a fixed cation at a specific temperature, the compound with the larger anion would possess a higher surface tension. However, our data indicates that this is not true for the geminal dicationic ionic liquids, and if anything, is opposite to what was observed previously for the monocationic-type ionic liquids (EXAMPLE A Tables 1 and 2).

Diionic liquids 17-20 contain nonpolar butyl groups in the three position of the imidazolium rings. The surface tension values are significantly smaller (11%-17%) than those of diionic liquids 9-12 and 13-16 which contain the 3-methylimidazolium dications separated by a nonane and dodecane linkage chain, respectively. This data seems to indicate that the alkyl substituent located on the three position of the imidazolium ring plays a more important role in lowering the surface tension than the alkyl linkage chain that separates the geminal dications.

Replacing hydrogen with a methyl group on the two position of the imidazolium ring (refer to EXAMPLE A—Tables 1, 2, and 3) has little effect on the surface tension. In the case of diionic liquids 25 and 26 containing the 2,3-dimethylimidazolium geminal dications separated by a nonane linkage chain with $NTf_2^-$ and $BF_2^-$ anions, respectively, the surface tension values are similar to the corresponding 3-methylimidazolium dications (diionic liquids 10 and 11) also containing the nonane connecting chain. Overall, this data indicates that as the alkyl chain in the 3-position of the imidazolium ring increases in length, the surface tension decreases much more drastically than corresponding increases in the length of the connecting linkage chain.

Figure 2:
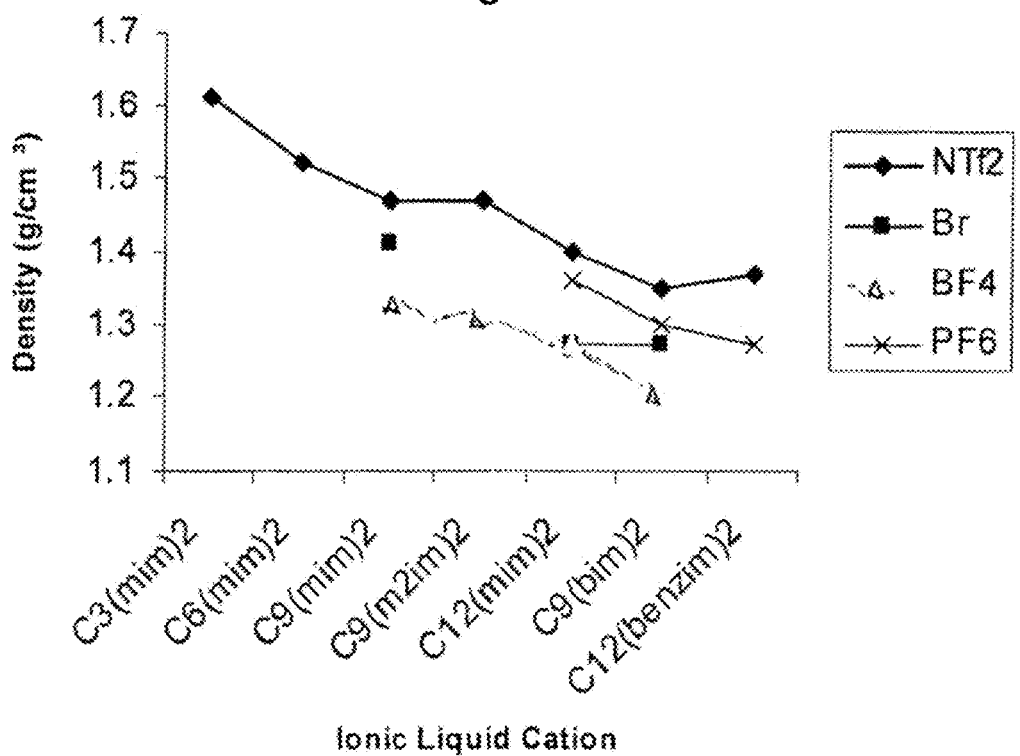
FIG. 2: Illustrates the effect of the cation and anion on the density for dicationic ionic liquids.

Density. As shown in FIG. 2, the densities of the 3-methylimidazolium geminal dicationic ionic liquids were found to be anion dependent and to decrease with increasing length of the hydrocarbon linkage chain. While increases in the linkage chain decreases the density of these ionic liquids, the nature of the anion has a greater influence, with densities in the order of $NTf_2^{31} > PF_6^- > Br^- > BF_4$ (EXAMPLE A Tables 1, 2, and FIG. 2). The decrease in density with increasing alkyl chain length has been reported previously for a large series of 1-alkyl-3-methylimidazolium ionic liquids.

When the methyl group on the three position of the imidazolium ring is replaced with a butyl group, the density decreases for all ionic liquids in the series, regardless of the anion (compare 9-12 to 17-20, Table 1). However, by replacing the hydrogen at the two position of the ring with a methyl group, the density does not appear to change (see 10-11 and 25-26, EXAMPLE A—Table 1).

Melting Points. From this study, four main factors were found to affect the melting points of these geminal-dicationic ionic liquids. These factors which apply to dianions as well are: (1) the length and type of the linkage chain or bridge separating the geminal diions, (2) the nature of the diions (e.g., imidazolium versus pyrrolidinium), (3) the substituents and their placement on the dianions, and (4) the nature of the counterion.

Considering first the 3-methylimidazolium-based dicationic ionic liquids, longer bridging groups generally result in a lowering of the melting points. This observation applies to diionic liquids generally. In all of the above-noted cases except for the geminal dications with $NTf_2^-$ anions, which were all liquids regardless of the linkage chain used, compounds containing three and six carbon linkage chains were salts with relatively high melting points. By connecting the 3-methylimidazolium dications with a nonane linkage chain, all samples were room temperature ionic liquids except for the hexafluorophosphate salt, which had a melting point of 88° C. When the dications were connected by a dodecane linkage chain, however, all compounds were room temperature ionic liquids. Looking more generally at the dianions and dications that can be used to make diionic liquids in accordance with the present invention, the chain length between the ionic species should be longer than the length of a 2 carbon chain, and no longer than a 40 carbon chain. Preferably, chain lengths are equivalent to the length of a 3 to 30 carbon chain. The degree and types of substituents, if any, may have an effect on length as well, the larger the molecule, generally, the higher its temperature of solid/liquid transformation. Therefore, any chain length, any chain content and any chain substitution pattern may be used, as long as the melting point of the resulting diionic liquid salt is less than about 400° C., preferably about 100° C. or less, preferably about 60° C., more preferably about room temperature or less (25° C.).

In addition to the effect of the different length and types of bridges connecting the dications, the anion also played a role in determining the melting point. In nearly very case of the imidazolium dications, the melting points increased in the following order: $NTf_2^- < BF_4^- < PF_6^- < Br^-$ (EXAMPLE A—Tables 1 and 2).

Other anions which can be used to form dicationic ionic liquids include, without limitation, triflates, carboxylates, sulfonates and sulfates (both mono- and poly-anionic species). Dianionic ionic liquids can be produced from any dianion which can form a stable salt, preferably which has a melting point below 400° C., more preferably at or below 100° C., most preferably at or below room temperature (25° C.). These include dicarboxylate, disulfonate and disulfates. Mixed dianions, one made from, for example, a dicarboxylate and a disulfate, are also desirable. Cations or counterions for these include, again without limitation, the dications listed in EXAMPLE A—Tables 1 and 2, as well as their monocationic counterparts. This is as long as they can form a stable diionic salt and have a melting point as described above.

The substituents and their position on the imidazolium ring also affected the melting points of these compounds. These same considerations apply to substituted anions as well. Considering 17-20 which contain the 3-butylimidazolium dications connected by a nonane linkage chain, the melting points were lowered significantly by replacing the methyl group (see 9-12) with a butyl group. In the case of 12, which consists of the 3-methylimidazolium dications connected by a nonane linkage chain with the $PF_6^-$ anion, the melting point is decreased by nearly 60° C. by replacing the methyl groups with butyl groups to form 20. In addition, methylation of the 2-positions of the imidazolium dications significantly increases the melting point of these compounds (see 21-27, EXAMPLE A—Table 1). In the case of 21 which contains the 2,3-dimethyimidazolium dication connected by a propane linkage chain, the melting point is nearly 135° C. higher than the corresponding 3-methylimidazolium dication also connected by a propane linkage chain. Others have previously reported the melting points for 1-ethyl-3-methylimidazolium bromide to be 79° C. whereas the melting point for 1-ethyl-2,3-dimethylimidazolium bromide was found to be 141° C., a difference of nearly 62° C. While the methyl group on the two position of the imidazolium ring has little effect on the surface tension and density of the geminal dicationic ionic liquids, it is seen to have a profound effect on their melting points, more so for the dicationic ionic liquids than for the traditional 1-alkyl-3-methylimidazolium ionic liquids.

Finally, by replacing the 3-methylimidazolium dication with the 3-benzylimidazolium dication (28-30) and connecting them by a dodecane bridge, the melting points appear higher compared to the 3-methylimidazolium series, especially in the case of the bromide salt.

In general, the melting points of the pyrroldinium-based geminal dicationic compounds are significantly higher than their corresponding imidazolium analogues. Indeed, only two of their $NTf_2^-$ salts can be considered ionic liquids. However, as will be discussed (vide infra), these particular RTILs may have the greatest thermal stability and other highly useful and interesting properties.

The melting points for the pyrrolidinium-based dications show similar trends to the imidazolium-based salts. In the two cases involving the propane and nonane linkage chains, the melting point decreases as the linkage chain becomes longer. However, in contrast to the imidazolium-based dications, the pyrrolidinium-based dications are still relatively high melting solids when separated by a nonane alkyl chain. Additionally, substituting a butyl group instead of a methyl group on the quaternary amine of the pyrrolidinium cation causes a decrease in the melting point for the bromide dication but an increase in the melting point for the dications containing bis(trifluoromethylsulfonyl)imide and hexafluorophosphate anions.

From the data in EXAMPLE A—Tables 1 and 2, it appears that longer alkyl linkage chains and long aliphatic substituents on the quaternary amine produce either low melting salts or room temperature ionic liquids. Further, the $NTf_2^-$ salts have lower melting points than corresponding salts with other anions. The contributions of the linkage chain (bridge), and other substituents on the geminal dicationic salts, to the number of possible conformational states (and possibly crystal polymorphs) will be considered in the crystal structure section of this paper.

Solubility. The solubility behavior of all thirty-nine geminal dicationic ionic liquids in water and heptane also was explored. None of the dicationic ionic liquids were soluble in heptane. However, most of the ionic liquids containing bromide and tetrafluoroborate anions were soluble in water. Nevertheless, for the tetrafluoroborate ionic liquids, it was found that by using a long linkage chain and a more hydrophobic alkyl substituent on the three position of the imidazole ring (see compounds 15 and 19), the solubility of the salt in water decreases. In general, the solubility behavior of the geminal dicationic ionic liquids in both water and heptane was quite similar to the monocationic ionic liquids with $NTf_2^-$ and $PF_6^-$ salts being immiscible with water and $Br^-$ and $BF_4^-$ salts being miscible with water. Indeed, the monoionic counterparts of the diionic liquid salts of the present invention are a good predicator of the solubility of a diionic liquid salt.

In the case of the dicationic ionic liquid 28 which consists of the 3-benzylimidazolium dication separated by a dodecane linkage chain and bromide anion, the hydrophobicity of the dication evidently overrides the coordinating nature of the bromide anion to make this particular ionic liquid insoluble in water. This is a good example that the properties of the individual cations and anions can be balanced and changed in order to produce ionic liquids (or solids) with the desired properties and characteristics.

Thermal Stability. The thermal stabilities of the geminal dicationic ionic liquids were found to be significantly higher than what has been observed for many traditional imidazolium-based ionic liquids. Thermal stabilities were measured by immobilizing an approximate 0.15-0.20 microns film of the ionic liquid on the inner wall of a fused silica capillary. The capillary was then heated slowly in an oven and a very sensitive flame ionization detector (or mass spectrometer) used to detect any volatilization or decomposition of the ionic liquid. There are several advantages of using this set-up to measure the thermal stabilities of ionic liquids. The thermal stability is measured in the absence of oxygen by purging the capillary with a continuous flow of an inert gas such as helium, hydrogen, or nitrogen. In addition, the detection limit of the detector is very low (about 10 ppm to 10 ppb, depending on the compound) allowing for very sensitive detection of any thermally induced decomposition/volatilization products from the ionic liquid. Finally, this approach can use mass spectrometry detection to determine the likely volatilization/decomposition products.

Figure 3:
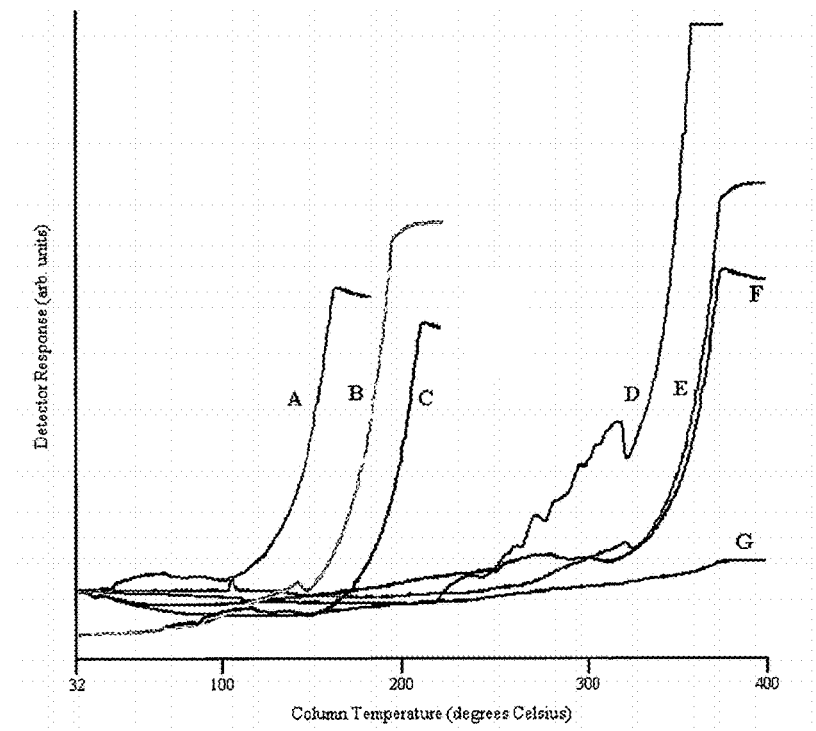
FIG. 3: is a thermal stability diagram showing the decomposition/volatilization of thin films coated on the walls of fused silica capillaries, heated under a constant flow of helium, using an ultra-sensitive flame ionization detector. The plot illustrates the fact that the geminal dicationic ionic liquids (D-G) have much higher thermal stabilities, and/or lower volatilities, than conventional ionic liquids (A-C). A, 1-butyl-3-methylimidazolium chloride (BMIM-Cl); B, BMIM-PF$_6$; C, BMIM-NTf$_2$; D, C$_9$(bpy)$_2$-NTf$_2$, 38; E, C$_9$(mim)$_2$-NTf$_2$, 10; F, C$_{12}$(benzim)$_2$-NTf$_2$, 29; G, C$_9$(mpy)$_2$-NTf$_2$, 35.

FIG. 3 shows a thermal stability diagram containing three traditional ionic liquids and four dicationic ionic liquids. The traditional ionic liquids have thermal stabilities ranging from 145° C. (1-butyl-3-methylimidazolium chloride) to 185° C. (1-butyl-3-methylimidazolium bis(trifluoromethylsulfonyl) imide). However, the thermal stabilities of the geminal dicationic ionic liquids are observed to range from 330° C. to 400° C., depending on the cation used. The highest thermal stability (>400° C.) was obtained with the $C_9(mpy)_2$-$NTf_2$ (35) ionic liquid (1-methylpyrrolidinium dication separated by a nonane linkage chain) while the lowest volatilization/decomposition temperature (330° C.) was observed for the $C_9(bpy)_2$-$NTf_2$ (38, 1-butylpyrrolidinium dication separated by a nonane linkage chain) ionic liquid. The maximum thermal stabilities of $C_9(mim)_2$-$NTf_2$ (10,1-methylimidazolium dication) and $C_{12}(benzim)_2$-$NTf_2$ (29,3-benzylimidazolium dication separated by a dodecane linkage chain) were observed to be nearly identical (350-360° C.). In most cases, slight to moderate decomposition/volatilization of the dicationic ionic liquids were observed at these high temperatures. However, due to charring of the polyimide coating on the outside of the fused silica capillary tubing at these high temperatures, the ionic liquids were only tested up to 400° C.

While the physical and thermal properties of the dicationic ionic liquids are quite impressive, another interesting fact is that some of these compounds possess useful liquid ranges in excess of 400° C. and one of these ($C_9(mpy)_2$-$NTf_2$) 35 has a stable liquid range of .about. −4° C. to >400° C. This property will undoubtedly ensure their use for a wide variety of applications in which this large liquid range and high thermal stability can be exploited. In accordance with one aspect of the present invention, the ionic liquids of the present invention, which are salts of a dianion or dication, are stable. Stability in the context of the present invention means that they will neither substantially decompose nor volatilize at a temperature of under about 200° C. when measured by inverse gas chromatography as described herein. More preferably, the stable ionic liquids of the present invention which are dianionic or dicationic salts, are stable in that they will not substantially decompose or volatilize at a temperature of under about 300° C.

In FIG. 3, it is believed that the detector response shown for compounds D, E and F, between approximately 200 and approximately 300° C. are from impurities and not from the compounds tested. Still, less than 10% of the weight of the material tested decomposes or volatilizes when exposed to 200° C. or in preferred embodiments, 300° C., for an hour, they can be said to be stable in accordance with the present invention.

In particularly preferred embodiments in accordance with the present invention, dianionic or dicationic ionic liquid salts are provided, which are stable in that they will neither substantially decompose nor substantially volatilize at a temperature of under 200° C. and will have a temperature of solid/liquid transformation of 400° C. or less. More preferably will have a temperature of solid/liquid transformation of 100° C. or less, most preferably will have a temperature of solid/liquid transformation of 25° C. or less.

As mentioned previously, the diionic liquids (salts of dianions and dications as described herein) have an important use because of their stability at wide ranges of temperature and unique liquid properties. Many of these liquids have unexpectedly low temperatures of solid-liquid transformation, which from a fundamental standpoint depends upon the energy of their crystal lattice. There are well-known and rather crucial barriers to precisely calculating these energies, i.e., the true determination of atom-atom potentials. On the other hand, the accurate measurement (required for comparison) of solid-liquid transformation temperatures for this family of ionic compounds also have difficulties. The transformation is not sharp in time and the peaks on DSC curves become very broad. Formally speaking, the temperature of this transformation can be very different from the true melting point which is the temperature of thermodynamic equilibrium between solid and liquid states.

Solvation Characteristics. We have previously reported that the Abraham solvation model, a linear free energy approach that utilizes inverse gas-liquid chromatography to describe the solvation properties of a liquid, can be used to characterize room temperature ionic liquids. Described by equation 1, the model provides the so-called "interaction parameters" (r, s, a, b, l) by using multiple linear regression analysis to fit the retention factor (k, determined chromatographically) to the solute descriptors ($R_2$, $\pi_2^H \alpha_{2H}$, $\beta_2^H$, log $L^{16}$) for a wide variety of probe solute molecules.

$$\log k = c + rR_2 + s\pi_2^H + b\beta_2^H + 1 \log L^{16} \quad [1]$$

The solvation properties of four dicationic ionic liquids (see EXAMPLE A Table 4) were evaluated and the interaction parameters compared to those obtained for their traditional monocationic analogues 1-butyl-3-methylimidazolium and 1-butyl-1-methylpyrrolidinium ionic liquids.

TABLE 4

Comparison of interaction parameters between monocationic and dicationic ionic liquids.

| Temp (° C.) | c | r | s | a | b | l | n | $R^2$ | F |
|---|---|---|---|---|---|---|---|---|---|
| $C_4(mim)_2$-$NTf_2$ | | | | | | | | | |
| 40 | −2.94 | 0.25 | 2.01 | 2.11 | 0.50 | 0.56 | 33 | 0.99 | 356.70 |
|  | (0.13) | (0.09) | (0.12) | (0.11) | (0.13) | (0.03) |  | (0.11) |  |
| 70 | −2.91 | 0.22 | 1.78 | 1.77 | 0.45 | 0.44 | 32 | 0.99 | 370.42 |
|  | (0.11) | (0.10) | (0.11) | (0.09) | (0.14) | (0.03) |  | (0.09) |  |
| 100 | −3.06 | 0.20 | 1.69 | 1.57 | 0.33 | 0.37 | 31 | 0.98 | 253.79 |
|  | (0.13) | (0.09) | (0.10) | (0.08) | (0.13) | (0.03) |  | (0.09) |  |
| $C_9(mim)_2$-$NTf_2$ (10) | | | | | | | | | |
| 40 | −2.86 | 0.16 | 1.81 | 1.83 | 0.47 | 0.62 | 32 | 0.98 | 257.15 |
|  | (0.14) | (0.11) | (0.14) | (0.10) | (0.17) | (0.04) |  | (0.12) |  |
| 70 | −2.95 | 0.11 | 1.76 | 1.75 | 0.20 | 0.51 | 33 | 0.99 | 644.20 |
|  | (0.09) | (0.07) | (0.08) | (0.07) | (0.10) | (0.02) |  | (0.07) |  |
| 100 | −3.06 | 0.11 | 1.64 | 1.50 | 0.15 | 0.43 | 32 | 0.99 | 545.32 |
|  | (0.08) | (0.06) | (0.07) | (0.06) | (0.09) | (0.02) |  | (0.07) |  |
| BMIM-$NTf_2$[a] (1-butyl-3-methylimidazolium bis[(trifluoromethylsulfonyl)imide] | | | | | | | | | |
| 40 | −2.87 | 0 | 1.89 | 2.02 | 0.36 | 0.63 | 33 | 0.99 | 459.64 |
|  | (0.10) | (0.08) | (0.10) | (0.10) | (0.12) | (0.03) |  | (0.09) |  |
| 70 | −3.03 | 0 | 1.67 | 1.75 | 0.38 | 0.56 | 35 | 0.99 | 413.65 |
|  | (0.09) | (0.08) | (0.09) | (0.09) | (0.11) | (0.02) |  | (0.09) |  |
| 100 | −3.13 | 0 | 1.60 | 1.55 | 0.24 | 0.49 | 32 | 0.98 | 240.13 |
|  | (0.12) | (0.09) | (0.10) | (0.10) | (0.12) | (0.03) |  | (0.09) |  |
| $C_9(mpy)_2$-$NTf_2$ (35) | | | | | | | | | |
| 40 | −2.83 | 0.27 | 1.71 | 1.98 | 0.32 | 0.62 | 30 | 0.99 | 377.84 |
|  | (0.12) | (0.10) | (0.12) | (0.10) | (0.15) | (0.03) |  | (0.10) |  |
| 70 | −2.85 | 0.34 | 1.52 | 1.65 | 0.35 | 0.48 | 32 | 0.99 | 419.32 |
|  | (0.11) | (0.09) | (0.11) | (0.08) | (0.13) | (0.03) |  | (0.09) |  |
| 100 | −2.99 | 0.23 | 1.49 | 1.48 | 0.15 | 0.42 | 30 | 0.99 | 339.79 |
|  | (0.10) | (0.09) | (0.10) | (0.08) | (0.14) | (0.03) |  | (0.08) |  |
| BMPY-$NTf_2$[b] (1-butyl-1-methylpyrrolidinium bis[(trifluoromethylsulfonyl)imide] | | | | | | | | | |
| 40 | −2.78 | 0 | 1.69 | 2.08 | 0.16 | 0.68 | 34 | 0.98 | 321.99 |
|  | (0.11) | (0.09) | (0.11) | (0.12) | (0.14) | (0.03) |  | (0.11) |  |
| 70 | −2.80 | 0 | 1.53 | 1.78 | 0 | 0.56 | 34 | 0.99 | 393.23 |
|  | (0.10) | (0.08) | (0.09) | (0.08) | (0.11) | (0.02) |  | (0.09) |  |
| 100 | −2.92 | 0 | 1.44 | 1.55 | 0 | 0.48 | 32 | 0.99 | 358.08 |
|  | (0.09) | (0.07) | (0.08) | (0.07) | (0.09) | (0.02) |  | (0.08) |  |
| $C_{12}(benzim)_2$-$NTf_2$ (29) | | | | | | | | | |
| 40 | −2.94 | 0.11 | 1.65 | 1.96 | 0.84 | 0.66 | 33 | 0.99 | 522.89 |
|  | (0.11) | (0.08) | (0.11) | (0.08) | (0.13) | (0.03) |  | (0.08) |  |
| 70 | −3.07 | 0.07 | 1.62 | 1.75 | 0.57 | 0.56 | 30 | 0.99 | 888.94 |
|  | (0.08) | (0.05) | (0.08) | (0.06) | (0.09) | (0.02) |  | (0.06) |  |
| 100 | −3.12 | 0 | 1.47 | 1.44 | 0.52 | 0.46 | 30 | 0.99 | 478.94 |
|  | (0.09) |  | (0.09) | (0.06) | (0.10) | (0.02) |  | (0.07) |  |

[a] r = interaction via nonbonding and □-electrons, s = dipolarity/polarizability, a = hydrogen bond basicity, b = hydrogen bond acidity, l = dispersion forces, n = number of probe molecules subjected to multiple linear regression analysis, $R^2$ = statistical correlation coefficient, F = Fisher coefficient. Values in parenthesis are the standard deviations for each interaction parameter.
[b] Values taken from reference 31

Nearly all interaction parameters of the dicationic ionic liquids $C_4(mim)_2$-$NTf_2$ and $C_9(mim)_2$-$NTf_2$ (10) are similar to the corresponding monomer-type ionic liquids, 1-butyl-3-methylimidazolium bis(trifluoromethylsulfonyl)imide. This is also observed for the pyrrolidinium dication, $C_9(mpy)_2$-$NTf_2$ (35), as it differs from the monomer-type analogue (1-butyl-1-methylpyrrolidinium bis(trifluoromethylsulfonyl)imide). This indicates that the well-known and highly useful solvation properties of traditional RTILs are very similar to those of the geminal dicationic RTILs. The only interaction parameter that is statistically different between the three ionic liquids is the "r" interaction parameter, namely the ability of the ionic liquid to undergo .π-π and n-π interactions with probe solute molecules. Because the pyrrolidinium cation is not aromatic, the higher r values may be due to the anion as each anion contains two sulfone groups that are capable of undergoing such interactions. However, this was not observed for the traditional ionic liquids evaluated previously in our study.

Finally, the interaction parameters for the 3-benzylimidazolium geminal dication separated by a dodecane linkage chain with the $NTf_2^-$ anion (29) appear similar to those observed previously for 1-benzyl-3-alkyl-imidazolium ionic liquids. However, the hydrogen bond acidity term, b, is larger for the geminal dicationic ionic liquid. This may be due to the increased acidity of the proton at the 2-position of the imidazolium ring induced by the electron withdrawing benzyl group.

As noted earlier, the viscosity of some diionic salts decreases sharply with increasing temperature. Consequently at high temperatures, previously uniform coated capillaries, particularly ones that are prepared by adsorption or absorption, rather than immobilization, can experience film disruption (due to flow, etc.). When a uniformly coated GC capillary, for example, slowly changes to a nonuniformly coated entity, the analyte retention times and efficiency tend to decrease.

To overcome these issues, where necessary, and in accordance with another aspect of the present invention, there is provided a process which includes the free radical reaction of ionic liquid monomers to provide a more durable and robust stationary phase, as well as the cross-linked and/or immobilized stationary phases and the columns that include same. By partially crosslinking the ionic liquid stationary phase using a small percentage of free radical initiator, high efficiency capillary columns are produced that are able to endure high temperatures with little column bleed. It was found that low to moderate temperature separations (30° C.-280° C.) can be carried out with high selectivity and efficiency using special partially cross-linked ionic liquid stationary phase mixtures. These stationary phases retain their "gelatinous," "semi liquid," amorphous state. For separations conducted at higher temperatures (300° C.-400° C.), more highly cross-linked/immobilized stationary phases are well-suited to provide high selectivity and efficient separations with low column bleed. The effect of different functionalized ionic liquid salt mixtures and initiator concentrations is studied for these two types of stationary phases. The accomplished goal is to maximize their separation efficiency, thermal stability, and column lifetime, without sacrificing the unique selectivity of the stationary phase.

The following materials were used to illustrate the unique advantages of cross-linked stationary phases comprising diionic liquid salts in accordance with the present invention: 1-vinylimidazole, 1-bromohexane, 1-bromononane, 1-bromododecane, 1,9-dibromononane, 1,12-dibromododeeane, 1-bromo-6-chlorohexane, 1-methylimidazole, N-Lithiotrifluoromethanesulfonimide, 2,2'-Azobisisobutyronitrile (AIBN), dichloromethane, ethyl acetate, and all test solutes were purchased from Aldrich (Milwaukee, Wis.). Untreated fused silica capillary tubing (0.25-mm inner diameter) and a fatty acid methyl ester (FAME) kit containing 19 standards was purchased from Supelco (Bellafonte, Pa.). Structures and physico-chemical properties of the monocation monomers and the dication crosslinkers used are shown in EXAMPLE A—Table A. Monomers 1, 2, and 3 were synthesized by reacting one molar equivalent of 1-vinylimidazole with a slight molar excess of 1-bromohexane, 1-bromononane, and 1-bromododecane, respectively. These reactions were performed at room temperature in round bottom flasks lined with aluminum foil to prevent thermal/photo-induced polymerization. Care should be taken when synthesizing and purifying these compounds to minimize excess heat/light during reaction or roto-evaporation to prevent unwanted reaction of the ionic liquid. The resulting bromide salt was evaporated under vacuum to remove the excess 1-bromoalkane. Three 15 mL aliquots of ethyl acetate were used to wash the ionic liquid to remove any other impurities. After evaporating the ethyl acetate under vacuum, the bromide salt was dissolved in water and mixed with one molar equivalent of N-Lithiotrifluoromethanesulfonimide, also dissolved in water. After stirring for 12 hours, the water was removed and the remaining ionic liquid thoroughly washed with water using three 50 mL aliquots of water. A portion of the third aliquot of water was subjected to the silver nitrate test to ensure the absence of silver bromide precipitate. The monomers were then dried under vacuum and then placed under a $P_2O_5$ vacuum in the absence of light.

Figure 4:
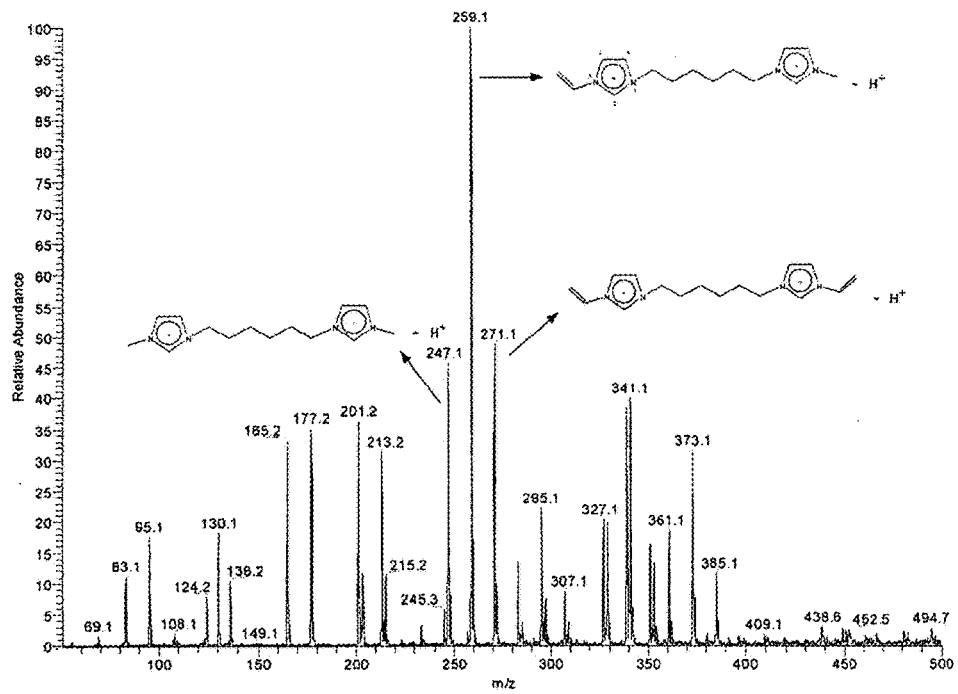
FIG. 4: is a positive ion electrospray mass spectrum of mixture 4 indicating the relative abundance of the three substituted dications as well as the loss of a proton on the imidazolium ring thereby allowing the formation of the +1 ion.

The dication crosslinkers were synthesized using a modified procedure recently reported for a series of geminal dicationic ionic liquids. Compound 4 in Table A is a mixture of $C_6(vim)_2^{2+}$ (m/z=272.1), $C_6vm(im)_2^{2+}$ (m/z=260.1), and $C_6(mim)_2^{2+}$ (m/z=248.1) in a 1:2:1 molar mixture, respectively, as indicated in the electrospray mass spectrum in FIG. 4. When acquired in positive ion mode, the most dominant ions for these three structurally similar compounds appear to be the +1 ion minus a proton. Further experiments conducted in our group in which the C-2 proton on the imidazolium ring (see FIG. 4 for numbering of ring system) is deuterated indicates that this proton is lost and causes one of the positive charged aromatic rings to neutralize charge and give rise to the +1 ion (data not shown). This mixture was synthesized by reacting one molar equivalent of 1-bromo-6-chlorohexane with one molar equivalent of 1-methylimidazole in an ice bath overnight. Subsequently, one molar equivalent of 1-vinylimidazole was added dropwise over a period of 30 minutes and the temperature of the mixture increased to 55° C. for 3 hours. Three 15 mL aliquots of ethyl acetate were used to extract any excess starting material and the bromide anion was exchanged for the bis [(trifluoromethane)sulfonyl]imide ($NTf_2^-$) anion by reaction of two equivalents of N-Lithiotrifluoromethanesulfonimide dissolved in water for every one equivalent of the crosslinker salt.

In an analogous manner, the remaining crosslinkers 5, 6, 7, and 8 were prepared by reacting one molar equivalent of the dibromoalkane with two molar equivalents of 1-vinylimidazole. Compound 9 was prepared by reacting one molar equivalent of 1-methylimidazole with molar equivalent of 1-bromononane at 100° C. for 5 hours. Clean-up and metathesis exchange for the $NTf_2^-$ anion was performed as described above for the synthesis of the monomer ionic liquids.

Capillaries were coated using the static coating method at 40° C. Coating solutions of the monomer and/or crosslinker ionic liquids were prepared at concentrations of 0.20% (w/v) in dichloromethane. Prior to adding the dichloromethane to the monomer and/or crosslinker mixture, 0.7 mg of AIBN (.about.3.5% by weight) was added. AIBN is known to undergo decomposition to form cyanoisopropyl radicals which subsequently produce several products by dimerization, disproportionation reactions, or chain reactions. The thermal decomposition kinetics of AIBN have been well studied using a variety of spectroscopic and polarographic techniques. Based on an Arrhenius plot, Van Hook and co-workers have proposed a rate expression for the decomposition of AIBN in solution to be: $k_d$=1.58×0.10$^{15}$ exp(−30.8 kcal./RT). For a temperature of 40° C. in which the capillaries are coated with the initiator present in the coating solution, this yields a decomposition rate constant of .about.5.07×10$^{-7}$ sec$^{-1}$. Due to the fact that this rate constant is so small and that the coating rate is relatively fast, there should be very little polymerization of the monomer/crosslinker mixture during the coating of the capillary.

After coating, the ends of the capillary were flame sealed and the capillary placed in a GC oven and heated from 40° C.-80° C. at 1° C./min. The capillary was then held at 80° C. for 5 hours to ensure complete polymerization. Helium carrier gas was then flushed through the capillary at a rate of 1 mL/min and the capillary conditioned from 30° C. to 120° C. at 3° C./min and held at 120° C. for two hours.

Solvation thermodynamics can be determined chromatographically by recognizing that the Gibbs free energy change, $\Delta G°$, of a solute between the mobile phase and the stationary phase can be described by equation 1:

$$\Delta G° = -RT \ln\left(\frac{k}{\Phi}\right) \qquad [1]$$

where k is the solute retention factor and $\Phi$ is the column phase ratio. An expression shown in equation 2 can then be derived and illustrates the dependence of enthalpy, $\Delta H°$, and entropy, $\Delta S°$, on the change of the retention factor with temperature:

$$\ln k = -\left(\frac{\Delta H°}{R}\right)\frac{1}{T} + \left[\frac{\Delta S°}{R} + \ln \Phi\right] \qquad [2]$$

A van't Hoff plot of in k versus 1/T provides the entropy (intercept) and enthalpy (slope) and describes a solute's transfer from the gas phase to the ionic liquid stationary phase. In this work, the solvation thermodynamics were determined for seven different probe molecules, listed in EXAMPLE A—Table D, on two cross-linked ionic liquid phases and one ionic liquid stationary phase. As EXAMPLE A—Table D illustrates, the probe molecules evaluated in this study differ in terms of size and the types of functional groups that they possess. For each probe molecule on each stationary phase, three separate van't Hoff plots were constructed so that changes in the probe molecule retention factor could be used to provide an error for each thermodynamic parameter. The probe molecule retention factors were determined at six different temperatures to obtain the highest possible correlation coefficient (>0.989).

Previously we characterized a large number of room temperature ionic liquids in terms of multiple solvation interactions using the solvation parameter model, shown in equation $$\log k = c + rR_2 + s\pi_2^H + a\alpha_2^H + b\beta_2^H + l \log L^{16} \qquad [3]$$

This approach utilizes inverse gas-liquid chromatography and allows the use of a large number of probe molecules to deconvolute solute retention in terms of the type and magnitude of individual solvation interactions. The solute descriptors ($R_2$, $\pi_2^H$, $\alpha_2^H$, $\beta_2^H$, $\log L^{16}$) from Equation 3 are obtained from the literature for many probe molecules containing a variety of functional groups. The retention factor is determined chromatographically. The solute descriptors and retention factors are subjected to multiple linear regression analysis to obtain the interaction parameter coefficients (r, s, a, b, l), which ultimately characterize the stationary phase: r is the ability of the diionic liquid containing-stationary phase to interact with $\pi0$ and n electrons of the solute, s is a measure of the dipolarity/polarizability of the diionic liquid containing-stationary phase, a defines the diionic liquid containing-stationary phase hydrogen bond basicity, b is a measure of the hydrogen bond acidity, and 1 refers to the ability of the diionic liquid containing-stationary phase to separate adjacent members of a homologous series.

Test solutes used to determine interaction parameters and solvation thermodynamics were dissolved in dichloromethane. A Hewlett-Packard model 5890 gas chromatograph and a Hewlett-Packard 6890 series integrator were used for all separations. Split injection and flame ionization detection were utilized with injection and detection temperatures of 250° C. Helium was used as the carrier gas with a column inlet pressure of 3.1 psi and flow rate of 1.0 mL/min Methane was used to determine the dead volume of the column. Multiple linear regression analysis and statistical calculations were performed using the program Analyze-it (Microsoft).

Figure 5:
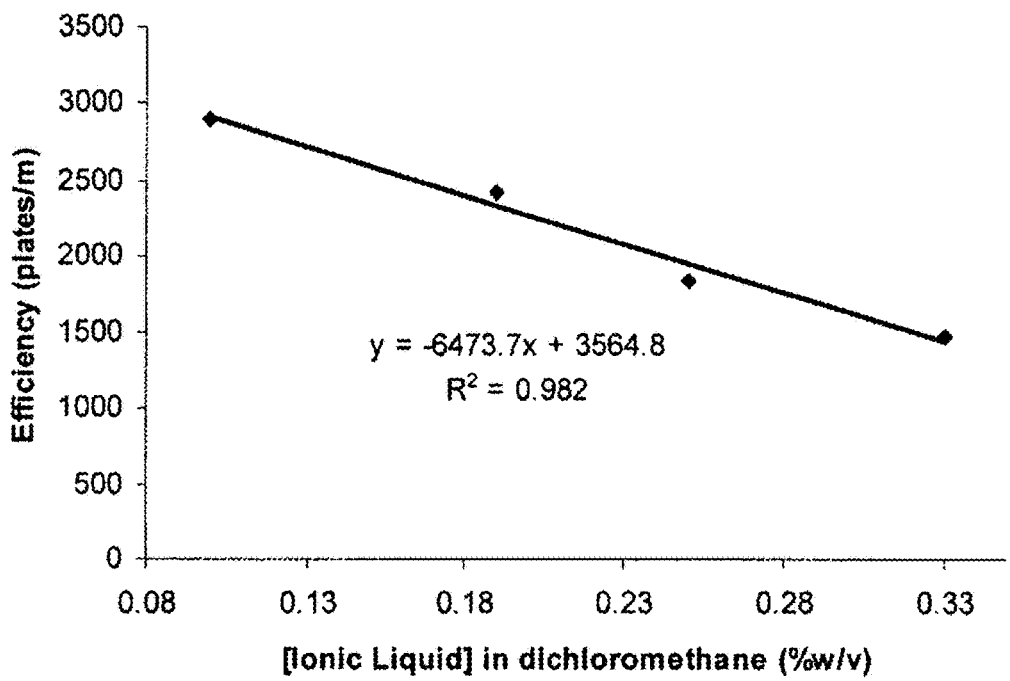
FIG. 5: is a plot illustrating the effect of 1-hexyl-3-vinylimidazolium bis[(trifluoromethane)sulfonyl]imidate film thickness on the peak efficiency (theoretical plates/meter) of naphthalene at 100° C.

Equation 4 can be used to approximate the stationary phase film thickness for gas chromatographic capillaries coated by the static coating method, $$d_f = \frac{d_c \times c}{400} \qquad [4]$$

where: $d_f$ is the film thickness of the ionic liquid stationary phase in micrometers, $d_c$ is the diameter of the capillary (in micrometers), and c is the percentage by weight concentration of the stationary phase dissolved in an appropriate solvent. FIG. 5 shows the effect of 1-hexyl-3-vinylimidazolium bis[(trifluoromethane)sulfonyl]imidate film thickness on the peak efficiency of naphthalene at 100° C. As the plot clearly demonstrates, the highest efficiency separations were carried out with a film thickness of .about.0.07 μm (0.10% w/v of ionic liquid in dichloromethane) while the worst efficiency separations were obtained on columns with a film thickness of .about.0.21 μm (0.33% w/v). In this work, all capillaries were coated with a 0.20% (w/v) coating solution yielding a film thickness of approximately 0.125 μm.

Using the ionic liquids in EXAMPLE A Table A, a variety of free radical cross-linking experiments were carried out in chloroform following the method of Muldoon and co-workers.sup.48 to determine which ratios of monocationic/crosslinker monomers result in copolymers that possess the ideal properties for a GC stationary phase. For example, some copolymers (i.e., formed from monomers 1 and 5) containing only a few percent by weight crosslinker resemble gum-like polysiloxane phases. However, other highly cross-linked copolymers formed hard plastics and are therefore undesirable for gas-liquid chromatographic separations.

Monocationic monomer ionic liquids 1, 2, and 3 contain the 1-vinylimidazolium cation with hexyl, nonyl, and dodecyl alkyl chains, respectively. When polymerized, these ionic liquids form linear polymer chains, as demonstrated previously by Marcilla and co-workers. As illustrated in Table B, these stationary phases exhibited a range of initial separation efficiencies, ranging from 2813 plates/meter for ionic liquid 1 and .about.1900 plates/meter for ionic liquid 3 when conditioned to 120° C. While it appears that the hexyl substituted vinylimidazolium cation produces a more efficient stationary phase coating, subsequent evaluation of the stationary phases using higher conditioning temperatures revealed that the efficiencies of these capillaries decrease rapidly. After conditioning up to 350° C., volatilization of the ionic liquids resulted in efficiencies that dropped to several hundred plates/meter. No retention of naphthalene was observed after conditioning the capillaries to 380° C., indicating an insufficient amount of ionic liquid remained on the capillary wall.

To produce a more thermally robust ionic liquid matrix, geminal dicationic vinylimidazolium crosslinkers with different length alkyl chains separating the dications were mixed with the monocationic monomers. These mixtures are shown in Table B under the heading "partially/fully crosslinked matrices." From our previous solution-based polymerization experiments, it was found that the concentration of crosslinker is crucial for the formation of a matrix exhibiting ideal stationary phase properties (data not shown). Compound 4 (see EXAMPLE A—Table A), is a mixture of three dicationic ionic liquids separated by a six carbon linkage chain. Electrospray mass spectrometry indicated that for every one of the 1,6-di(3-methylimidazolium)hexane[$C_6$(mim)$_2^{2+}$] dications and 1,6-di(3-vinylimidazolium)hexane [$C_6$(vim)$_2^{2+}$] dications, there are two of the 1-(3-vinylimidazolium)-6-(3'-methylimidazolium)hexane [$C_6$vm(im)$_2^{2+}$] dications. When a column was prepared by polymerizing/immobilization only this mixture, the initial efficiency after conditioning to 120° C. was nearly 3000 plates/meter (EXAMPLE A—Table B). Moreover, the efficiency dropped much less after conditioning the capillary at higher temperatures. For example, the efficiency of 4 after conditioning at 350° C. was 1365 plates/meter whereas the efficiencies of the monocationic ionic liquids without crosslinker ranged from 120 to 197 plates/meter after the same conditioning step. Clearly, by crosslinking the ionic liquids, the efficiency and thermal stability of the stationary phase is preserved at higher temperatures.

A series of different crosslinked ILs were also synthesized using various ratios of 1-vinyl-3-hexylimidazolium bis[(trifluoromethane)sulfonyl]imidate (1) and the dication mixture 4, described above. The highest efficiencies were obtained with crosslinking mixtures formed with equal percentages of the monocationic and crosslinking monomers whereas copolymers formed with a higher concentration of crosslinker exhibited lower efficiencies (see EXAMPLE A—Table B). The effect of the alkyl side chain of the monocationic monomer was investigated by preparing equal molar ratios of the crosslinking mixture 4 with two other monocationic monomers, 1-vinyl-3-nonylimidazolium bis[(trifluoromethane)sulfonyl]imidate (2) and 1-vinyl-3-dodecylimidazolium bis[(trifluoromethane)sulfonyl]imidate (3). As Table B illustrates, there is very little difference between these different composition crosslinked matrices in terms of separation efficiency and loss of efficiency at high temperatures. Recall that previously it was noted that when the monocationic monomers were polymerized without crosslinker, the length of the alkyl group appeared to have an effect on the separation efficiency/thermal stability of the stationary phase at higher temperatures. This demonstrates that the length of the alkyl group on the monocationic monomer plays less of a role in the loss of separation efficiency at high temperatures when it is part of a crosslinked stationary phase.

Ionic liquid stationary phases based only on crosslinking monomers were also evaluated. As shown in EXAMPLE A Table B, one mixture was based on the crosslinking of vinylimidazolium dications separated by a nonane linkage chain (0.20% 5) while the second mixture consisted of ionic liquids 5, 6, 7, and 8, namely dicationic ionic liquid monomers separated by a nonane, decane, undecane, and dodecane linkage chain, respectively. This mixture of four crosslinkers, abbreviated as $C_{9-12}$(vim)$_2$-NTf$_2$ in EXAMPLE A—Table 4, was made due to the fact that compounds 6 and 8 are supercooled solids at room temperature and, therefore, are not ideal monomers for creating "gummy" or "waxy" stationary phases. This mixture consists of 10.88% by weight of 5, 9.29% of 6, 19.59% of 7, and 60.24% of 8.

A couple of interesting trends were observed for the highly crosslinked ionic liquid stationary phases that were not observed for the monocationic linear or partially crosslinked materials. First, although the separation efficiency of the completely crosslinked stationary phases was low after conditioning to 380° C., the ionic liquid stationary phase was still present as a thin film in the capillary when viewed under microscope after prolonged exposure to this temperature. In contrast, only a few partially crosslinked stationary phases (see EXAMPLE A—Table B) provided retention of naphthalene after high temperature conditioning. All stationary phases formed using monocationic monomers alone appeared to have decomposed and/or volatilized completely from the capillary wall after conditioning to 380° C.

The most impressive and interesting characteristic of the completely crosslinked ionic liquid stationary phases is their apparent ability to exhibit a substantial increase in efficiency after conditioning at high temperatures. Examples of this are found in EXAMPLE A—Table B under the heading "Crosslinked Ionic Liquid Matrix." In one such example, a crosslinked matrix previously described containing a mixture of four dicationic crosslinkers, $C_{9-12}$(vim)$_2$-NTf$_2$ was formed and the efficiency of this stationary phase was observed to undergo a 200%-250% increase in efficiency when the column was conditioned from 300° C. to 350° C. (see EXAMPLE A—Table B). This trend was observed on all highly crosslinked stationary phases examined and appears to be independent of the initial AIBN concentration in the coating solution (see EXAMPLE A—Table C).

The fact that the efficiencies of the highly crosslinked stationary phases increase in this narrow temperature range is not well understood, but certainly makes them very useful for high temperature separations. Clearly, by exhibiting this behavior, these stationary phases appear to exhibit the smallest decrease in efficiency up to temperatures around 350° C. For low to moderate temperature separations (25° C. to 285° C.), the partially crosslinked stationary phases, particularly those containing equal weight percentages of ionic liquids 2 and 5, provide the highest efficiency separations up to 285° C. with little column bleed at temperatures at and above 250° C. Meanwhile, the completely crosslinked stationary phases provides the highest efficiency separations with little column bleed up to temperatures around 300° C.-380° C. Therefore, these two optimized types of immobilized ionic liquid stationary phases are specifically proposed for normal GC temperature ranges and higher GC temperatures, respectively. Low to moderate temperature separations are optimal with partial crosslinking of the stationary phase whereas high temperature separations require more extensive crosslinking to maintain acceptable efficiency and low column bleed.

The two optimized crosslinked stationary phases chosen for the moderate (0.10% 2 and 0.10% 5) and high temperature (0.20% $C_{9-12}$(vim)$_2$-NTf$_2$) separations, were further studied to determine the effect of AIBN initiator concentration on their separation efficiency and thermal stability. As shown in Table B, each copolymer was formed using a different concentration of AIBN in the coating solution. These concentrations ranged from 10.0% (w/w of AIBN to ionic liquid) to 0.5%. For the partially crosslinked stationary phase, a higher weight percentage of initiator results in a slightly more efficient stationary phase (i.e., 3296 plates/meter for 0.5% AIBN to 3817 plates/meter for 10.0% AIBN). In addition, the efficiencies of the 7.0% and 10.0% by weight initiator copolymers decrease less rapidly at higher temperatures (>250° C.) compared to those ionic liquid matrices produced with lower initiator concentrations. After the stationary phase is subjected to a temperature ramp up to 385° C., only the two copolymers formed with 7.0% and 10.0% initiator provide retention of naphthalene, however with very low efficiency. The other two crosslinked stationary phases were no longer observed in the capillary after high temperature conditioning (385° C.) and therefore provided no retention.

In the case of the highly crosslinked stationary phase (0.20% $C_{9-12}(vim)_2-NTf_2$), a nearly opposite trend to that observed for the partially crosslinked ionic liquids was observed (EXAMPLE A—Table B). The efficiencies of the columns after the first conditioning step are higher for the copolymers formed with lower AIBN concentration. However, it was still found that a higher weight percentage of AIBN results in a smaller decrease of efficiency at higher temperatures compared to the copolymers formed with lower percentages of AIBN. All of the highly crosslinked stationary phases were found to retain naphthalene after conditioning at 385° C. As discussed previously, the highly crosslinked stationary phases exhibit an increase in the separation efficiency for naphthalene after being conditioned to 350° C. as compared to being conditioned at only 300° C. The magnitude of this increase does not appear to be directly related to the initiator concentration. For example, the efficiency increase exhibited by the copolymer formed with 3.5% AIBN is .about.171% higher after the 350° C. program compared to the 300° C. program whereas that for the 10% AIBN is .about.250% higher. As previously observed for the partially crosslinked ionic liquids, the overall decrease in efficiency is lowest for copolymers formed with higher AIBN concentrations.

This indicates that at high temperatures the most efficient stationary phases appear to be those that are crosslinked with a weight percentage of AIBN greater than 7.0%. In contrast, for lower/normal temperature separations, the choice of the monocationic monomer and crosslinker plays a more important role in the stationary phase efficiency and higher initiator concentration tends to prevent large decreases in efficiency with increasing temperature (see Table B).

It has been demonstrated previously that room temperature ionic liquids act as broadly applicable, superb gas chromatographic stationary phases in that they exhibit a dual nature retention behavior. Consequently, ionic liquid stationary phases have been shown to separate, with high efficiency, both polar and nonpolar molecules on a single column. By producing stationary phases that are either partially or highly crosslinked, it is of interest to ensure that the solvation thermodynamics and solvation interactions inherent to ionic liquids are still retained by their immobilized analogues.

The thermodynamics (Table D) and solvation interactions (EXAMPLE A—Table E) for the two optimized crosslinked and a neat ionic liquid were determined as previously described in the Experimental Section. As can be seen from the data in these tables, both the free energy of transfer of solute and particularly their interaction parameters are similar for both the crosslinked and neat monomeric ionic liquid stationary phases. While the enthalpies of solvation for all probe molecules differed only slightly between the three ionic liquids, a larger difference was observed for the entropies of solvation on the highly crosslinked stationary phase for certain solutes, i.e., 2-chloroaniline, ethyl phenyl ether, and decane. The entropies of solvation were somewhat more negative for these molecules indicating that they are part of a more ordered environment with the highly crosslinked stationary phase. These results also indicate that solvation by these three ionic liquid-based stationary phases has a substantial entropic component that contributes to large differences in solute free energy of transfer (see values for 2-chloroaniline and decane in EXAMPLE A—Table D).

The solvation interaction parameters given in EXAMPLE A—Table E indicate that the neat and two crosslinked ionic liquids are very similar in terms of selectivity. All three stationary phases interact weakly via nonbonding and π-electrons (r-term). The hydrogen bond basicity (a) and dispersion forces (l) were the same within experimental error for all three stationary phases. The partially crosslinked and neat ionic liquids possessed the same magnitude of dipolar interactions which were somewhat lower than those exhibited by the highly crosslinked ionic liquid (see EXAMPLE A—Table E). Within experimental error, all three ionic liquids possessed the same ability to undergo hydrogen bond acidity (b) interactions.

Figure 6:
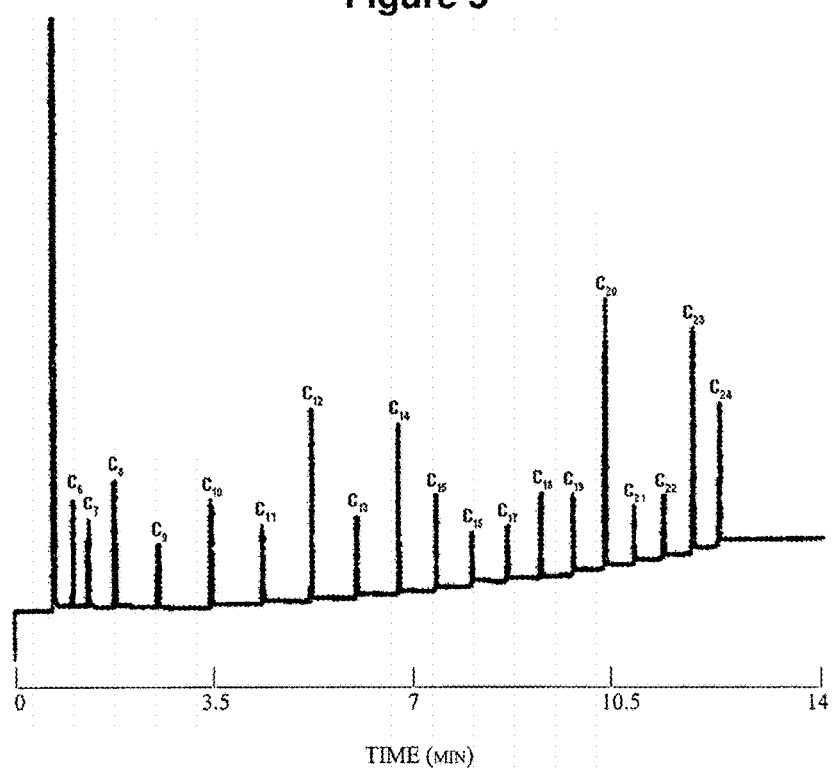
FIG. 6: is a chromatogram showing the separation of fatty acid methyl esters (C$_6$-C$_{24}$) on a 15 meter partially cross-linked ionic liquid stationary phase (0.10% nvim-NTf$_2$ (2)/10% C$_9$(vim)$_2$-NTf$_2$ (5) with 7.5% AIBN). Conditions: 100° C. hold 2 minutes, 15° C./min to 260° C.
Figure 7:
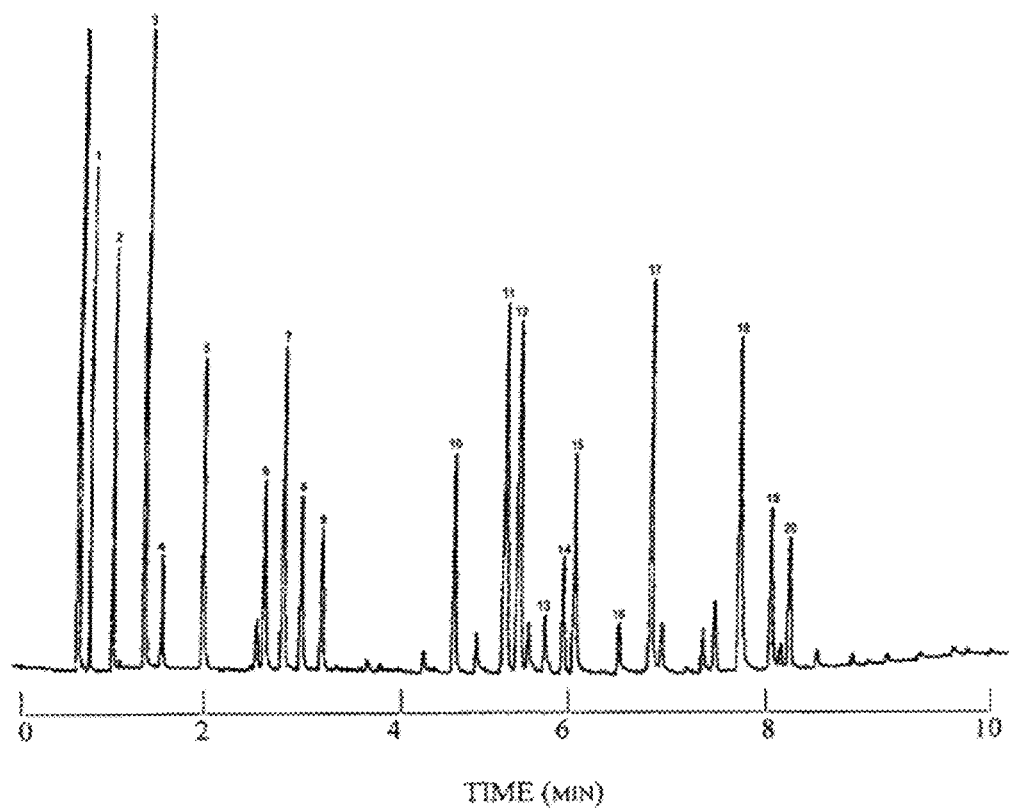
FIG. 7: A chromatogram showing the Separation of PAH and chlorinated pesticide mixture on a 13 meter C$_9$(vim)$_2$-NTf$_2$ (7.5% AIBN) more likely cross-linked ionic liquid stationary phase. 1, indene; 2, naphthalene; 3, biphenyl; 4, azulene; 5, acenaphthene; 6, acenaphthylene; 7, heptachlor; 8, fluorene; 9, BHC; 10, dibenzothiophene; 11, DDE; 12; endosulfan; 13, anthracene; 14, dieldrin; 15, 4H-cyclopenta [def]phenanthrene; 16, fluoranthene; 17, DDT; 18, lindane; 19, pyrene; 20, carbazole. Conditions: 175° C. for 1 min; 20° C./min to 335° C. The smaller, unnumbered peaks in this chromatogram are impurities contained in numbered standard materials.

The unique selectivity of ionic liquid stationary phases in the separation of a wide variety of analyte molecules including alcohols, alkanes, polycyclic aromatic hydrocarbons (PAHs), polychlorinated biphenyls (PCBs), and chlorinated pesticides have been demonstrated. The fact that the selectivity of the ionic liquid stationary phases is preserved after crosslinking the matrix is demonstrated in FIG. 6 and FIG. 7. FIG. 6 shows a separation of 19 fatty acid methyl esters (FAMEs) on a 15 meter column coated with a partially crosslinked IL stationary phase. This separation is performed in 12 minutes using the temperature ramp described. FIG. 7 illustrates the separation of a mixture of PAHs and chlorinated pesticides on a 12 meter highly crosslinked stationary phase. The 9 minute, high temperature GC separation is carried out using a temperature program up to 335° C. with little observed column bleed. While the selectivity of these ionic liquids is little different from that observed previously with the neat ionic liquids, the fact that separations can now be accomplished at higher temperatures with little column bleed, high efficiency, and little shifting of the retention time after exposure to extreme temperatures further demonstrates the effectiveness of the immobilized ionic liquid.

This work addresses the fundamental issues relating to the use of ionic liquid stationary phases at high temperatures and column ruggedness. Specifically, it was demonstrated that by employing ionic liquid monocationic monomers and dicationic crosslinkers, an immobilized GC stationary phase can be developed. The cross-linked stationary phases retain the dual nature selectivity behavior inherent to all ionic liquid stationary phases. In addition, the columns can be used at high temperatures with low column bleed while simultaneously providing high efficiency separations. Two types of stationary phases were identified in this work and differ in terms of their maximum/minimum operating temperatures. Partially crosslinked stationary phases are best for separations conducted at temperatures from ambient to 280° C. while a mostly crosslinked stationary phase is best suited for temperatures over 300° C. While the moderate to high temperature range of the mostly crosslinked stationary phase may overlap with the partially crosslinked matrix, lower efficiency separations were observed with the mostly crosslinked stationary phase at low temperatures. Moreover, a dramatic increase in efficiency of the mostly crosslinked stationary phase at high temperatures further adds to its effectiveness and usefulness for a variety of applications in high temperature gas chromatography studies.

Of course, ionic liquids and in particular the diionic liquid salts of the present invention can be used in other separation and analytical techniques. Their range of applicability is in no way limited to chromatography. One technique in which these materials can be used in Solid Phase Extraction ("SPE"). In SPE, a sample contains an impurity or some other element to be separated, identified and/or quantified. This sample can be placed into a container in which diionic liquid salts of the present invention can be present in, and more broadly, ionic liquids in an immobilized form. Ionic liquid materials can be bound (immobilized) to the walls of the container, adsorbed, absorbed onto a bead or other structure so as to form a bead or other structure which may rest at the bottom of the container or be packed throughout the container much as a liquid chromatography column can be packed with stationary phase. Alternatively, the ionic liquids and in particular diionic liquid salts of the present invention can be immobilized by cross-linking or an analogous immobilization reaction as described herein on some sort of other solid support such as a bead used in chromatography. These beads can also be placed at the bottom of, or can fill a container, much as a packed column used for liquid chromatography. Of course, the solid support can be any structure placed any where within the container.

In a particularly preferred embodiment, the container is actually a syringe where the ionic liquid and/or diionic liquid salts are affixed or disposed in one fashion or another at the base of the syringe, much as a filter. When the needle of the syringe is placed in a sample and the plunger is withdrawn, vacuum is formed drawing sample up into the barrel of the syringe. This material would pass through at least one layer of ionic liquid and, in particular, diionic liquid salts in accordance with the present invention, which would bind at least one of the components of the liquid. The sample liquid could then be spilled out or the plunger depressed to eject it, the latter forcing the sample back through the ionic liquid or diionic liquid salts positioned at the bottom of the barrel.

The liquid can be analyzed either for the presence of certain materials or the absence of the material retained by the ionic liquid or diionic liquid salts of the present invention. Alternatively, the retained materials can be removed (such as by placing the materials in a different solvent) or not and analyzed analytically by other means. The same technique may be used in a preparative fashion and/or as a means of bulk purification as well.

Another technique in which immobilized ionic liquids and diionic liquid salts of the present invention may be used is solid phase microextraction or SPME. Broadly speaking, in these techniques, a separation material (in this case an ionic liquid or in particular a diionic liquid salt in accordance with the present invention) is absorbed, adsorbed or immobilized in one way or another on a fiber generally attached to a plunger in a microsyringe such as usually used in gas chromatography. In the case of the invention, immobilized ionic liquids and absorbed, adsorbed and immobilized diionic liquid salts are contemplated. The plunger is depressed, exposing the fiber and the fiber is then dipped into the sample of interest. The plunger can then be withdrawn to pull the fiber back into the barrel of the syringe, or at least the barrel of the needle for protection and transport. The syringe can then be injected through the septum of a gas chromatograph or some other device and the fiber thereby inserted into the column by redepressing the plunger of the microsyringe. The heat used in GC then volatilizes or otherwise drives the bound sample off where it is carried by the mobile phase through the GC column, allowing for separation and/or identification. It can also be eluted by a liquid mobile phase in an HPLC injector or unbuffer capillary electrophoresis.

More specifically, solid phase microextraction is a technique in which a small amount of extracting phase (in this case an ionic liquid and preferably a diionic liquid salt in accordance with the present invention) is disposed on a solid support, which was then exposed to a sample for a period of time. In situations where the sample is not stirred, a partitioning equilibrium between a sample matrix and the extraction phase is reached. In cases where convection is constant, a short time pre-equilibrium extraction is realized and the amount of analyte extracted is related to time. Quantification can then be performed based on the timed accumulation of analysis in the coating. These techniques are usually performed using open bed extraction concepts such as by using coated fibers (e.g., fused silica similar to that used in capillary GC or capillary electrophoresis, glass fibers, wires, metal or alloy fibers, beads, etc.), vessels, agitation mechanism discs and the like. However, in-tube approaches have also been demonstrated. In-tube approaches require the extracting phase to be coated on the inner wall of the capillary and the sample containing the analyte of interest is subject to the capillary and the analytes undergo partitioning to the extracting phase. Thus, material can be coated on the inner wall of a needle, for example, and the needle injected without the need for a separate solid support.

Figure 8:
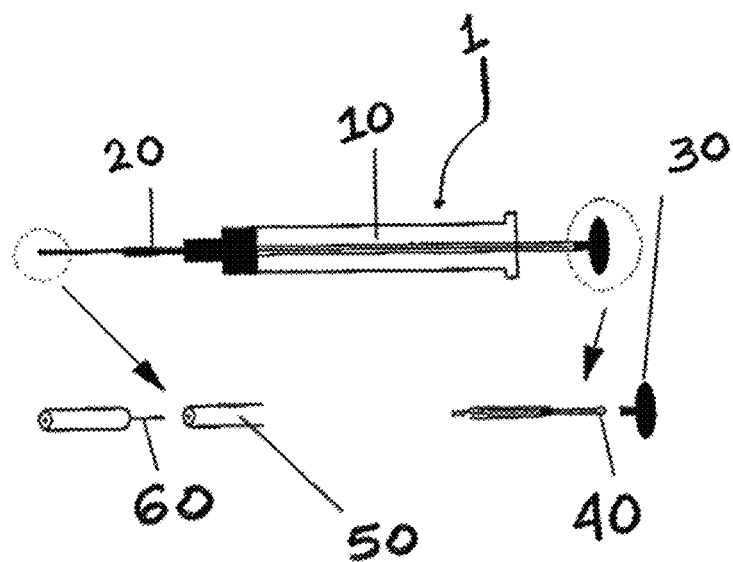
FIG. 8: A syringe useful for SPME and SPME/MALDI mass spectrometry.
Figure 9:
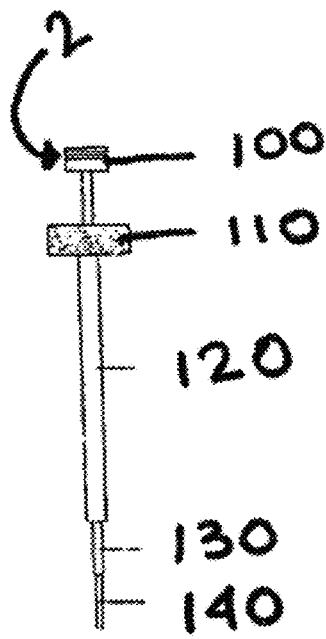
FIG. 9: Another syringe useful for SPME and SPME/MALDI mass spectrometry.

FIG. 8 shows an example of an SPME device (1). A stainless steel microtube 40 having an inside diameter slightly larger than the outside diameter of, for example, a fuse silica rod 60 is used. Typically, the first 5 mm is removed from a 1.5 cm long fiber, which is then inserted into the microtubing. High temperature epoxy glue is used to permanently mount the fiber. Sample injection is then very much like standard syringe injection. Movement of the plunger 30 allows exposure of the fiber 60 during extraction and desorption and its protection in the needle 20 during storage and penetration of the septum. 10 shows the barrel of the microsyringe, 50 shows the extreme end of the stainless steel microtube in which the silicon fiber is mounted. Another version of a syringe useful for SPME in accordance with the present invention is illustrated in FIG. 9. Syringe 2 can be built from a short piece of stainless steel microtubing 130 to hold the fiber. Another piece of larger tubing 120 works as the needle. A septum 110 is used to seal the connection between the microtubing 130 and the needle 120. The silica fiber 140 is exposed through one end of the microtubing 130 and the other end is blocked by a plunger 100. Withdrawing plunger 100 retracts microtubing 130 and the fiber 140 into the barrel of the device, the needle 120. Depressing plunger 100 reverses this process. These are but exemplary structures and any syringe device, including those containing a needle or tube with the ionic liquid immobilized on the inner surface thereof are also contemplated.

Any monoionic liquid or diionic liquid salt may be used in accordance with the present invention. Diionic liquids such as those shown immediately below can be absorbed or adsorbed onto a solid support as previously described.

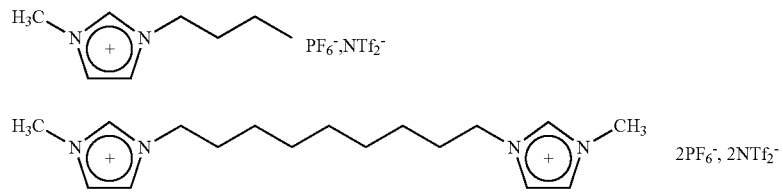

In addition, ionic liquids, both monoionic and diionic liquid salts in accordance with the present invention can be immobilized by being bound or cross-linked to themselves and to a solid support as previously discussed in connection with manufacturing capillary GC columns. To do so, however, the species used should have at least one unsaturated group disposed to allow reaction resulting in immobilization. See for example the monocationic and dicationic species immediately below.

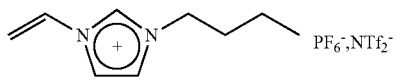

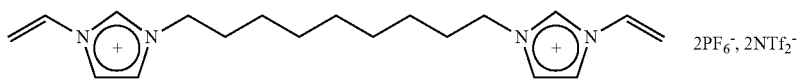

Another type of SPME technique is known as task specific SPME or TSSPME. Task specific SPME allows for the separation or removal, and therefore the detection of particular species. These can include, for example, mercury and cadmium, although the technique is equally applicable to other materials. The concept is exactly the same as previously described with regard to SPME. However, in this instance, the ionic liquids or diionic liquids used are further modified such that they will specifically interact with a particular species. Those shown below, for example, may be used in the detection of cadmium and mercury ($Cd^{2+}$ or $Hg_{2+}$). The first monocationic material can be coated, absorbed or adsorbed onto a fiber as previously discussed. A diionic liquid salt can also be absorbed or adsorbed in known fashion. The second and third ionic liquid materials illustrated below, the first monoionic and the second dicationic, by virtue of the presence of unsaturated groups, can be more easily immobilized on a solid support using techniques analogous to those described previously with regard to cross-linking in connection with manufacturing capillary GC columns.

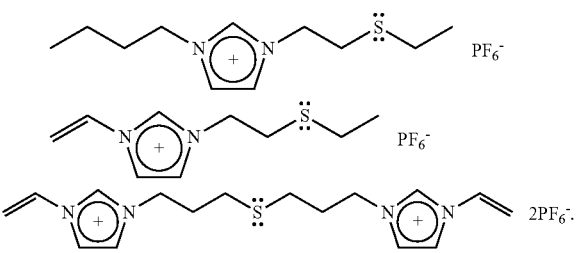

Finally, a particular sample can be suspended in a matrix that includes ionic liquids and preferably diionic liquid salts in accordance with the present invention. This matrix can be loaded or immobilized on the fiber of an SPME syringe as described above and then injected into a mass spectrometer to practice a technique known as SPME/MALDI mass spectrometry. The matrix is exposed to a UV laser. This causes the volatilization or release of the sample much as heat does in a GC. This allows the sample to enter mass spectrometer where it can be analyzed. Ionic materials which can be used as a matrix include, without limitation:

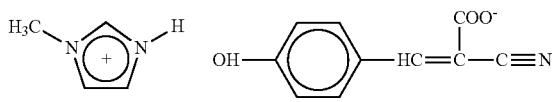

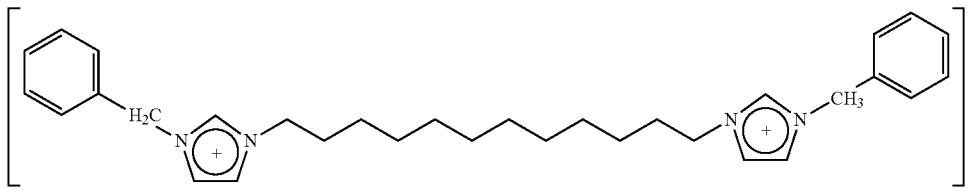

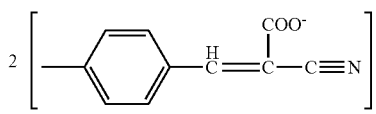

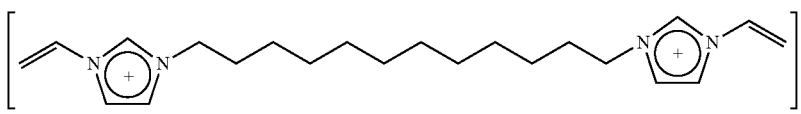

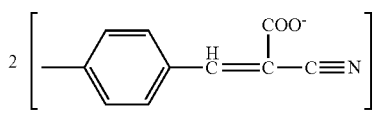

TABLE A

Structure and physico-chemical properties of the monomers/crosslinkers used in this study

| # | Ionic Liquid | Molecular Weight (g/mol) | Density (g/cm$^3$) | Refractive Index |
|---|---|---|---|---|
| 1 | 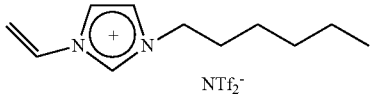<br>hvim-NTf$_2$[a] | 459.1 | 1.36 | 1.443 |
| 2 | 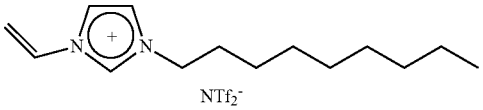<br>nvim-NTf$_2$[b] | 501.2 | 1.28 | 1.445 |
| 3 | 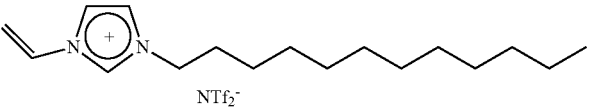<br>dvim-NTf$_2$[c] | 543.3 | 1.23 | 1.448 |
| 4 | 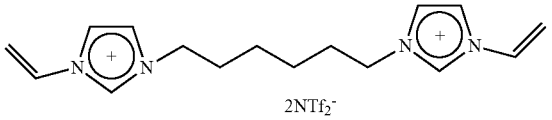<br>C$_6$(vim)$_2$-NTf$_2$[d] | 832.1 | 1.53 | 1.449 |
|   | 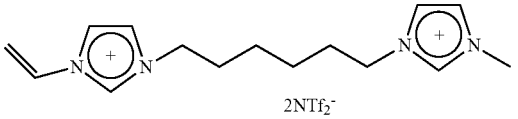<br>C$_6$vm(im)$_2$-NTf$_2$[e] | 820.1 | | |
|   | 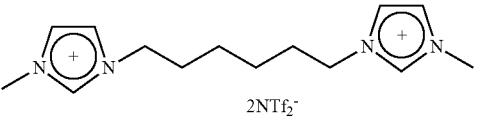<br>C$_6$(mim)$_2$-NTf$_2$[f]<br><br>C$_6$(vim)$_2$-NTf$_2$:C$_6$vm(im)$_2$-NTf$_2$:C$_6$(mim)$_2$-NTf$_2$<br>1:2:1 | 808.1 | | |
| 5 | 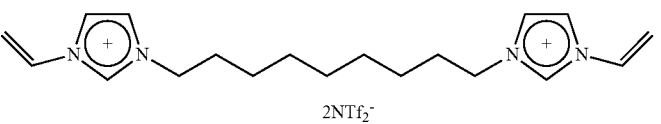<br>C$_9$(vim)$_2$-NTf$_2$[g] | 874.3 | 1.47 | 1.457 |
| 6 | 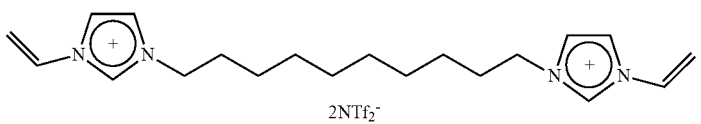<br>C$_{10}$(vim)$_2$-NTf$_2$[h,*] | 888.3 | — | — |

TABLE A-continued

Structure and physico-chemical properties of the monomers/crosslinkers used in this study

| # | Ionic Liquid | Molecular Weight (g/mol) | Density (g/cm$^3$) | Refractive Index |
|---|---|---|---|---|
| 7 | $C_{11}(vim)_2$-$NTf_2^j$ (2$NTf_2^-$) | 902.3 | 1.44 | 1.457 |
| 8 | $C_{12}(vim)_2$-$NTf_2^{j,*}$ (2$NTf_2^-$) | 916.3 | 1.42 | 1.458 |
| 9 | nmim-$NTf_2^k$ ($NTf_2^-$) | 489.3 | 1.30 | 1.434 |

TABLE B

Effect of monomer structure and degree of crosslinking on stationary phase efficiency (theoretical plates/mater) as a function of conditioning temperature.

| | Monocationic Linear Ionic Liquid Polymers$^a$ | | | Partially Crosslinked Ionic Liquid Matrix$^a$ | | | | | |
|---|---|---|---|---|---|---|---|---|---|
| | | | | 0.10% 1 | 0.15% 1 | 0.05% 1 | 0.10% 1 | 0.10% 2 | |
| | 0.20% 1 | 0.20% 2 | 0.20% 3 | 0.20% 4 | 0.10% 4 | 0.05% 4 | 0.15% 4 | 0.10% 5 | 0.10% 4 |
| 30° C.-120° C. 3° C./min Hold 2 hours | 2813 | 2429 | 1860 | 2926 | 2916 | 2714 | 1768 | 3660 | 2938 |
| 100° C.-200° C. 3° C./min Hold 5 hours | 2415 | 2322 | 1694 | 2426 | 2769 | 2085 | 1679 | 3301 | 2775 |
| 150° C.-250° C. 3° C./min Hold 3 hours | 2172 | 2026 | 1706 | 1945 | 2639 | 2156 | 1827 | 2743 | 2449 |
| 200° C.-285° C. 3° C./min Hold 2 hours | 1778 | 1677 | 1100 | 1710 | 2180 | 2047 | 1623 | 2088 | 2302 |
| 200° C.-300° C. 3° C./min Hold 1 hour | 1542 | 1432 | 1090 | 1517 | 1835 | 1626 | 1226 | 1419 | 2058 |
| 200° C.-350° C. 3° C./min Hold 1 hour | 197 | 142 | 120 | 1365 | 417 | 433 | 719 | 1119 | 523 |
| 200° C.-380° C. 3° C./min Hold 20 min | — | — | — | 193 | — | — | — | 291 | — |

| | Partially Crosslinked Ionic Liquid Matrix$^a$ | | | Crosslinked Ionic Liquid Matrix$^a$ | |
|---|---|---|---|---|---|
| | 0.10% 2 0.10% 5 | 0.10% 3 0.10% 4 | 0.20% 5 | 0.20% $C_{9-12}(vim)_2$-$NTf_2$ | 0.10% 1 0.10% $C_{9-12}(vim)_2$-$NTf_2$ |
| 30° C.-120° C. 3° C./min Hold 2 hours | 3566 | 2957 | 3206 | 3189 | 3155 |

TABLE B-continued

Effect of monomer structure and degree of crosslinking on stationary phase efficiency (theoretical plates/mater) as a function of conditioning temperature.

| | | | | | |
|---|---|---|---|---|---|
| 100° C.-200° C. 3° C./min Hold 5 hours | 3277 | 2872 | 3019 | 2634 | 2379 |
| 150° C.-250° C. 3° C./min Hold 3 hours | 3016 | 2787 | 2469 | 1963 | 1598 |
| 200° C.-285° C. 3° C./min Hold 2 hours | 2536 | 2361 | 1554 | 898 | 771 |
| 200° C.-300° C. 3° C./min Hold 1 hour | 2024 | 2157 | 1334 | 941 | 554 |
| 200° C.-350° C. 3° C./min Hold 1 hour | 146 | 340 | 2101 | 1891 | 950 |
| 200° C.-380° C. 3° C./min Hold 20 min | — | — | 503 | 269 | 239 |

[a]Ionic liquid polymer formed using 3.5% AIBN

TABLE C

Effect of AIBN initiator concentration on efficiency (theoretical plates/meter) as a function of conditioning of the crosslinked stationary phase. The percentage of AIBN initiator indicated is based on the weight percent of the ionic liquid.

| | Partially Crosslinked Ionic Liquid Matrix | | | | Crosslinked Ionic Liquid Matrix | | | |
|---|---|---|---|---|---|---|---|---|
| | 0.10% 2 0.10% 5 0.5% AIBN | 0.10% 2 0.10% 5 3.5% AIBN | 0.10% 2 0.10% 5 7.0% AIBN | 0.10% 2 0.10% 5 10.0% AIBN | 0.20% $C_{9-12}(vim)_2$-$NTf_2$ 0.5% AIBN | 0.20% $C_{9-12}(vim)_2$-$NTf_2$ 3.5% AIBN | 0.20% $C_{9-12}(vim)_2$-$NTf_2$ 7.0% AIBN | 0.20% $C_{9-12}(vim)_2$-$NTf_2$ 10.0% AIBN |
| 30° C.-120° C. 3° C./min Hold 2 hours | 3296 | 3566 | 3831 | 3817 | 3426 | 3155 | 2792 | 2905 |
| 100° C.-200° C. 3° C./min Hold 5 hours | 3215 | 3277 | 3703 | 3529 | 2697 | 2379 | 2275 | 2309 |
| 150° C.-250° C. 3° C./min Hold 3 hours | 3090 | 3016 | 3069 | 3027 | 1723 | 1598 | 1682 | 1398 |
| 200° C.-285° C. 3° C./min Hold 2 hours | 2210 | 2536 | 2375 | 2559 | 950 | 771 | 865 | 649 |
| 200° C.-300° C. 3° C./min Hold 1 hour | 1317 | 2024 | 2298 | 2009 | 676 | 554 | 768 | 603 |
| 200° C.-350° C. 3° C./min Hold 1 hour | 112 | 146 | 598 | 1214 | 1593 | 950 | 1664 | 1506 |
| 285° C.-385° C. 3° C./min Hold 20 min | — | — | 140 | 68 | 178 | 239 | 490 | 453 |

TABLE D

Comparison of solvation thermodynamics of one neat and two crosslinked ionic liquids.

| | Temp. Range | | Partially Crosslinked IL 0.10% nvim-$NTf_2$ (2) 0.10% $C_9(vim)_2$-$NTf_2$ (5) 3.5% AIBN | | | Neat Monomeric IL 0.20% nmim-$NTf_2$(9) | | | Mostly Crosslinked IL 0.20% $C_{9-12}(vim)_2$-$NTf_2$[a] 3.5% AIBN | | |
|---|---|---|---|---|---|---|---|---|---|---|---|
| | (° C.) | | ΔG (J/mol) | $\Delta H_{AV}$ (J/mol) | $\Delta S_{AV}$ (J/mol *K) | ΔG (J/mol) | $\Delta H_{AV}$ (J/mol) | $\Delta S_{AV}$ (J/mol *K) | ΔG (J/mol) | $\Delta H_{AV}$ (J/mol) | $\Delta S_{AV}$ (J/mol *K) |
| Probe Molecule | Min | Max | | | | | | | | | |
| Fluorophenol | 40 | 100 | −6071 (70° C.) | −49308 ± 31.0 | −126 ± 2.3 | −6583 (70° C.) | −48104 ± 79.5 | −121 ± 0.25 | −5429 (70° C.) | −48323 ± 482.7 | −125 ± 1.52 |

TABLE D-continued

Comparison of solvation thermodynamics of one neat and two crosslinked ionic liquids.

| | Temp. Range | | Partially Crosslinked IL 0.10% nvim-NTf$_2$ (2) 0.10% C$_9$(vim)$_2$-NTf$_2$ (5) 3.5% AIBN | | | Neat Monomeric IL 0.20% nmim-NTf$_2$(9) | | | Mostly Crosslinked IL 0.20% C$_{9-12}$(vim)$_2$-NTf$_2^a$ 3.5% AIBN | | |
|---|---|---|---|---|---|---|---|---|---|---|---|
| | (° C.) | | ΔG | ΔH$_{AV}$ | ΔS$_{AV}$ | ΔG | ΔH$_{AV}$ | ΔS$_{AV}$ | ΔG | ΔH$_{AV}$ | ΔS$_{AV}$ |
| Probe Molecule | Min | Max | (J/mol) | (J/mol) | (J/mol *K) | (J/mol) | (J/mol) | (J/mol *K) | (J/mol) | (J/mol) | (J/mol *K) |
| Naphthalene | 40 | 100 | −10087 (70° C.) | −54353 ± 23.7 | −129 ± 0.67 | −10209 (70° C.) | −53789 ± 91.0 | −127 ± 0.31 | −8902 (70° C.) | −52825 ± 52.3 | −128 ± 0.15 |
| 2-Chloroaniline | 40 | 100 | −11320 (70° C.) | −56616 ± 18.1 | −132 ± 0.06 | −11670 (70° C.) | −57652 ± 57.5 | −134 ± 0.17 | −10064 (70° C.) | −57075 ± 63.4 | −137 ± 0.21 |
| Ethyl Phenyl Ether | 35 | 75 | −7058 (50° C.) | −46482 ± 140 | −122 ± 0.52 | −7420 (50° C.) | −46521 ± 69.0 | −121 ± 0.21 | −5622 (50° C.) | −46662 ± 409 | −127 ± 1.31 |
| 1-Octanol | 35 | 75 | −10433 (50° C.) | −59229 ± 50.7 | −151 ± 0.23 | −10481 (50° C.) | −59277 ± 58.2 | −151 ± 0.44 | −8213 (50° C.) | −56039 ± 58.1 | −148 ± 0.15 |
| Decane | 35 | 75 | −4457 (50° C.) | −45497 ± 363 | −127 ± 1.5 | −4349 (50° C.) | −45389 ± 138 | −127 ± 0.46 | −1813 (50° C.) | −46408 ± 98.7 | −138 ± 3.52 |
| Nitropropane | 27 | 50 | −5220 (35° C.) | −38808 ± 49.5 | −109 ± 0.17 | −5422 (35° C.) | −39010 ± 312 | −109 ± 1.0 | −4367 (35° C.) | −38263 ± 198 | −110 ± 0.60 |

$^a$This mixture consists of a combination of a homologous series of ionic liquids that are 10.88% by weight of 5, 9.29% of 6, 19.59% of 7, and 60.24% of 8.

TABLE E

Comparison of interaction parameters of one neat and two crosslinked ionic liquids.

| Temp (° C.) | c | r | s | a | b | l | n | R$^2$ | F |
|---|---|---|---|---|---|---|---|---|---|
| | | | | 0.20% nmim-NTf$_2$(9) | | | | | |
| 40 | −2.98 (0.11) | 0 (0.09) | 1.62 (0.10) | 1.91 (0.10) | 0.36 (0.13) | 0.75 (0.03) | 32 | 0.99 (0.10) | 477.86 |
| 70 | −3.05 (0.08) | 0 (0.07) | 1.54 (0.07) | 1.57 (0.07) | 0.18 (0.10) | 0.63 (0.02) | 32 | 0.99 (0.07) | 660.78 |
| 100 | −3.47 (0.11) | 0 (0.09) | 1.52 (0.10) | 1.43 (0.09) | 0.12 (0.13) | 0.60 (0.03) | 30 | 0.99 (0.09) | 304.17 |
| | | | | 0.10% C$_9$(vim)-NTf$_2$ (2); 0.10% C$_9$(vim)$_2$-NTf$_2$ (5); 3.5% AIBN | | | | | |
| 40 | −2.95 (0.11) | 0 (0.10) | 1.60 (0.11) | 1.84 (0.10) | 0.45 (0.15) | 0.71 (0.03) | 32 | 0.99 (0.10) | 404.82 |
| 70 | −3.05 (0.08) | 0 (0.07) | 1.57 (0.08) | 1.53 (0.07) | 0.37 (0.10) | 0.60 (0.02) | 32 | 0.99 (0.07) | 639.52 |
| 100 | −3.49 (0.12) | 0 (0.09) | 1.54 (0.11) | 1.41 (0.09) | 0.31 (0.14) | 0.54 (0.03) | 30 | 0.98 (0.09) | 299.60 |
| | | | | 0.20% C$_{9-12}$(vim)$_2$-NTf$_2^b$; 3.5% AIBN | | | | | |
| 40 | −3.31 (0.10) | 0 (0.09) | 1.92 (0.10) | 1.94 (0.09) | 0.59 (0.13) | 0.68 (0.03) | 32 | 0.99 (0.09) | 573.26 |
| 70 | −3.55 (0.12) | 0 (0.10) | 1.88 (0.11) | 1.71 (0.09) | 0.46 (0.15) | 0.59 (0.03) | 32 | 0.99 (0.10) | 305.25 |
| 100 | −3.65 (0.13) | 0 (0.11) | 1.73 (0.13) | 1.46 (0.12) | 0.32 (0.18) | 0.48 (0.04) | 30 | 0.98 (0.11) | 254.83 |

$^a$r = interaction via nonbonding and π-electrons, s = dipolarity/polarizability, a = hydrogen bond basicity, b = hydrogen bond acidity, l = dispersion forces, n = number of probe molecules subjected to multiple linear regression analysis, R$^2$ = statistical correlation coefficient, F = Fisher coefficient. Values in parenthesis are the standard deviations for each interaction parameter.
$^b$This mixture consists of a combination of a homologous series of ionic liquids that are 10.88% by weight of 5, 9.29% of 6, 19.59% of 7, and 60.24% of 8.

TABLE F

Names of Compounds Found in Tables 1 and 2

| | |
|---|---|
| C$_3$(mim)$_2$—Br | 1,3-di(3-methylimidazolium)propane di-bromide |
| C$_3$(mim)$_2$—NTf$_2$ | 1,3-di(3-methylimidazolium)propane di-bis[(trifluoromethyl)sulfonyl]imidate |
| C$_3$(mim)$_2$—BF$_4$ | 1,3-di(3-methylimidazolium)propane di-tetrafluoroborate |
| C$_3$(mim)$_2$—PF$_6$ | 1,3-di(3-methylimidazolium)propane di-hexafluorophosphate |
| C$_6$(mim)$_2$—Br | 1,6-di(3-methylimidazolium)hexane di-bromide |
| C$_6$(mim)$_2$—NTf$_2$ | 1,6-di(3-methylimidazolium)hexane di-bis[(trifluoromethyl)sulfonyl]imida |
| C$_6$(mim)$_2$—BF$_4$ | 1,6-di(3-methylimidazolium)hexane di-tetrafluoroborate |
| C$_6$(mim)$_2$—PF$_6$ | 1,6-di(3-methylimidazolium)hexane di-hexafluorophosphate |

TABLE F-continued

Names of Compounds Found in Tables 1 and 2

| | |
|---|---|
| $C_9(mim)_2$—Br | 1,9-di(3-methylimidazolium)nonane di-bromide |
| $C_9(mim)_2$—$NTf_2$ | 1,9-di(3-methylimidazolium)nonane di-bis[(trifluoromethyl)sulfonyl]imidate |
| $C_9(mim)_2$—$BF_4$ | 1,9-di(3-methylimidazolium)nonane di-tetrafluoroborate |
| $C_9(mim)_2$—$PF_6$ | 1,9-di(3-methylimidazolium)nonane di-hexafluorophosphate |
| $C_{12}(mim)_2$—Br | 1,12-di(3-methylimidazolium)dodecane di-bromide |
| $C_{12}(mim)_2$—$NTf_2$ | 1,12-di(3-methylimidazolium)dodecane di-bis[(trifluoromethyl)sulfonyl]imidate |
| $C_{12}(mim)_2$—$BF_4$ | 1,12-di(3-methylimidazolium)dodecane di-tetrafluoroborate |
| $C_{12}(mim)_2$—$PF_6$ | 1,12-di(3-methylimidazolium)dodecane di-hexafluorophosphate |
| $C_9(bim)_2$—Br | 1,9-di(3-butylimidazolium)nonane di-bromide |
| $C_9(bim)_2$—$NTf_2$ | 1,9-di(3-butylimidazolium)nonane di-bis[(trifluoromethyl)sulfonyl]imidate |
| $C_9(bim)_2$—$BF_4$ | 1,9-di(3-butylimidazolium)nonane di-tetrafluoroborate |
| $C_9(bim)_2$—$PF_6$ | 1,9-di(3-butylimidazolium)nonane di-hexafluorophosphate |
| $C_3(m_2im)_2$—Br | 1,3-di(2,3-dimethylimidaolium)propane di-bromide |
| $C_3(m_2im)_2$—$NTf_2$ | 1,3-di(2,3-dimethylimidazolium)propane di-bis[(trifluoromethyl)sulfonyl]imidate |
| $C_3(m_2im)_2$—$PF_6$ | 1,3-di(2,3-dimethylimidazolium)propane di-hexafluorophosphate |
| $C_9(m_2im)_2$—Br | 1,9-di(2,3-dimethylimidazolium)nonane di-bromide |
| $C_9(m_2im)_2$—$NTf_2$ | 1,9-di(2,3-dimethylimidazolium)nonane di-bis[(trifluoromethyl)sulfonyl]imidate |
| $C_9(m_2im)_2$—$BF_4$ | 1,9-di(2,3-dimethylimidazolium)nonane di-tetrafluoroborate |
| $C_9(m_2im)_2$—$PF_6$ | 1,9-di(2,3-dimethylimidazolium)nonane di-hexafluorophosphate |
| $C_{12}(benzim)_2$—Br | 1,12-di(3-benzylimidazolium)dodecane di-bromide |
| $C_{12}(benzim)_2$—$NTf_2$ | 1,12-di(3-benzylimidazolium)dodecane di-bis[(trifluoromethyl)sulfonyl]imidate |
| $C_{12}(benzim)_2$—$PF_6$ | 1,12-di(3-benzylimidazolium)dodecane di-hexafluorophosphate |
| $C_3(mpy)_2$—Br | 1,3-di(methylpyrrolidinium)propane di-bromide |
| $C_3(mpy)_2$—$NTf_2$ | 1,3-di(methylpyrrolidinium)propane di-bis[(trifluoromethyl)sulfonyl]imidate |
| $C_3(mpy)_2$—$PF_6$ | 1,3-di(methylpyrrolidinium)propane di-hexafluorophosphate |
| $C_9(mpy)_2$—Br | 1,9-di(methylpyrrolidinium)nonane di-bromide |
| $C_9(mpy)_2$—$NTf_2$ | 1,9-di(methylpyrrolidinium)nonane di-bis[(trifluoromethyl)sulfonyl]imidate |
| $C_9(mpy)_2$—$PF_6$ | 1,9-di(methylpyrrolidinium)nonane di-hexafluorophosphate |
| $C_9(bpy)_2$—Br | 1,9-di(butylpyrrolidinium)nonane di-bromide |
| $C_9(bpy)_2$—$NTf_2$ | 1,9-di(butylpyrrolidinium)nonane di-bis[(trifluoromethyl)sulfonyl]imida |
| $C_9(bpy)_2$—$PF_6$ | 1,9-di(butylpyrrolidinium)nonane di-hexafluorophosphate |

The invention provides a method of detecting a charged molecule having a single charge (+1 or −1) using electrospray ionization-mass spectrometry (ESI-MS). In the method, a suitable amount of the diionic species of the invention having the opposite charges of the molecule of interest is added to the sample. The diionic species and the charged molecule form a salt complex. The salt complex is generally a solid. Because the diionic species has two charges, when complexed with the charged molecule, the complex has a net charge. The complex is then detected using ESI-MS. The formation of the complex converts the charged molecule into an ion having a higher mass to charge ratio m/z, which can be transferred by ESI more efficiently due to mass discrimination. The present invention thus provides an ESI-MS method with substantially improved selectivity and sensitivity. Preferred is the use of dicationic species.

In one embodiment, the method of the invention includes selecting a diionic species that has a desired composition and structure, e.g., desired charged group or a desired mass or a combination thereof. The charged group can be selected based on the composition and structure of the charged molecule to be detected. Preferably, the diionic species is specific for the charged molecule to be detected. Thus, it is preferable that the diionic species is such that it binds strongly with the charged molecule to be detected. More preferably, the charged group of the diionic species is such that it does not bind strongly with other charged molecules different from the molecule of interest in the sample. Employing a diionic species that is specific for a charged molecule of interest allows high selectivity in detecting the charged molecule. Use of diionic species having two different ionic groups may offer particular advantages in tailoring the affinities for different molecules for detection.

The mass of the diionic species is preferably selected to achieve optimal detection by the mass spectrometer. In general, a diionic species having a large mass is used. The diionic species is preferably such that the complex has a m/z higher than 50. Most commercial single quadrupole mass spectrometers are designed to have their optimum performance at m/z values significantly higher than 100. In another preferred embodiment, the diionic species is selected such that the complex has a m/z significantly higher than 100, e.g., at least about 200, at least about 300, or at least about 400. A person skilled in the art will understand that the mass of the diionic species depends on the sizes of the charged groups as well as the bridging group. One or more of these can be varied to obtain a diionic species of desired mass.

In another embodiment, the method of the invention includes selecting a diionic salt that dissociates with high yield. This can be achieved by selecting a diionic salt containing suitable counter ions. In cases where a diionic salt having desired ionic groups but less desirable counter ions, it can be converted to a diionic salt containing the desired counter ions by anion exchange. In a specific embodiment, a fluoride salt is used, which, if not yet available, can be converted from a dihalide, a bromide or an iodide salt by anion exchange.

In another embodiment, the method further includes a step of performing ion chromatography prior to the addition of the diionic species.

Several dicationic species were used in detecting perchlorate ($ClO_4^-$). In a preferred embodiment, the invention provides a method of detecting a charged molecule of −1 charge other than perchlorate ($ClO_4^-$) by mass spectrometry using a dicationic species of the invention. In another embodiment, the invention provides a method of detecting perchlorate ($ClO_4^-$) by mass spectrometry using a dicationic species of the invention which is not one of the dicationic species I-X. In still another embodiment, the invention provides a method of detecting a charged molecule of −1 charge by mass spectrometry using an "unsymmetric" dicationic species of the invention. In still another embodiment, the invention provides a method of detecting a charged molecule of −1 charge by mass spectrometry using a chiral dicationic species of the invention.

In another preferred embodiment, the invention provides a method of detecting a charged molecule of +1 charge by mass spectrometry using a dianionic species of the invention. Any one of the dianionic species described above can be used.

In still another preferred embodiment, the invention provides a method of detecting a plurality of different charged molecules of +1 or −1 charge by mass spectrometry using a plurality of different diionic species of the invention. Each of the diionic species is selected to specifically bind one of the different charged molecules. Preferably, the different diionic species have different masses such that the complexes formed with their respective charged molecules can be detected separately.

Mass spectrometry can be carried out using standard procedures known in the art.

In another aspect of the present invention, there are provided a mixture comprising both the diionic liquid salts of the invention and traditional stationary phase material such as but not limited to polysiloxanes, PEGs, methylpolysiloxances, phenyl substituted methylpolysiloxance, nitrile substituted methylpolysiloxance, carbowax. Such mixture (mixed stationary phase or "MSP") can be used as stationary phases in chromatography such as gas chromatography, liquid chromatography and high performance liquid chromatography as well as in SPE and SPME. Both dicationic salt and dianionic salt can be used for this purpose. The MSPs can be non-cross-linked (e.g., absorbed or adsorbed on a solid support or column), can be "partially" cross-linked or "more highly" cross-linked (i.e., immobilized on a solid support or column) The diionic liquid salts may also be cross-linked or otherwise reacted with the traditional stationary phase material or merely mixed therewith.

Thus, in one embodiment, the invention provides MSPs comprising at least one of the diionic liquid salts of the invention and at least one traditional stationary phase material at a suitable proportion. Appropriate combinations of the diionic liquid salt(s) and the traditional stationary phase material(s) for producing the MSP is based on the particular application as are the proportions of the diionic liquid salt(s) and the traditional stationary phase material(s) in the MSP. In a preferred embodiment, the ratio of the diionic liquid salt and the traditional stationary phase material in the MSP is from about 1:9 (i.e., about 10% of diionic liquid salt and 90% of traditional stationary phase material) to about 9:1 (i.e., about 90% of diionic liquid salt and 10% of traditional stationary phase material), about 1:3 (i.e., about 25% of diionic liquid salt and 75% of traditional stationary phase material) to about 3:1 (i.e., about 75% of diionic liquid salt and 25% of traditional stationary phase material), about 1:2 (i.e., about 33% of diionic liquid salt and 67% of traditional stationary phase material) to about 2:1 (i.e., about 67% of diionic liquid salt and 33% of traditional stationary phase material), or about 1:1 (i.e., about 50% of diionic liquid salt and 50% of traditional stationary phase material) (w/w). Chromatography employing MSP may perform better, e.g., having higher selectivity, than chromatography employing diionic liquid salts or the traditional stationary phase alone. As an example, an MSP comprising a simple mixture of about 67% (dibutyl imidazolium)$_2$(CH$_2$)$_9$ and 33% of methylpolysiloxane with 5% phenyl substitution was prepared and used to coat a column. This MSP was shown to exhibit better separation of an essential oil. Cross-linked version of the MSP can also be used.

In addition, the invention also provides methods of preparing MSPs, solid supports and/or columns containing same, the MSPs, solid supports, syringes, tubes, pipettes tips, needles, vials, and columns themselves, and the use of columns and solid supports containing such MSPs in chromatography and other analytical or separation techniques such as those described elsewhere herein.

Example A—Example 1

Compound #2

Synthesis of 2 involved adding 15.0 mL (0.148 mol) of 1,3-dibromopropane dropwise to 23.5 mL (0.295 mol) of 1-methylimidazole in a round bottom flask under constant stirring at room temperature. The reaction was complete within 2 hours. The bromide salt was dissolved in 100 mL water and extracted with three 25 mL aliquots of ethyl acetate. Water was removed under vacuum heating and the remaining salt was dried under a P$_2$O$_5$ vacuum. Synthesis of the NTf$_2^-$ salt consisted of dissolving 10 grams (0.03 mol) of the bromide salt in 100-150 mL water. Two molar equivalents (0.06 mol, 3.92 grams) of N-lithiotrifluoromethylsulfonimide were dissolved in 50 mL of water in a separate beaker and added directly to the bromide salt. The solution was allowed to stir for 12 hours. The top water layer was removed to leave the ionic liquid. Three additional 30 mL aliquots of water were added and extracted with the ionic liquid until the ionic liquid passed the silver nitrate test. The ionic liquid was then dried using rotary evaporation and then further dried under a P$_2$O$_5$ vacuum.

Example A—Example 2

Compound #7

Synthesis of 7 involved adding 15.0 mL (0.098 mol) of 1,6-dibromohexane dropwise to 15.6 mL (0.196 mol) of 1-methylimidazole in a round bottom flask under constant stirring at room temperature. The reaction was complete within 2 hours. The bromide salt was dissolved in 100 mL water and extracted with three 25 mL aliquots of ethyl acetate. Water was removed under vacuum heating and the remaining salt was dried under a P$_2$O$_5$ vacuum. Anions were exchanged by dissolving 10 grams (0.024 mol) of the bromide salt in .about.150 mL acetone. Two molar equivalents of sodium tetrafluoroborate (0.049 mol, 5.38 grams) were then directly added to the acetone mixture. After allowing 24 hours for complete mixing, sodium bromide was filtered off to leave the pure ionic liquid. The sample was then subjected to silver nitrate to ensure no silver bromide precipitate was present. Acetone was removed under vacuum and the remaining ionic liquid dried under a P$_2$O$_5$ vacuum.

Example A—Example 3

Compound #17

Synthesis of 17 involved adding 15.0 mL (0.074 mol) of 1,9-dibromononane dropwise to 19.4 mL (0.148 mol) of 1-butylimidazole in a round bottom flask under constant stirring at room temperature. The reaction was complete after 5 hours. The resulting viscous liquid was dissolved in 100 mL water and extracted with three 35 mL aliquots of ethyl acetate. Water was removed under vacuum heating and the remaining salt was dried under a P$_2$O$_5$ vacuum.

Example A—Example 4

Compound #25

Synthesis of 25 involved dissolving 13.1 mL (0.148 mol) of 1,2-dimethylimidazole in 125 mL 2-propanol and adding 15.0 mL (0.074 mol) of 1,9-dibromononane dropwise in a round bottom flask equipped with a condenser and refluxing at 95° C. for 24 hours. After removal of 2-propanol under vacuum, the bromide salt was dissolved in 100 mL water and extracted with three 35 mL aliquots of ethyl acetate. Water was removed under vacuum heating and the remaining salt was dried under a $P_2O_5$ vacuum. Synthesis of the $NTf_2^-$ salt consisted of dissolving 10 grams (0.02 mol) of the bromide salt in 100-150 mL water. Two molar equivalents (0.04 mol, 11.48 grams) of N-lithiotrifluoromethylsulfonimide were dissolved in 50 mL of water in a separate beaker and added directly to the bromide salt. The solution was allowed to stir for 12 hours. The top water layer was removed to leave the ionic liquid. Three additional 30 mL aliquots of water were added and extracted with the ionic liquid until the ionic liquid passed the silver nitrate test. The ionic liquid was then dried using rotary evaporation and then further dried under a $P_2O_5$ vacuum.

Example A—Example 5

Compound #29

Synthesis of 29 involved dissolving 25.0 g (0.158 mol) of 1-benzylimidazole in 100 mL 2-propanol and adding 25.9 grams (0.079 mol) of 1,12-dibromododecane in a round bottom flask equipped with a condenser and refluxing at 95° C. for 24 hours. Due to the hydrophobicity of the salt, it was found to be quite insoluble in water. Therefore, it was washed with ethyl acetate (.about.75 mL) and then dried under $P_2O_5$. Because the bromide salt as not soluble in water, 10.0 grams (0.016 mol) was dissolved in methanol with stirring. To another beaker was added 8.9 grams (0.031 mol) of N-lithiotrifluoromethylsulfonimide with approximately 50 mL of water. The two contents were mixed the mixture allowed to stir for nearly 5 hours. The methanol-water solution was then removed and the liquid washed with water and then further dried under vacuum and under $P_2O_5$.

Example A—Example 6

Compound #31

Synthesis of 31 involved dissolving 13.0 mL (0.128 mol) of 1,3-dibromopropane in 100 mL 2-propanol and adding 26.6 mL (0.256 mol) of 1-methylpyrrolidine in a round bottom flask equipped with a condenser and refluxing at 95° C. for 24 hours. After removal of 2-propanol under vacuum, the bromide salt was dissolved in 100 mL water and extracted with three 35 mL aliquots of ethyl acetate. Water was removed under vacuum heating and the remaining salt was dried under a $P_2O_5$ vacuum.

Example A—Example 7

Compound #35

Synthesis of 35 involved dissolving 12.0 mL (0.059 mol) of 1,9-dibromononane in 100 mL 2-propanol and adding 12.3 mL (0.118 mol) of 1-methylpyrrolidine in a round bottom flask equipped with a condenser and refluxing at 95° C. for 24 hours. After removal of 2-propanol under vacuum, the bromide salt was dissolved in 100 mL water and extracted with three 35 mL aliquots of ethyl acetate. Water was $P_2O_5$ vacuum. Synthesis of the $NTf_2^-$ salt consisted of dissolving 10 grams (0.02 mol) of the bromide salt in 100-150 mL water. Two molar equivalents (0.04 mol, 11.48 grams) of N-lithiotrifluoromethylsulfonimide were dissolved in 50 mL of water in a separate beaker and added directly to the bromide salt. The solution was allowed to stir for 12 hours. The top water layer was removed to leave the ionic liquid. Three additional 30 mL aliquots of water were added and extracted with the ionic liquid until the ionic liquid passed the silver nitrate test. The ionic liquid was then dried using rotary evaporation and then further dried under a $P_2O_5$ vacuum.

Example A—Example 8

Compound #38

Synthesis of 38 involved dissolving 13.0 mL (0.064 mol) of 1,9-dibromononane in 100 mL 2-propanol and adding 20.0 mL (0.128 mol) of 1-butylpyrrolidine in a round bottom flask equipped with a condenser and refluxing at 95° C. for 24 hours. After removal of 2-propanol under vacuum, the bromide salt was dissolved in 100 mL water and extracted with three 35 mL aliquots of ethyl acetate. Water was removed under vacuum heating and the remaining salt was dried under a $P_2O_5.5$ vacuum. Synthesis of the $NTf_2^-$ salt consisted of dissolving 10 grams (0.019 mol) of the bromide salt in 100-150 mL water. Two molar equivalents (0.037 mol, 10.62 grams) of N-lithiotrifluoromethylsulfonimide were dissolved in 50 mL of water in a separate beaker and added directly to the bromide salt. The solution was allowed to stir for 12 hours. The top water layer was removed to leave the ionic liquid. Three additional 30 mL aliquots of water were added and extracted with the ionic liquid until the ionic liquid passed the silver nitrate test. The ionic liquid was then dried using rotary evaporation and then further dried under a $P_2O_5$ vacuum.

Example A—Example 9

Procedure for the Synthesis of Di-Cationic Phosphonium ILs
1,10-decane-tripropyl phosphonium bromide

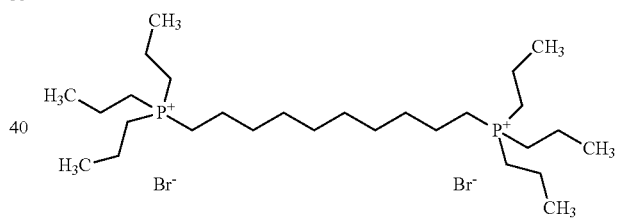

was synthesized according to the following procedure. The preceding ionic liquid was synthesized according to the following procedure: In a round bottom flask (100 mL), 1,10-dibromodecane (3.7 g) was dissolved in isopropyl alcohol (50-75 mL). At room temperature, tripropylphosphine (6.5 mL) was added to the solution. The resulting solution was stirred and heated under reflux for 48 hrs. After this time, the solution was cooled to room temperature. Rotoevaporation of the solvent followed by drying in vacuum over phosphorous pentoxide, yielded a white crystalline product with a melting point of approximately 50° C.

Example A—Example 10

Synthesis of "Unsymmetric" Diionic Salts
The following compounds are used for the synthesis: the alkyl linkage compounds:

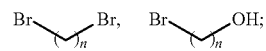

the aryl linkage compounds:

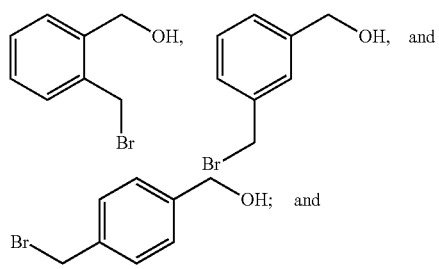

the PEG linkage compounds:

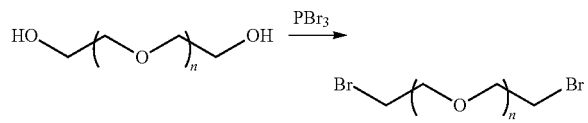

The "unsymmetric" dicationic ILs are synthesized from dibromo-linkers according to the following steps:

First, the monocation intermediate is synthesized by reacting with the linkage compound that is in excess during the reaction to decrease the symmetric dicationic byproduct. For an example, the synthesis of ammonium-based monocation is shown in Scheme 1.

Scheme 1

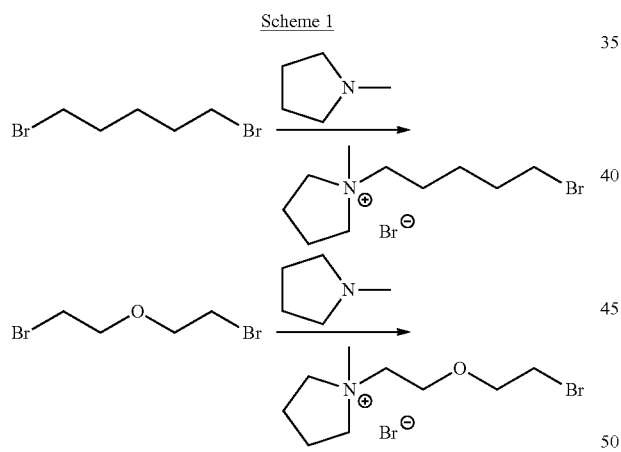

Then, the unsymmetrical diicationic ionic compound with the desired anion is synthesized by the metathesis reaction from the dibromide compound that is obtained as an example of ammonium-imidazonium based IL in Scheme 2.

Scheme 2

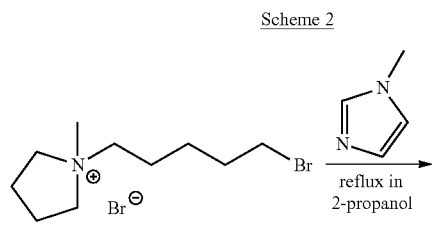

-continued
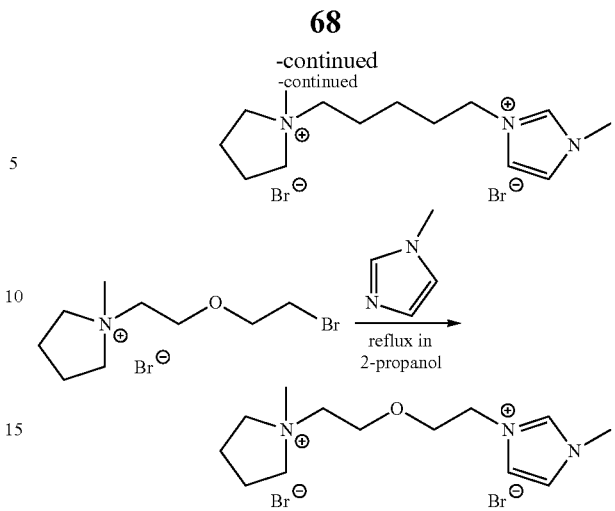

Next, the unsymmetrical diicationic ILs are synthesized from the linkage compound having both bromo- and hydroxyl-groups, shown as an example of ammonium-imidazonium based IL in Scheme 3.

Scheme 3

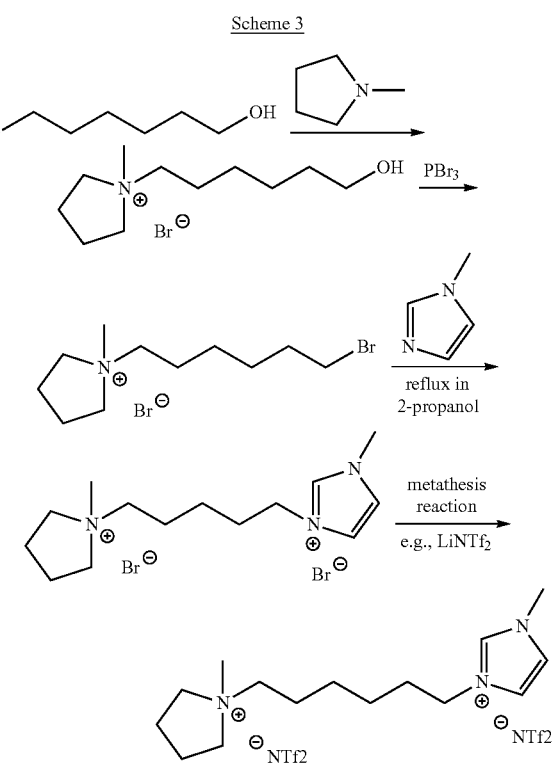

Example B—Polymeric Ionic Liquids

Example B—Example 1

A series of three homologous PILs are used to extract esters and fatty acid methyl esters (FAMEs) from aqueous solution. To examine the effect of the matrix on the coatings, extractions were carried out in a synthetic wine solution followed by recovery experiments in two real wine samples. The extraction performance of the PIL-based coatings is compared to that of the commercial polydimethylsiloxane (PDMS) and polyacrylate (PA) coatings.

Materials.

The following analytes were purchased from Sigma Aldrich (Milwaukee, Wis., USA): hexyl tiglate, isopropyl butyrate, furfuryl octanoate, ethyl valerate, hexyl butyrate, benzyl butyrate, methyl caproate, methyl enanthate, methyl caprylate, methyl octanoate, methyl decanoate, methyl undecanoate, and methyl laurate.

Methanol, ethanol, hexane, dichloromethane, acetone, acetonitrile, and sodium hydroxide were obtained from Fisher Scientific (Fair Lawn, N.J., USA).

The synthesis of all ionic liquid monomers and polymers involved the use of the following reagents, which were all obtained from Sigma-Aldrich (Milwaukee, Wis., USA): vinyl imidazole, 2,2'-azo-bis(isobutyronitrile), hexyl chloride, dodecyl bromide, and hexadecyl bromide. Lithium bis(trifluoromethanesulfonyl)imide was obtained from SynQuest Labs (Alachua, Fla., USA).

Synthetic wine samples were prepared using (+)-tartaric acid purchased from Sigma-Aldrich (Milwaukee, Wis., USA). Deuterated chloroform and dimethylsulfoxide were obtained from Cambridge Isotope Laboratories (Andover, Mass., USA). Deionized water (18.2 Megaohms/cm) was obtained from a Milli-Q water purification system (Millipore, Bedford, Mass., USA) and was used in the preparation of all aqueous solutions. Propane and microflame brazing torches were purchased from Sigma-Aldrich (Milwaukee, Wis., USA).

Figure 16:
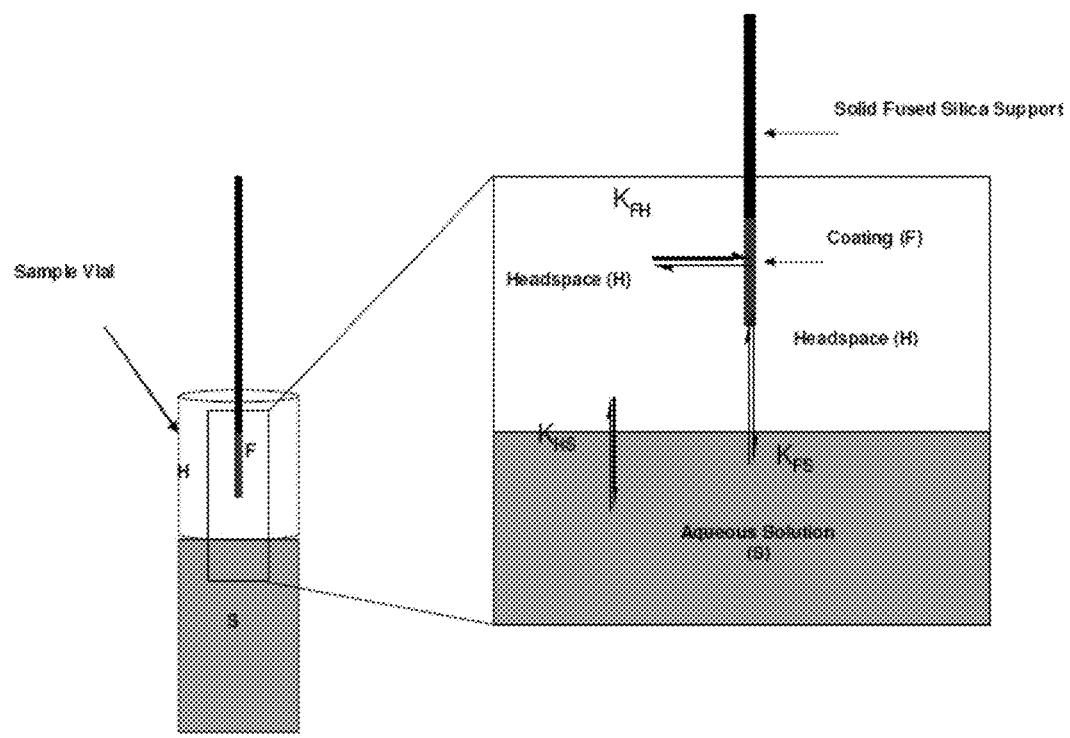
FIG. 16: A schematic illustration showing a system for headspace extraction.

The solid phase microextraction (SPME) devices were constructed using a 5 µL syringe purchased from Hamilton (Reno, Nev., USA) and 0.10 mm I.D. fused silica capillary obtained from Supelco (Bellefonte, Pa., USA). Commercial SPME fibers of polydimethylsiloxane (PDMS, film thicknesses of 7 µm and 100 µm) and polyacrylate (PA, film thickness of 75 µm) were obtained from Supelco (Bellefonte, Pa., USA). A fiber holder purchased from the same manufacturer was used for manual injection of the commercial fibers. Amber glass vials (20 mL) with PTFE/Butyl septa screw caps supplied by Supelco (Bellefonte, Pa., USA) were used in the study. PTFE stir bars were obtained from Fisher Scientific (Fair Lawn, N.J., USA) and were used to perform all extractions at a constant stirring rate of 900 rpm on a coming stir plate (Nagog Park Acton, Mass., USA). FIG. 16 is a non-limiting example of a system for headspace extraction.

Methods

An eight minute desorption time was used for all fibers. Analyte carryover (<1%) was periodically checked by reinserting the fiber into the injector for an additional 5 minutes following the previous desorption step. In all extractions, the volume of the aqueous solution was 15 mL. All analyses were carried out using an Agilent 6850N gas chromatograph (Agilent Technologies, Palo Alto, Calif., USA) equipped with a flame ionization detector (FID). All separations were performed using a DB-1 polydimethylsiloxane capillary column (30 m×0.32 mm I.D., 0.25 µm film thickness) purchased from Alltech (Deerfield, Ill., USA).

The following temperature program was used for the separation of the ester mixture: initial temperature of 60° C. held for 3 min and then increased to 165° C. employing a ramp of 5° C./min. The carrier gas was helium with a flow rate of 1 mL/min Both GC injector and detector temperatures were maintained at 250° C. using splitless injection, the detector make-up flow of helium at 45 mL/min, the hydrogen flow at 40 mL/min, and the air flow at 450 mL/min Agilent Chemstation software was used for data acquisition.

Synthesis of Ionic Liquid Monomers and Polymers

Figure 10:
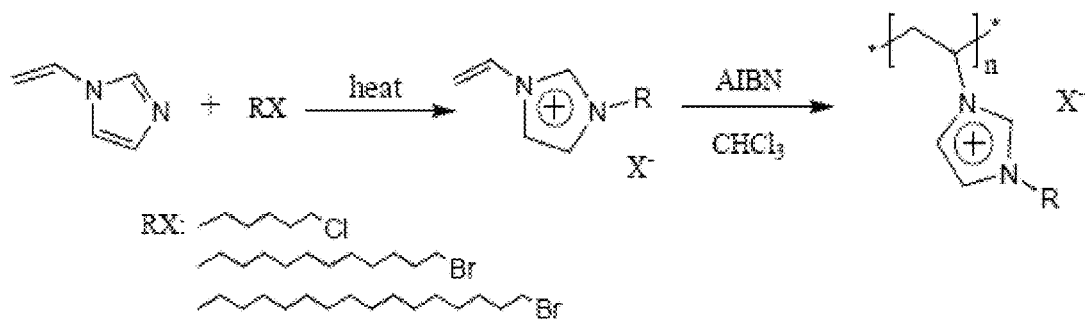
FIG. 10 and FIG. 11 Schemes demonstrating the synthesis of the polymeric ionic liquids evaluated.
Figure 11:
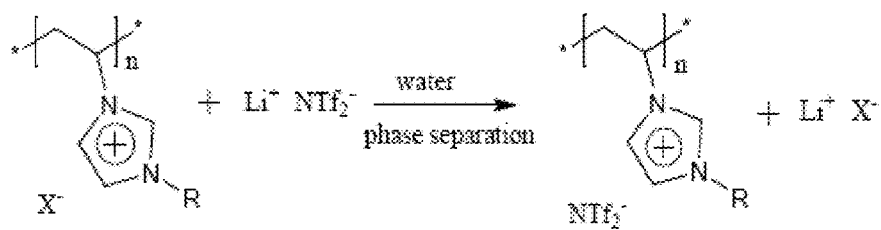

Ionic liquid (IL) monomers and polymers (PIL) were synthesized using the reaction scheme shown in FIG. 10 and FIG. 11.

The three IL monomers (1-vinyl-3-hexylimidazolium chloride, 1-vinyl-3-dodecylimidazolium bromide, and 1-vinyl-3-hexadecylimidazolium bromide) were produced by mixing 0.06 moles of 1-vinylimidazole with 0.06 moles of the corresponding alkyl halide in ~20 mL of 2-propanol.

The mixture was then allowed to react at 60° C. for 16 hours with constant and vigorous stirring. After cooling to room temperature, 2-propanol was evaporated under vacuum. The IL product was then dissolved in 20 mL of water and extracted five times with 10 mL portions of ethyl acetate. Ethyl acetate was then removed under vacuum at 80° C. and the product was dried in a vacuum oven at 70° C. for two days. The purity was confirmed by 1H-NMR before subjecting the monomer to polymerization.

Polymerization of the IL monomers (see FIG. 11) was carried out by free radical polymerization. Briefly, 3.0 grams of the purified IL monomer was dissolved completely in 30 mL of chloroform. To this mixture, 0.06 grams (~2%) of the free radical initiator AIBN (2,2'-azo-bis(isobutyronitrile)) was added and refluxed for 3 hours at 70° C. under an inert $N_2$ atmosphere. Chloroform was subsequently removed and the product dried under vacuum at 80° C. When needed, the polymerization step was repeated until the peaks represented by the vinyl group in the 1H-NMR disappeared.

Figure 12:
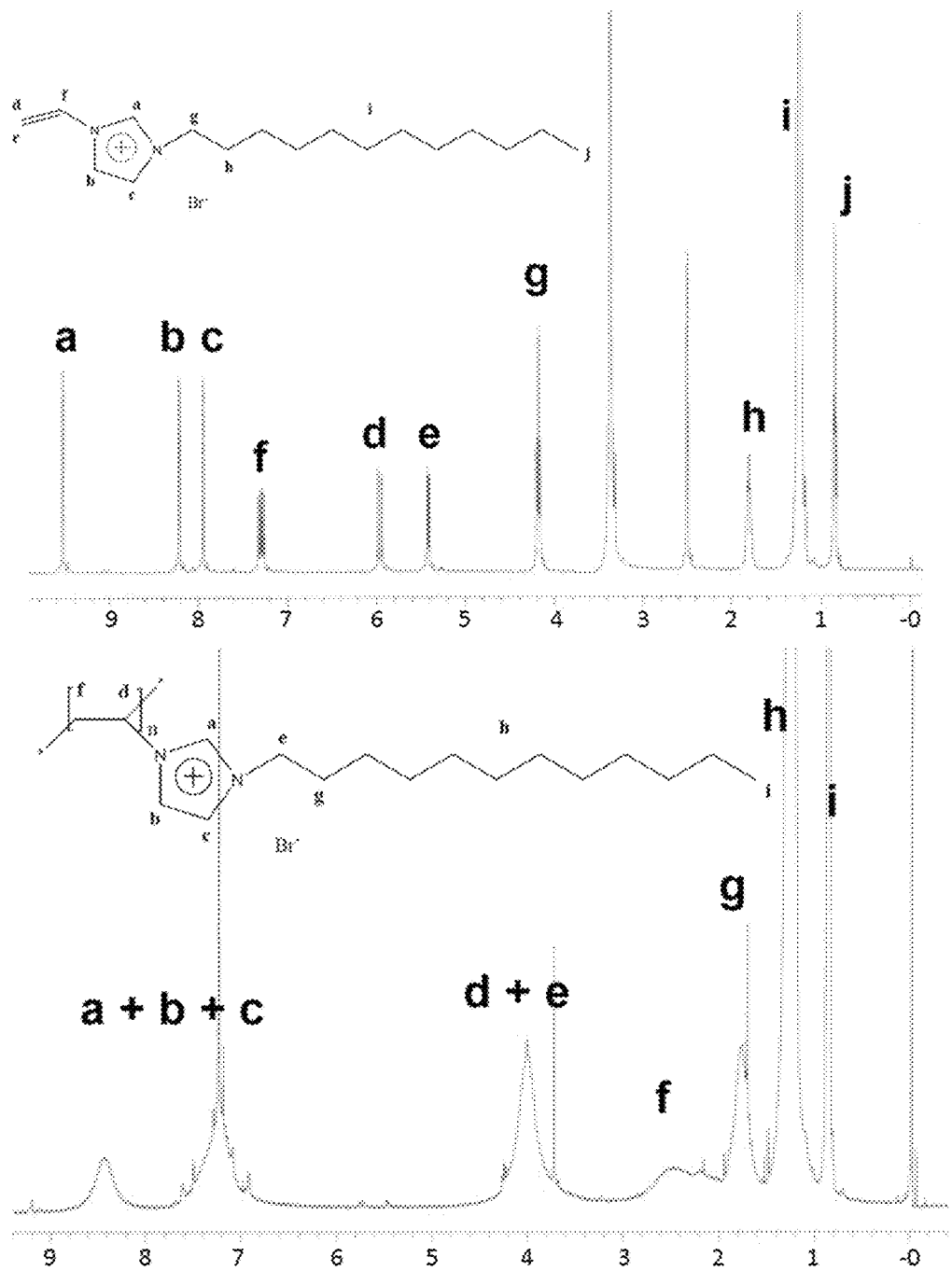
FIG. 12: 1H-NMR spectra of the 1-dodecyl-3-vinylimidazolium bromide IL monomer (top) and the corresponding polymeric ionic liquid following free radical polymerization (bottom).

FIG. 12 shows 1H-NMR spectra of the 1-dodecyl-3-vinylimidazolium bromide monomer and the corresponding poly(1-dodecyl-3vinylimidazolium) bromide polymer. A comparison of the 1H-NMR spectra of the PIL to that of the IL monomer shows the disappearance of the double bond originating from the vinyl-substituted monomer ($\delta$=5.4 ppm, 5.9 ppm, and 7.3 ppm) and the broadening of the signals due to hindered molecular tumbling. The halide anion was exchanged with the bis[(trifluoromethyl)sulfonyl]imide (NTf2) anion by metathesis anion exchange. Briefly, 0.10 moles of an aqueous solution of lithium bis[(trifluoromethyl)sulfonyl]imide was mixed with 0.10 moles of an aqueous solution of the polymerized IL and stirred overnight. The resulting product was filtered and extracted with three 15 mL portions of water. The resulting IL polymer was dried under vacuum for two days at 70° C.

All IL monomers and polymers were characterized using 1H-NMR and are available as supporting information. 1H-NMR [$\delta$/ppm relative to TMS]:

1-vinyl-3-hexylimidazolium chloride (400 MHz, d6-DMSO): 9.571 (s, 1H), 8.219 1H), 7.947 (s, 1H), 7.298 (m, 1H), 5.950 (dd, 1H), 5.415 (dd, 1H), 4.188 (t, 2H), 1.810 2H), 1.274 (m, 6H), 0.861 (m, 3H).

1-vinyl-3-dodecylimidazolium bromide (400 MHz, d6-DMSO): 9.532 (s, 1H), 8.217 (s, 1H), 7.946 (s, 1H), 7.285 (m, 1H), 5.941 (dd, 1H), 5.427 (dd, 1H), 4.184 (t, 2H), 1.807 (d, 2H), 1.181 (m, 20H), 0.846 (t, 3H).

1-vinyl-3-hexadecylimidazolium bromide (400 MHz, CDCl3): 10.961 (s, 1H), 7.768 (s, 1H), 7.452 (m, 1H), 5.932 (dd, 2H), 5.378 (dd, 2H), 4.369 (t, 2H), 1.915 (m, 4H), 1.258 (m, 32H), 0.855 (t, 3H).

Preparation of Ionic Liquid-Polymer Coated Fibers.

The SPME devices were constructed using a novel modification of the procedure first described by Pawliszyn. The polyimide polymer was subsequently removed from the last 1.0 cm segment of the fiber using a high temperature flame followed by sealing of the end of the capillary using a microflame torch. The fiber was then washed with methanol, hexane, acetone and dichloromethane followed by a 10 minute conditioning step in the GC injection port at 250° C.

To make the PIL amendable to coating as a thin film on the fused silica fiber support, a solution was prepared by mixing the PIL in acetone at a ratio of 9:1 (v/v). The conditioned bare fused silica fiber was dipped into the PIL solution, held for 20 seconds, and removed from the coating solution and allowed to dry in the air for 10 minutes. Prior to performing extractions, the coated fibers were conditioned at 250° C. in the GC injection port for 10 minutes to eliminate residual solvents from the fiber support.

Headspace Extraction of Esters

Individual stock standard solutions of esters were prepared in HPLC-grade acetonitrile at a concentration of 1000 mg $L^{-1}$. These standard solutions were stored at 4° C. and were used to prepare daily aqueous working solutions containing a total acetonitrile content lower than 3% (v/v). All headspace extractions were carried out using 20 mL extraction vials containing 15.0 mL of the aqueous working solution. The sorption-time profiles were obtained by extracting the studied analytes at a concentration of 200 μg $L^{-1}$ at varying extraction time intervals using a constant stir rate of 900 rpm at 23° C. The calibration curves were obtained in Milli-Q water at an optimized extraction time of 50 minutes with a total of at least 10 calibration concentrations.

To determine the effect of the matrix on the extraction of esters and FAMEs, extractions were performed in a synthetic wine sample as well as a red wine and white wine sample (Cranelake, Calif., USA). The synthetic wine solution was prepared according to a previously reported formulation [25] by dissolving 3.5 g $L^{-1}$ of (+)-tartaric acid in a hydroalcoholic solution (12% v/v ethanol) and using sodium hydroxide to adjust the pH to 3.5. The calibration curves of all synthetic wine samples were constructed using a 50 minute extraction time with a total of 10 calibration levels. Analyte recovery experiments in the real wine samples were performed at two concentration levels, namely 100 μg $L^{-1}$ and 400 μg $L^{-1}$.

Example B—Example 2

Development of Polymeric Ionic Liquid Coated Supports

Three PIL-based stationary phase coatings were evaluated. These PILs include: poly(ViHIm$^+$ NTf$_2^-$), poly(ViD-DIm$^+$ NTf$_2^-$), and poly(ViHDIm$^+$ NTf$_2^-$) and were synthesized by the free radical polymerization of 1-vinyl-3-hexylimidazolium chloride, 1-vinyl-3-dodecylimidazolium bromide, and 1-vinyl-3-hexadecylimidazolium bromide, respectively (see FIG. 10-11).

The halogen anions were subsequently exchanged with the bis[(trifluoromethyl)sulfonyl]imide anion (NTf$_2$) in an effort to increase the thermal stability of the PIL while also imparting more hydrophobic character to the stationary phase coating. The PILs were then coated onto fused silica supports by dipping the fiber support into a dilute solution of the PIL in acetone.

FIGS. 13A-13D show SEM photos of the bare fused silica fiber (FIG. 13A) and various angles of the fused silica fiber after coated with the poly(ViHDIm$^+$ NTf$_2^-$) PIL (see FIGS. 13B-13D).

Using the PM-based coatings, the inventors herein obtained a smooth, homogeneous coating on the fiber (as opposed to neat ILs, which have a tendency to form droplets on the surface of the fused silica support). Based on the SEM photos, the approximate film thickness of the PM coating on the fiber is estimated to be approximately 12-18 μm.

To demonstrate that the PIL stationary phase is responsible for the extraction of the analytes examined, blank extractions using a 1.0 cm fused silica fiber containing no stationary phase were carried out on an aqueous solution of esters at a concentration of 500 μg $L^{-1}$. This data, not shown, revealed no appreciable extraction of analytes by the bare fused silica support.

Extraction of Esters and Fatty Acid Methyl Esters (FAMEs) in Water.

Generation of Sorption-Time Profiles.

After initial conditioning of the PIL fibers, sorption-time profiles were obtained in an aqueous solution using headspace extraction. Throughout the construction of the sorption profile, the reproducibility of the fiber was examined by performing triplicate extractions at various time intervals which yielded RSD values lower than 15%. The sorption-time profile for the poly(ViHIm$^+$ NTf$_2^-$) coated fiber, shown in FIG. 14, were obtained by monitoring the area counts of each of the eleven analytes versus the fiber exposure time.

Equilibration was quickly reached in approximately 20 to 30 minutes for most analytes, except for a few longer chained FAMEs (e.g., methyl undecanoate and methyl laurate), which attained equilibrium at longer times Similar sorption-time profiles were obtained for the other PIL-based coatings. Fifty minutes was selected as the optimized extraction time of these analytes using all fibers for the entire calibration study.

Analytical Performance.

Calibration curves were obtained for all three PIL-based coatings as well as the PA and PDMS coatings in Milli-Q water.

The figures of merit including the sensitivity, detection limits, and correlation coefficients are shown in FIG. 21—EXAMPLE B Table 1 and FIG. 22—EXAMPLE B—Example 1 Table 2, respectively.

The correlation coefficients varied between 0.986 and 0.999. It can be observed from Table 1 (FIG. 21) that the sensitivity for a given individual analyte is nearly the same among the three PIL-based coated fibers. The detection limits for most analytes using the PIL-based fibers ranged between 2.5-50 4 g $L^{-1}$ where lower detection limits were obtained for the larger FAMEs. Large increases in sensitivity were observed with increasing hydrophobicity of the analyte, particularly for the homologous series of FAMEs.

For comparison purposes, Table 2 (FIG. 22) lists the calibration data for three commercial SPME fibers. The two PDMS fibers contain film thicknesses of 7 μm and 100 μm whereas the PA fiber contains of a 75 μm film thickness. Superior sensitivities and detection limits are observed with the PDMS and PA fibers employing thicker absorbent coatings. The sensitivities for most analytes are higher using the PIL-based stationary phases (approximate film thickness of 12-18 μm) compared to the PDMS coating employing a 7 μm film thickness, allowing for lower detection limits Despite the fact that the 75 μm PA fiber has a much thicker film compared to the PIL fibers, similar sensitivities were obtained for several analytes, particularly methyl undecanoate, methyl laurate, furfural octanoate, and hexyl tiglate.

A comparison of the sensitivity increase between methyl nonanoate and methyl decanoate on the poly(ViHDIm$^+$ NTf$_2^-$) coated fiber revealed a 325% increase in sensitivity compared to a 185% increase on the 100 μm PDMS fiber, 175% increase on the 7 μm PDMS fiber, and a 240% increase on the 75 μm PA fiber.

These examples show that the hydrophobic nature of the PIL imparted by the alkyl substituents on the imidazolium cation, along with the bis[(trifluoromethyl)sulfonyl]imide anion, provide solvation characteristics more similar to the PDMS coating rather than the PA coating while often producing higher sensitivity and selectivity than both.

Evaluation of Matrix Effect.

The analyte distribution coefficient between the solution and fiber coating are dependent on the nature of the matrix [26]. To evaluate the effect of matrix interference on the accuracy of the polymeric ionic liquid-based absorbent coatings, a calibration study of the esters and FAMEs was first carried out in synthetic wine. The primary advantage of employing a synthetic wine matrix is that the effect of ethanol content on the observed extraction efficiency, selectivity, and sensitivity can all be studied independent of other volatile compounds that are widely present in all wines.

As shown in FIG. 23—EXAMPLE B—Table 3 and FIG. 24—EXAMPLE B—Table 4, respectively, the sensitivity decreased for all fibers when the extractions were carried out in a synthetic wine solution consisting of approximately 12% (v/v) of ethanol compared to when they were performed in Milli-Q water.

For the PIL-based coatings, the largest drop in sensitivity between the two matrices was observed for the smaller esters including isopropyl butyrate, ethyl valerate, and methyl caproate. Conversely, the 7 µm PDMS fiber exhibited the smallest sensitivity drop for these analytes. All PIL-based fibers exhibited greater sensitivity with in the increase in the alkyl chain of the FAME whereas, in general, a smaller enhancement in sensitivity was observed for the 7 micron PDMS fiber. Despite the matrix interference caused by ethanol, the detection limits of all PIL-based fibers were better than that of the 7 µm PDMS fiber.

To examine the effect of a real matrix, recovery studies were performed in both red and white wine samples. An extraction of both neat wine samples using two PDMS fibers (7 µm and 100 µm) and the three PIL fibers revealed the concentration of all esters and FAMEs examined in this study to be below the detection limit or absent from the sample. Using the calibration curves generated in the synthetic wine, recoveries were determined in triplicate at two spiking calibration levels, namely 100 µg $L^{-1}$ and 400 $L^{-1}$.

As shown in FIG. 25—EXAMPLE B—Table 5, the precision of the red wine sample using the PIL-based fibers was best at the higher spiking level yielding RSD values below 12%. Due to the fact that the detection limits for most analytes in the synthetic wine samples ranged from 2.5-50 µg $L^{-1}$, it is understandable that the more complicated wine matrix would exhibit poorer repeatability.

Recoveries for the PIL-based fibers at the higher spiking level ranged from 70.2% for methyl laurate to 115.1% for ethyl valerate. Using the 7 µm PDMS fiber, recoveries ranged from 61.9% for methyl laurate to 102.9% for isopropyl butyrate. The thicker PDMS coating (100 µm) yielded recoveries ranging from 74.4% for methyl laurate to 96.9% for methyl enanthate.

Figure 14A:
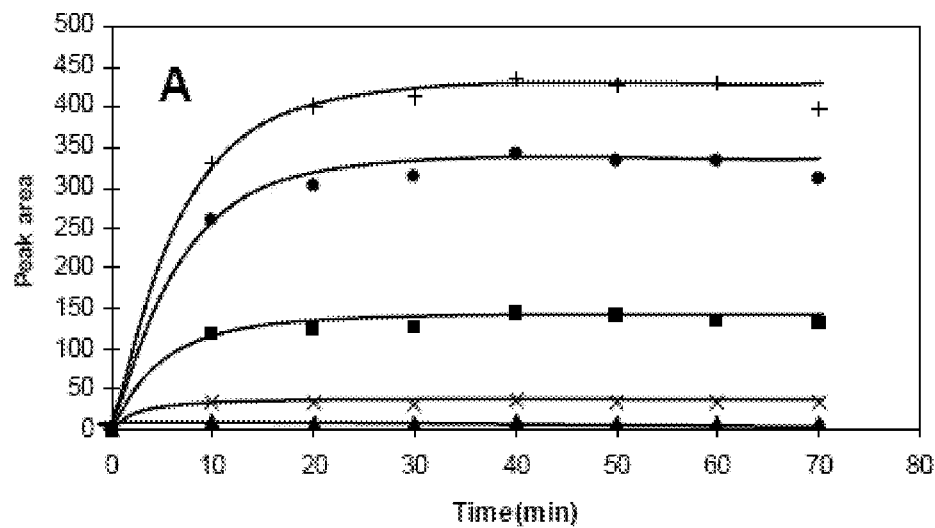
FIGS. 14A-14B: Sorption time profiles obtained for the poly(ViHIm$^+$ NTf$^-$) PIL fiber by extracting the studied analytes at a concentration of 200 L$^{-1}$ at varying extraction time intervals using a constant stir rate of 900 rpm at 23° C.
Figure 14B:
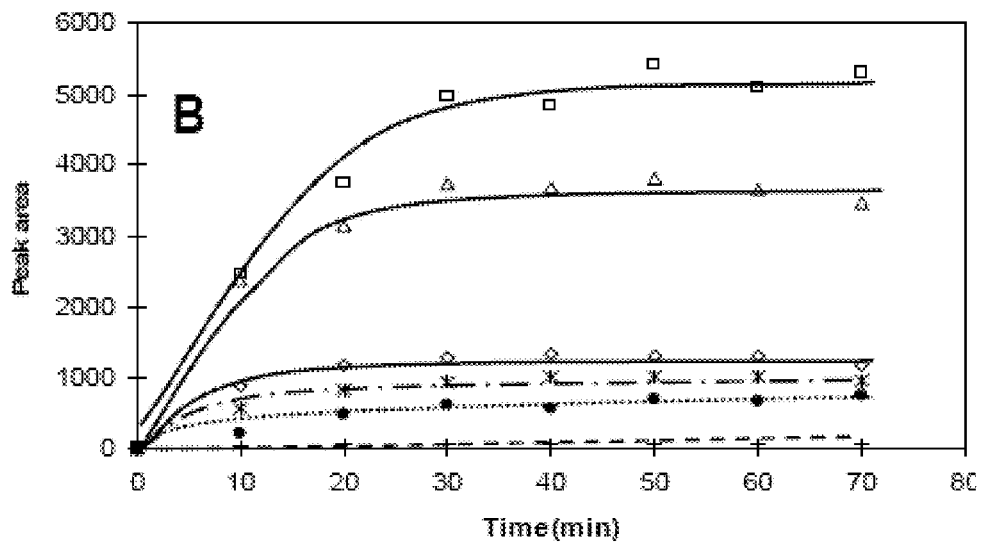
Figure 15:
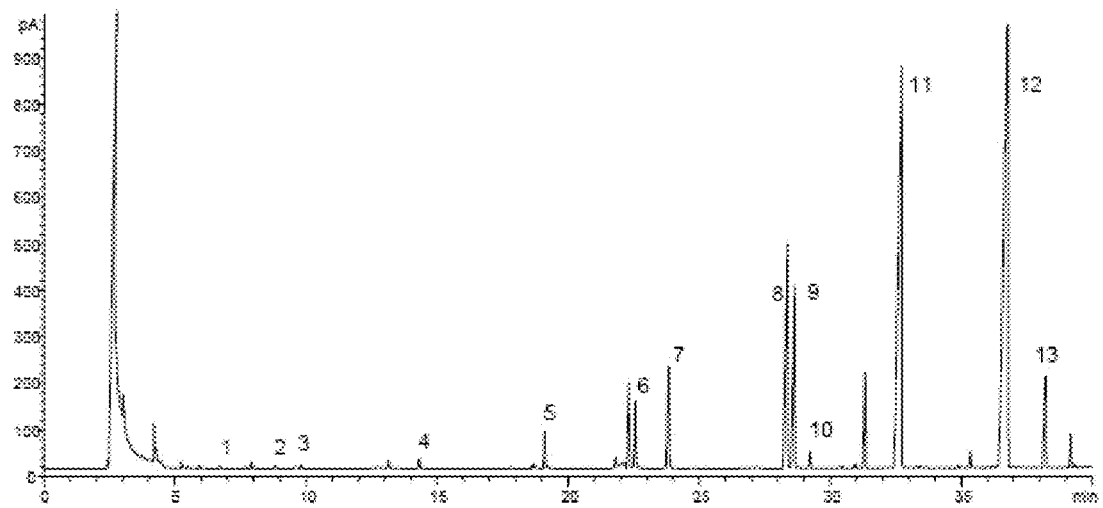
FIG. 15: Gas chromatogram obtained following the headspace extraction of a red wine sample spiked with 400 L$^{-1}$ of esters using a poly(ViDDIm$^+$ NTf2$^-$) PIL fiber under optimal extraction conditions. 1. isopropyl butyrate, 2. ethyl valerate, 3. methyl caproate, 4. methyl enanthate, 5. methyl caprylate, 6. hexyl butyrate, 7. methyl nonanoate, 8. methyl decanoate, 9. hexyl tiglate, 10. benzyl butyrate, 11. methyl undecanoate, 12. methyl laurate, 13. furfuryl octanoate.

FIG. 14 shows the chromatogram of the thirteen analytes obtained after extracting a red wine sample spiked at 400 µg L-I using the poly(ViDDIm$^+$ NTf$_2^-$) coated fiber.

Figure 26:
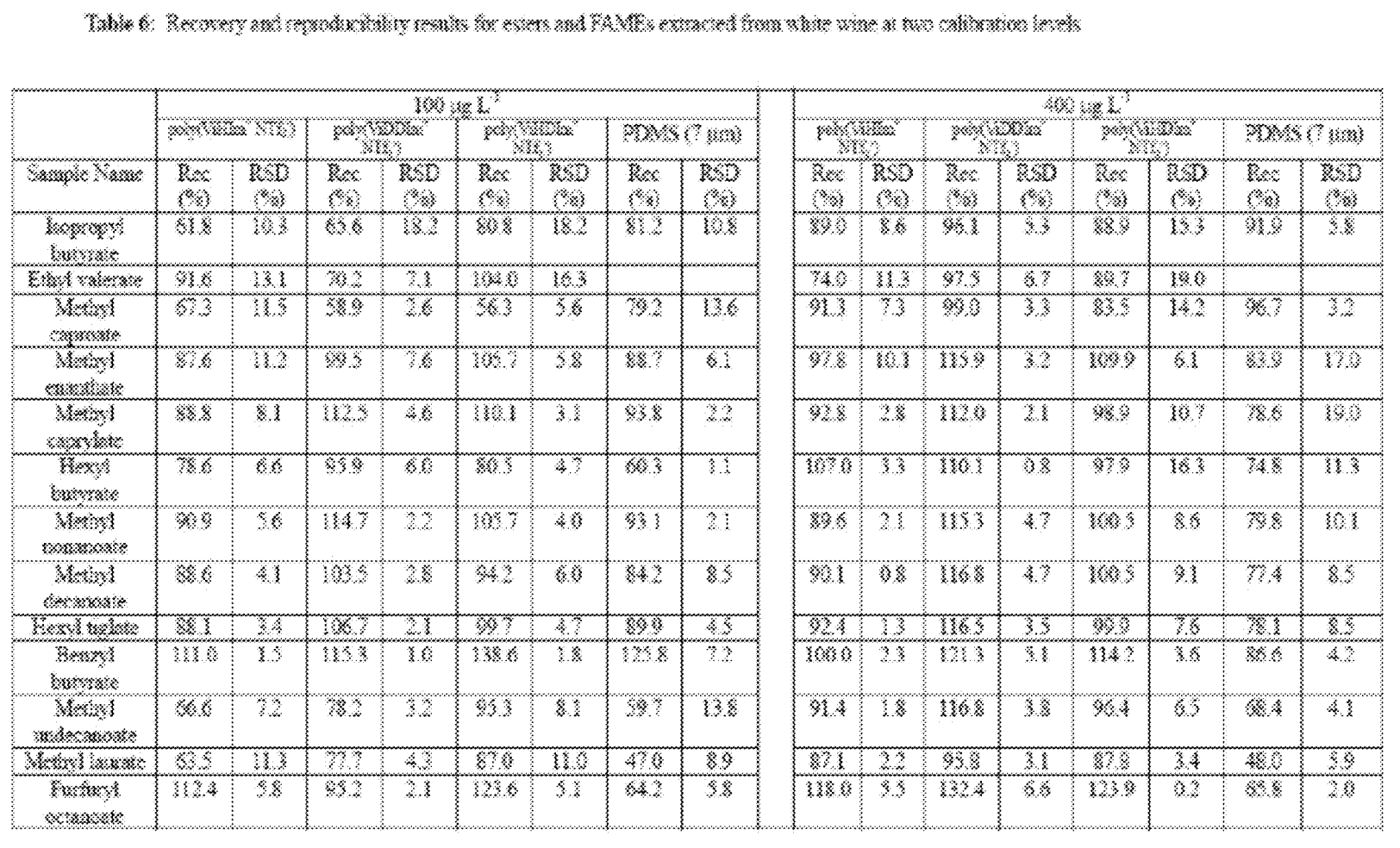

Recovery and precision data for the white wine sample is shown in FIG. 26—EXAMPLE B—Table 6. Recoveries for the PIL-based fibers at the higher spiking level ranged from 74.0% for ethyl valerate to 132.4% for furfuryl octanoate with RSD values lower than 19.0%. For the 7 PDMS fiber, recoveries ranged from 48% for methyl laurate to 96.7% for methyl caproate with RSD values lower than 19.0%. The results clearly indicate that the performance of the PIL-based fibers in terms of recovery and repeatability is often superior to that of the PDMS fiber of similar film thickness.

Figure 17A:
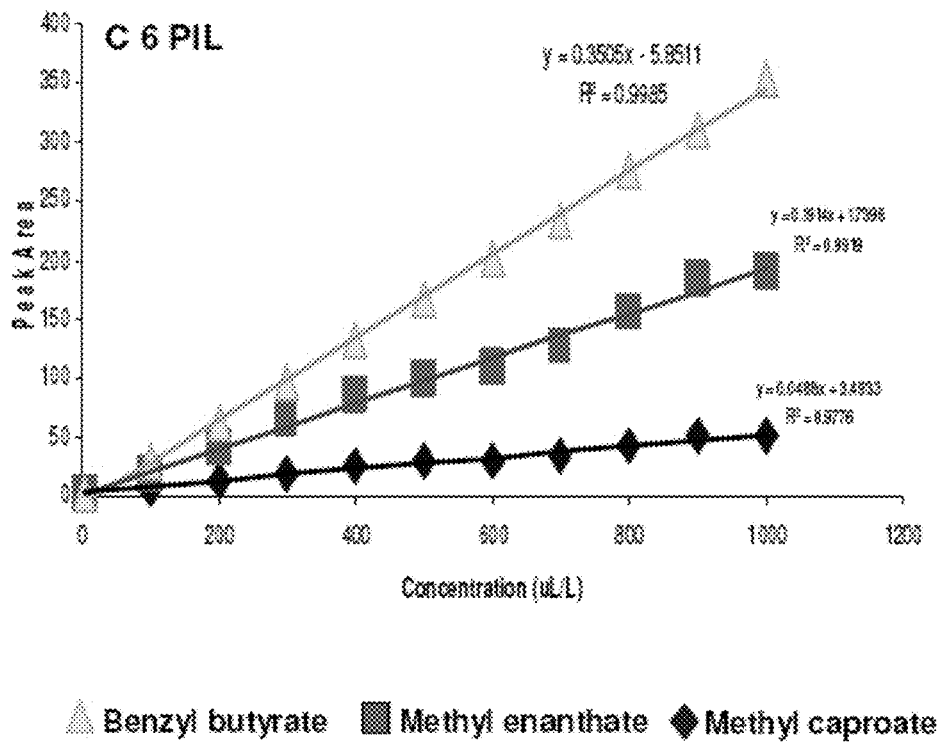
FIGS. 17A-17D: Graphs showing the quantitative analysis of esters and fatty acid methyl esters in red and white wines.
Figure 17B:
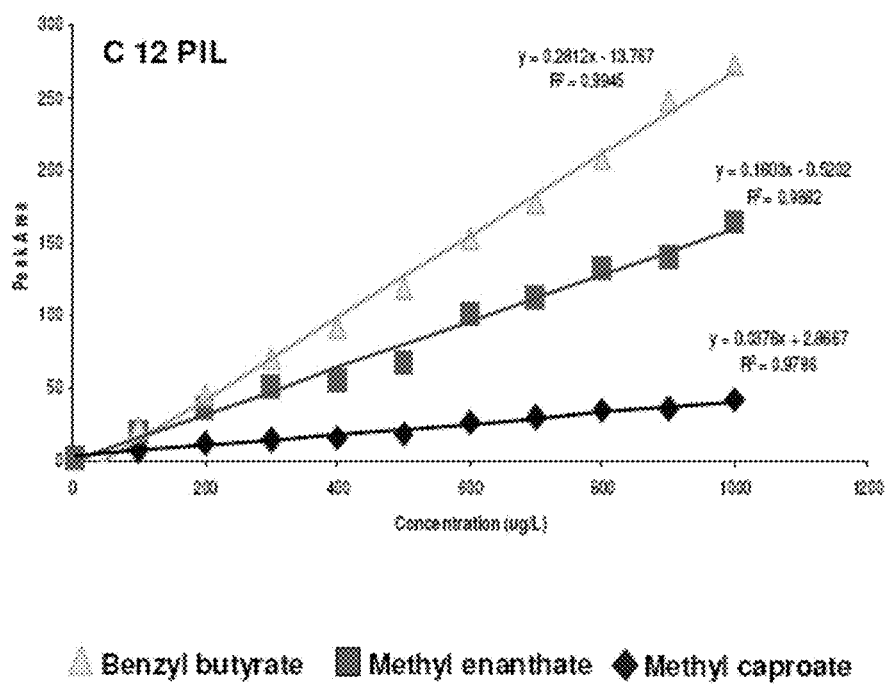
Figure 17C:
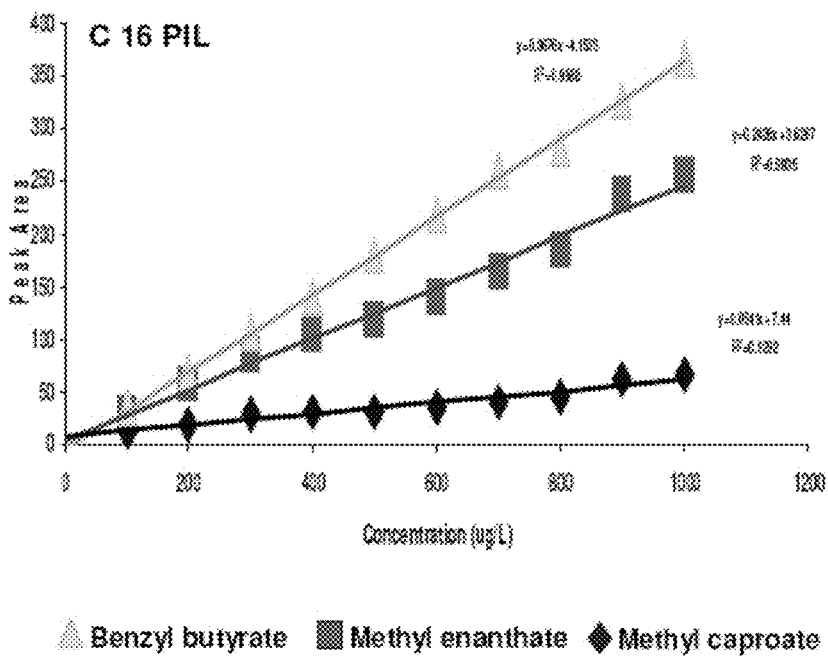
Figure 17D:
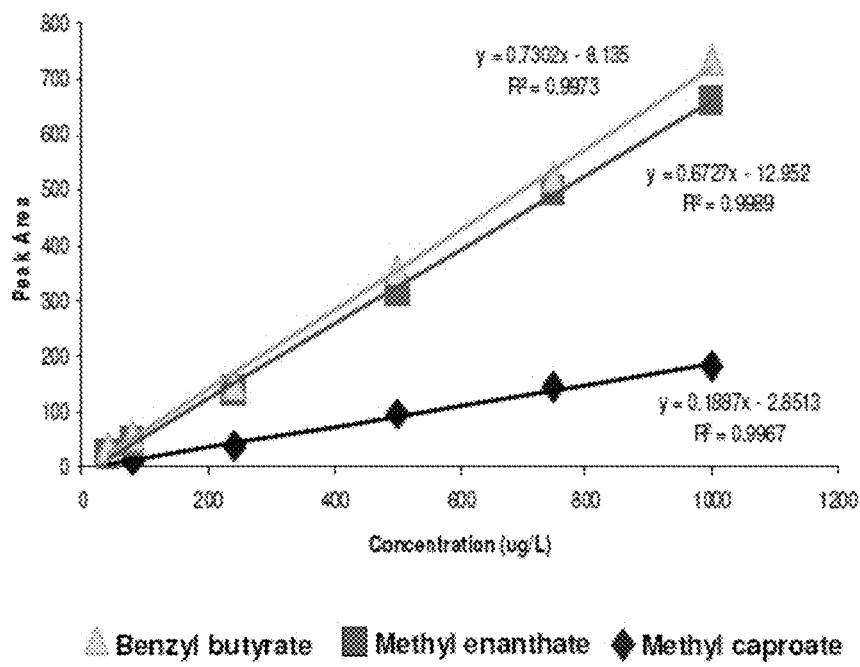

FIGS. 17A-17D are graphs showing the quantitative analysis of esters and fatty acid methyl esters in red and white wines. FIGS. 17A-17C show the calibration curves of 100 µm I.D. SPME fibers. FIG. 17D shows the calibration curve of 50 µm I.D. SPME fiber.

FIG. 18 is a chart showing figures of merit for PIL-based extractions in wine.

Fiber Lifetime

The inventors also made polymeric ionic liquids that form stable, even fibers while exhibiting superior thermal stability. Two of the PIL-coated fibers [poly(ViHIm$^+$ NTf$_2^-$) and poly(ViDDIm$^+$ NTf$_2^-$)] were utilized in approximately 150 extractions while retaining RSD values lower than 14-18%.

To attain high fiber lifetimes, care was taken during the fabrication of the fiber assembly, coating of the fiber, and the subsequent extraction/desorption steps, which make the fragile fused silica susceptible to breakage. In certain embodiments, the structural design of the employed PIL may be important in achieving high thermal stability. Thus, in one particular embodiment, the bis[(trifluoromethyl)sulfonyl]imide salts paired with large, bulky cations can be used to produce IL monomers with exceptional thermal stability.

Further, in certain embodiments, it may be advantageous that the PIL be free of residual halides following anion metathesis as halides are known to significantly lower the thermal stability of the product [13, 27]. In addition, in certain embodiments, it may be advantageous that the desorption temperature and desorption time be optimized to prolong the lifetime of the coating material.

Example B—Example 3

Extraction of PTEXs

By polymerizing IL monomers to form polymeric ionic liquids (PILs), stable absorbent coatings were developed for the extraction of benzene, toluene, ethyl benzene, and xylenes in gasoline. The reproducibility and loading of the extraction phase has been improved by modifications to the design of the SPME assembly.

Figure 19A:
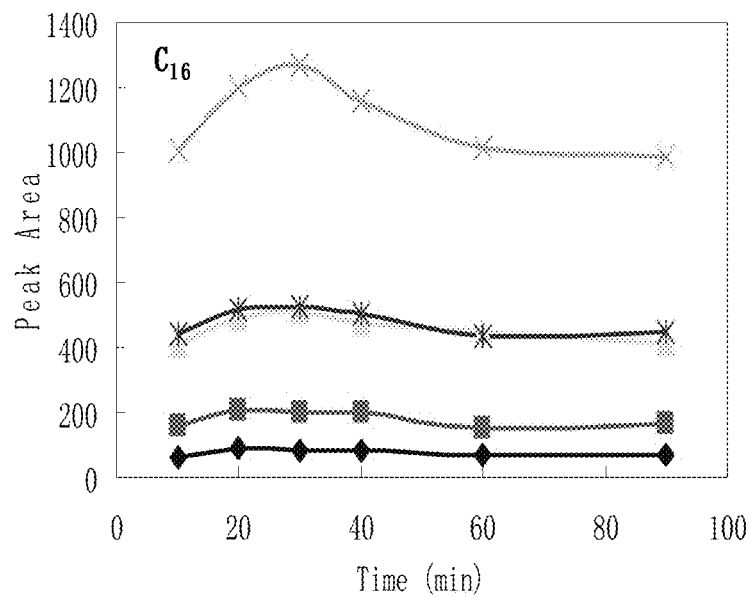
FIGS. 19A-19C: Graphs showing the quantitative analysis of BTEX compounds in gasoline.
Figure 19B:
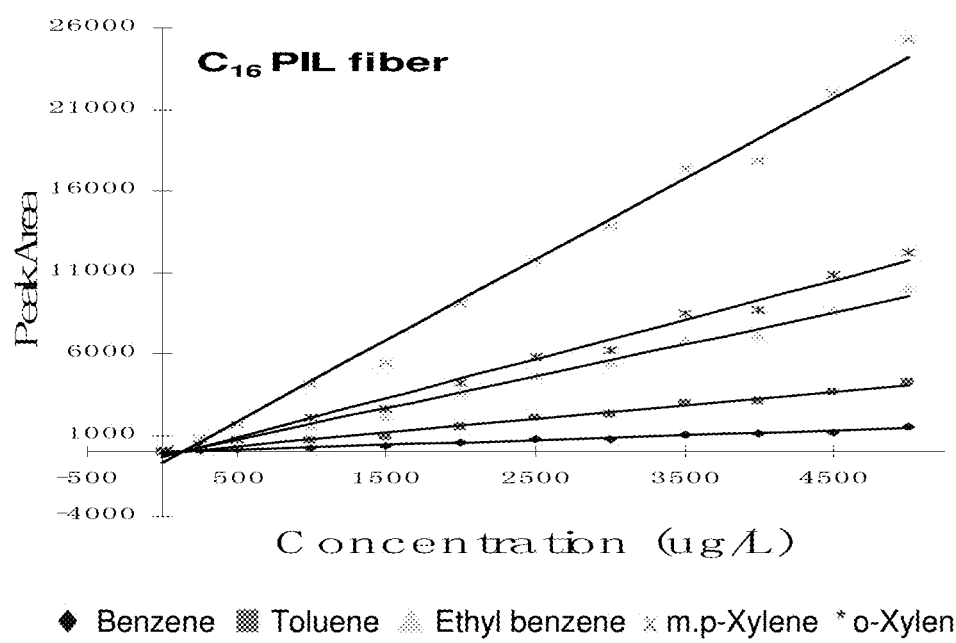
Figures 19C, 20:
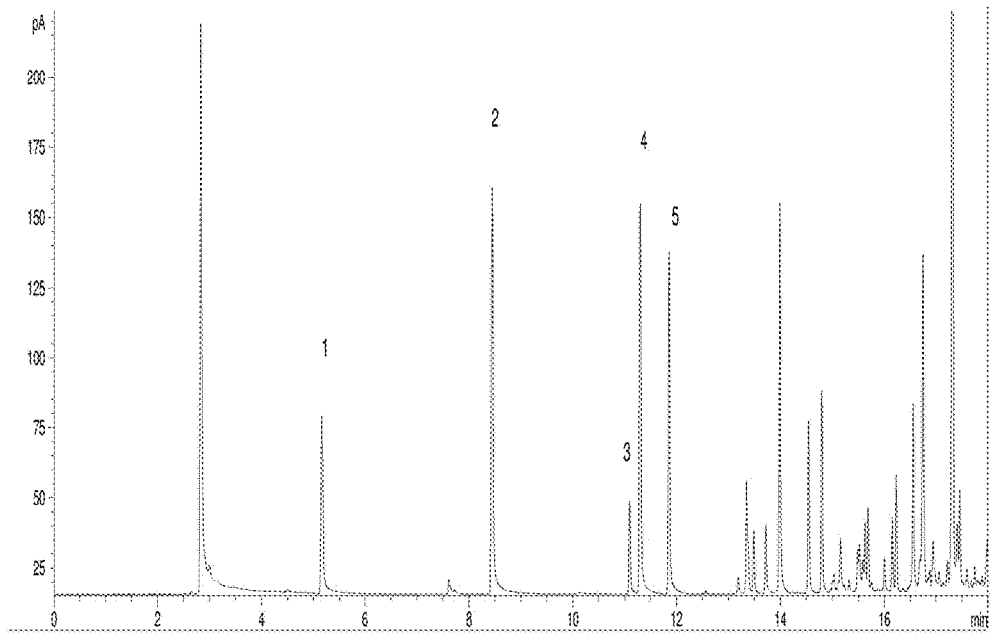
FIG. 20: Chart showing the figures of merit for C16 PIL-based extraction in gasoline.

FIGS. 19A-19C are graphs showing the quantitative analysis of PTEX compounds in gasoline. FIG. 19A shows the sorption time profile. FIG. 19B shows the calibration curves. FIG. 19C shows the gas chromatogram of BTEX in gasoline. FIG. 20 is a chart showing the figures of merit for C16 PIL-based extraction in gasoline.

Example B—Example 4

Ionic Liquid-Based Absorbent Coatings for Microextractions

The use of ILs as absorbent coatings in solid phase microextraction (SPME) included the development of an extraction device employing a fused silica support housed in a shielded syringe assembly. A method was developed to coat the IL on solid fused silica supports (~1 cm in length) by dipping the fiber in a solution of the IL in dichloromethane. The IL-coated fused silica support was then placed in the injection port of a GC at 200° C. for 4 minutes to completely remove the organic solvent.

Figure 27A:
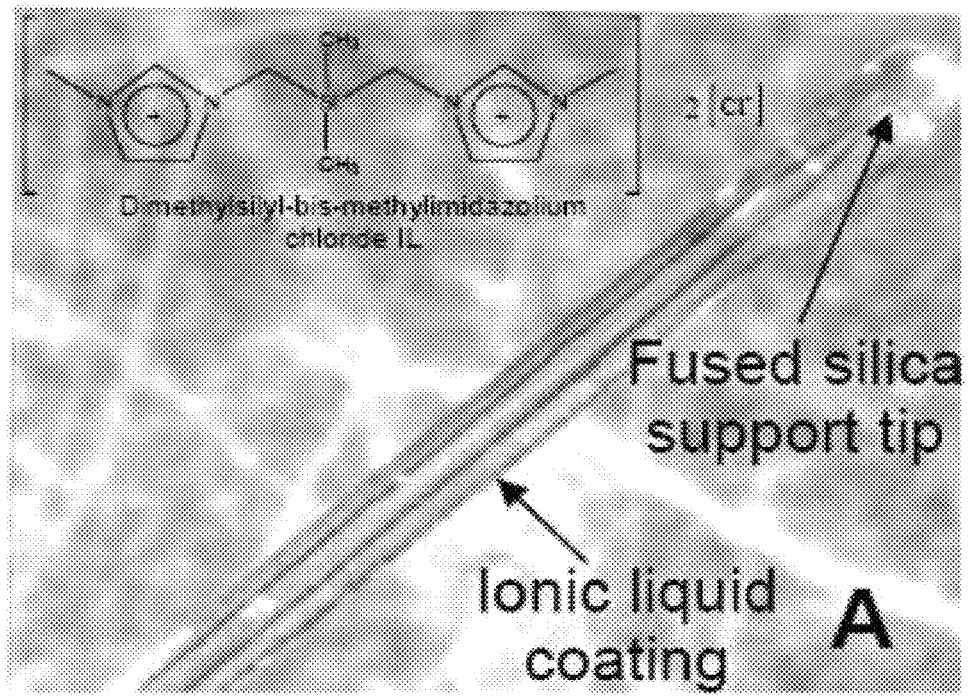
FIGS. 27A and 27B: Optical microscope photographs showing IL coated fused silica fiber tip (FIG. 27A) and magnified portion (~2.2 mm) of the support body (FIG. 27B).
Figure 27B:
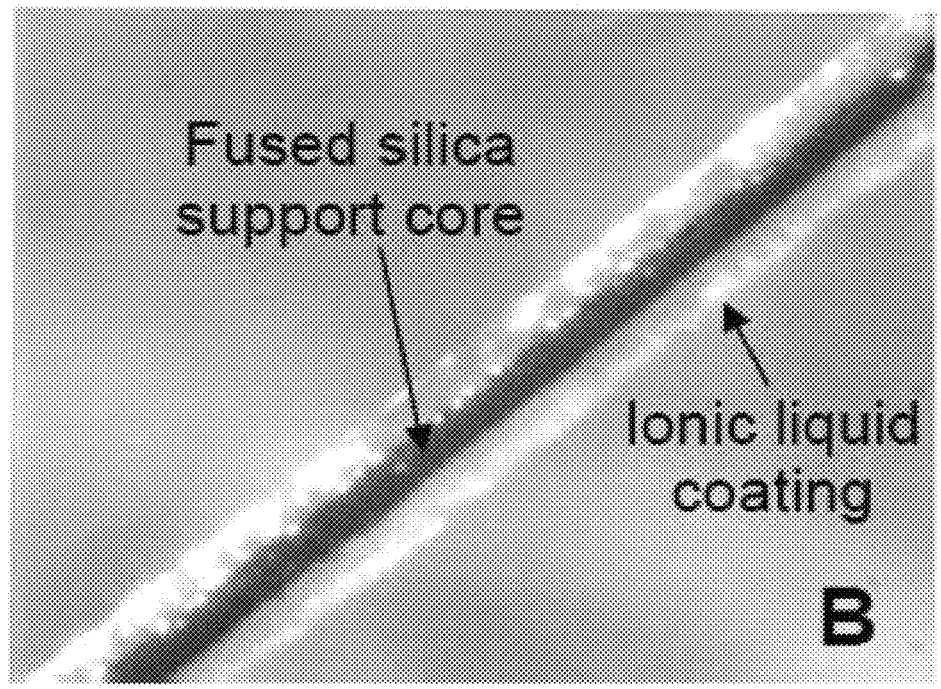

FIG. 27A and FIG. 27B show the fused silica support tip coated with a highly viscous siloxy-based IL, whose structure is shown in the subset.

Sampling was performed by exposing the fiber to the headspace of an aqueous analyte solution for a pre-determined amount of time. The analytes were then desorbed, separated, and detected using GC. Initial attempts in coating the fused silica support indicated the desirably of the IL to exhibit two properties: (i) possession of a high viscosity capable of providing a stable, even coating on the solid support; and, (ii) possession of a high volatilization temperatures capable of withstanding the temperatures of the GC injection port (250-300° C.).

Despite the fact that high extraction efficiencies were obtained for a variety of polar and nonpolar analytes, the extraction to extraction reproducibility was poor with percent relative standard deviation (% RSD) values from 20-25%. The culprit for this loss in reproducibility is likely the substantial decrease in IL viscosity when exposed to the high injection temperatures, thereby prompting the IL to flow off the fiber and into the injection port.

The inventors herein have now found that, in certain embodiments, improvements in the reproducibility can be attained by carrying out the desorption step using lower injection temperatures (170-200° C.). For analytes in which higher injection temperatures (>200° C.) are required (i.e., analytes will low vapor pressures and high boiling points), the fiber can be re-coated after each extraction which produces typical % RSD values between 14-18%.

In addition to neat ILs, linear polymers of ILs have also been examined as absorbent coatings. In one non-limiting example, the IL polymer is synthesized by free radical polymerization of the 1-vinyl-3-alkylimidazolium bromide monomer using a free radical such as azobisisobutylonitrile (AIBN).

The extent of polymerization is monitored by 1H-NMR to ensure the absence of any free monomers. The anion of the IL can be readily exchanged through biphasic anion metathesis.

Polymerized ILs do not exhibit the same viscosity drop with elevated temperatures as their monomeric analogs. In addition, the polymers can be easily dissolved in acetone and dip coated on the fused silica fiber to result in a thin film of the absorbent coating. The stability of the film (i.e., resistance to flowing) at elevated temperatures has resulted in % RSD values in the range of 3-12% and is highly analyte dependent. Typical % RSD values obtained in routine SPME are generally not higher than 15%.

Figure 28:
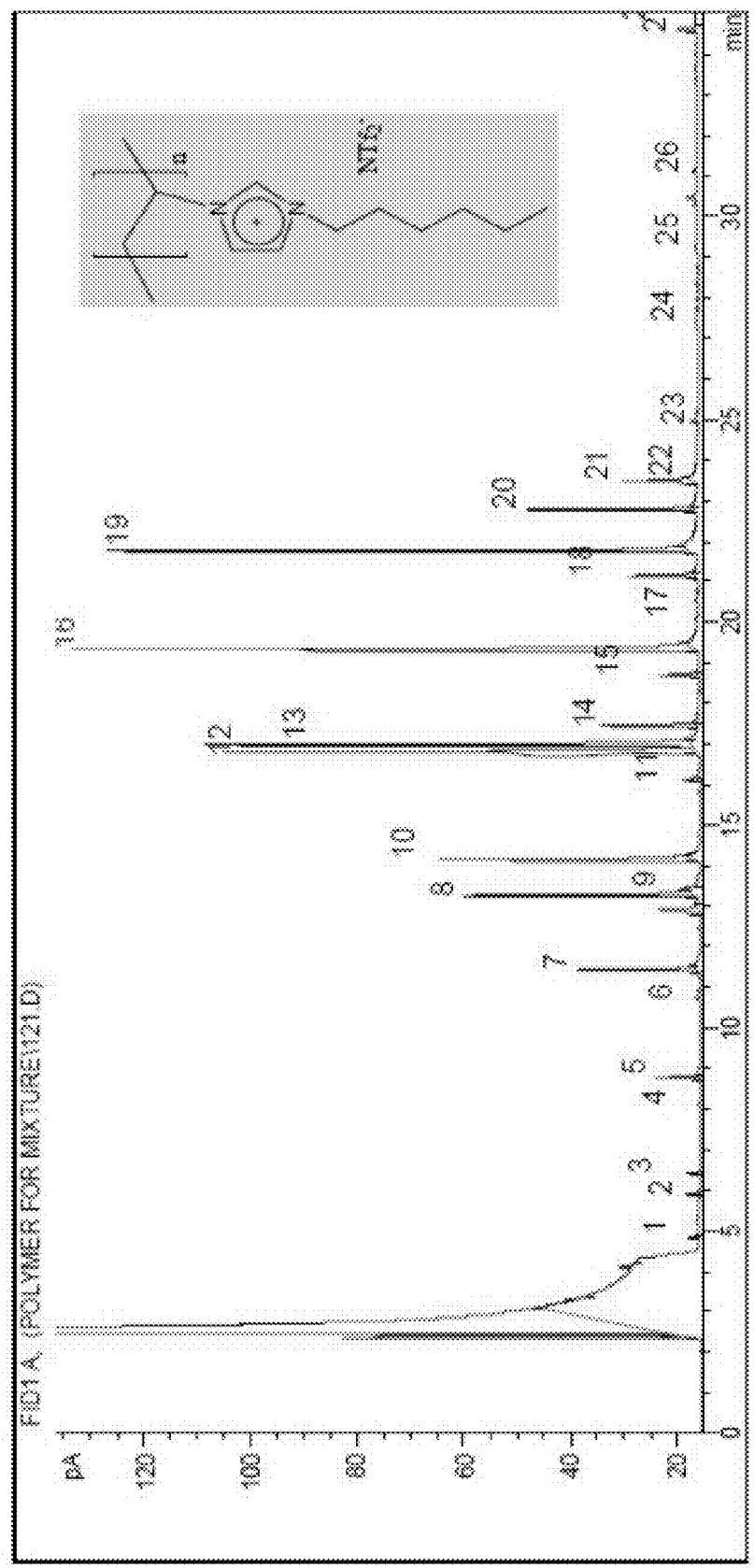
FIG. 28: GC separation of 27 analytes extracted from the headspace suing a homemade SPME apparatus consisting of the IL polymer coating. Analytes 1, 2, 8, 13, 14, 20 are small chained esters. 4, 6, 9, 11, 15, 18, 22 are aliphatic hydrocarbons. 3, 5, 7, 10, 12, 16, 19 are fatty acid methyl esters. 17, 21, 23-27 are phthalate esters. Conditions: 30 min extraction time; 600 μL, aqueous solution with 700 ppb of each analyte; ~400 μL headspace volume; desorption tem: 250° C.; desorption time: 4 min.

The gas chromatogram shown in FIG. 28 illustrates the headspace extraction of a mixture containing 27 polar and nonpolar analytes from an aqueous solution using a polymerized IL fiber support, analogous to that shown in FIG. 27. The structure of the IL polymer employed as the absorbent coating is shown as the subset in FIG. 28.

Example B—Example 5

Ionic Liquid-Coated Supports

Using the IL-polymer coated support, it is now shown herein that a desorption temperature and time of 230° C. and four minutes, respectively, results in the amenability of the fiber to be used up to approximately 65 extractions before the fiber becomes susceptible to breakage or the % RSD values increase to over 15%. In addition, headspace extraction sorption time profiles have been measured for aliphatic hydrocarbons, fatty acid methyl esters, small-chained esters, and phthalate esters using both large sample volumes (e.g., 15 mL aqueous solution with ~3.9 mL headspace) and small sample volumes (e.g., 600 µL aqueous solution with ~400 µL headspace). Upon reaching the equilibrium time, calibration curves have been obtained for homologous mixtures of fatty acid methyl esters and small-chained esters.

FIG. 29—EXAMPLE B Table 7 shows the exceptional linearity of the analytes studied. Also, additional classes of analytes including polyaromatic hydrocarbons and polychlorinated biphenyls can be extracted. The structure of the IL monomer was systematically modified through the incorporation of longer alkyl chains, aromatic moieties, and hydroxyl-functionality. Each IL-monomer is then paired with four different anions (e.g., Br—, NTf2-, PF6-, and BF4-) to show the cation and anion effects on extraction efficiency.

A structure/property relationship correlating the IL structure to solvation characteristics can be conducted by examining IL and IL-polymer coated supports for two purposes: (i) to study the partitioning of analytes between ILs and various solvents, and (ii) to utilize the unique and tunable solvation properties of the IL coating for the development of new microextraction absorbent coatings.

Using IL-based absorbent coatings, the solvation characteristics can be carefully chosen to selectively extract certain analytes from a complex mixture. For example, acidic analytes can be selectively extracted from other analytes by utilizing an IL that possesses high hydrogen-bond basicity. Likewise, aromatic analytes could be selectively extracted using an IL capable of interacting strongly via π-π interactions.

Example B—Example 6

Ionic Liquid Coated Absorbents

A dip coating technique used to prepare the IL-coated supports is successful for ILs that possess high viscosities as they are less prone to flowing at high desorption temperatures. For less viscous ILs, the IL film can be re-coated after each extraction to restore the absorbent coating. To investigate the effects of the IL cation and anion structure on overall analyte molecule partitioning, initial experiments ILs with the different cation/anion combinations can be examined.

Figure 30A:
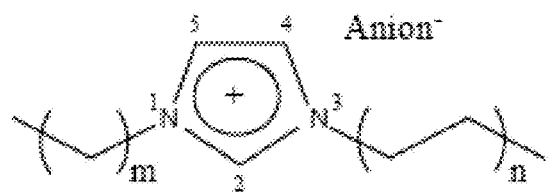
FIGS. 30A, 30B, 30: Structures of ionic liquids for creating coated (FIG. 30A) and immobilized (FIG. 30B, FIG. 30C) thin layers on solid supports.
Figure 30B:
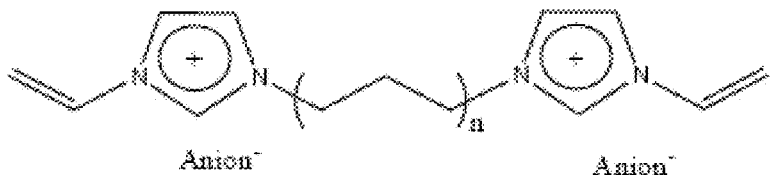
Figure 30C:
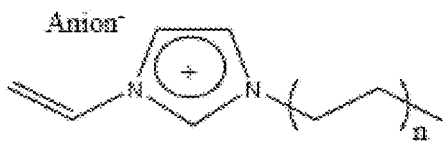

Representative structures of such traditional ILs are shown in FIGS. 30A-30C in which the substituent groups on the 1, 2, and 3 positions of the imidazolium ring can be systematically varied to give rise to unique cation structures. In addition, other cations such as pyridinium and pyrrolidinium can also be produced.

A variety of anions can be paired with given cations to show the effect of the anion on partitioning. The observed hydrogen bond basicity of ILs is largely a contribution from the anion whereas the hydrogen bond acidity appears to originate from the cation. Through modification of aqueous solution pH, the extent of interaction between acidic and basic compounds and various IL cations and anions can be shown.

Example B—Example 7

Immobilized Ionic Liquid Absorbents

Figure 31:
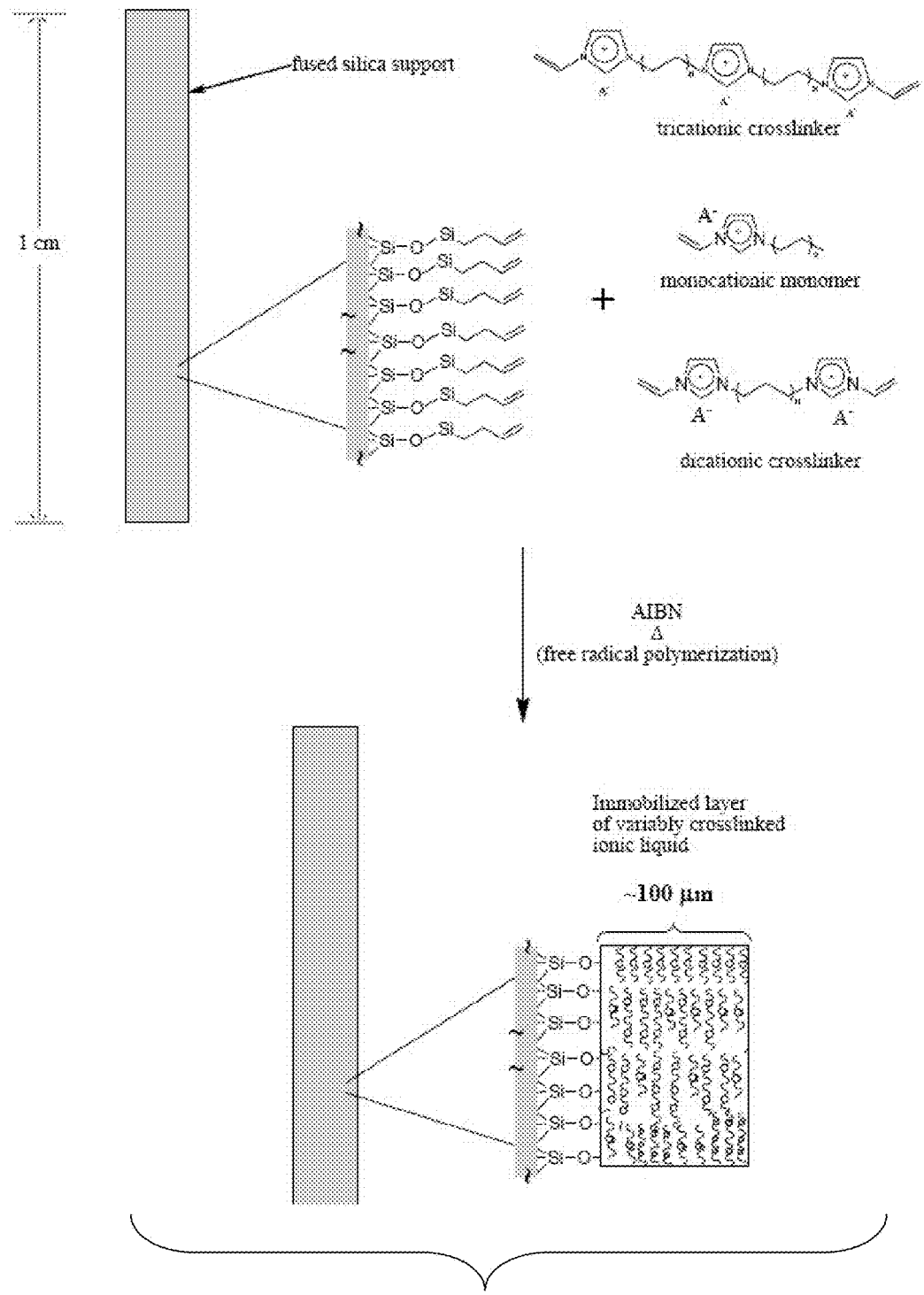
FIG. 31: Schematic illustration representing the coating and subsequent free radical reaction to form a thin, immobilized/crosslinked IP layer on a 1 cm segment of fused silica.

The partitioning behavior of compounds to IL-polymers that are formed on the surface of the solid support can be accomplished through the reaction of the free silanol groups on the surface of the fused silica support with a vinyl-terminated organoalkoxysilane. FIG. 31 shows the coating and subsequent free radical reaction to form a thin, immobilized/crosslinked IP layer on a 1 cm segment of fused silica.

The vinyl-substituted IL monomers and/or crosslinkers can then be coated on the support with AIBN and heated to induce free radical polymerization. In certain embodiments, the degree of crosslinking can dictate the consistency of the formed polymer with lower degrees of crosslinker resulting in gel-like materials.

Extensive crosslinking may likely result in a more rigid, plastic-like coating. The extent of crosslinking may influence the mechanism of partitioning (i.e., adsorption versus absorption) and the overall selectivity for targeted analyte molecules. In addition to thermally desorbing analytes from the coating material in the injection port of GC, these robust supports have the advantage of being adaptable to solvent desorption in HPLC.

A solvent desorption device coupled to HPLC that accommodates the extraction devices can thus be used.

Example B—Example 8

Ionic Liquid Coated Stir Bar Supports

For analytes with low solubilities in aqueous solution or under very dilute conditions, a larger amount of IL may be required to achieve a measurable partition coefficient.

FIG. 32 illustrates a procedure for producing thicker films of immobilized and coated ILs on glass stir bar supports. Following the coating or immobilization procedure, the stir bar can be added directly to the biphasic system, stirred, and then be retrieved to chromatographically determine the concentration of the analytes in the IL phase.

Due to the fact that the coating may be much thicker on the stir bar support compared to that on the fused silica support, a thermal desorption unit may be required to desorb analytes from the stir bar. The desorption unit utilizes cryogenic liquid nitrogen to focus the analytes during the desorption step so that all analytes are subjected to the head of the GC capillary column in one slug. For more refractory compounds, HPLC can be used to separate and quantify the analyte molecules. This can be carried out by choosing the appropriate solvent strength of the mobile phase and either performing a back extraction or the utilization of an existing solvent desorption chamber built into the injection system.

Example B—Example 9

Determination of Partition Coefficients

FIGS. 33A-33B show examples of methods and appropriate equilibria that can be considered in determining the desired partition coefficients. The equilibria are analogous to those derived previously for solid phase microextraction. The advantages of measuring partition coefficients using the proposed microextraction techniques are: (i) small volumes of IL required to form the absorbent coating; (ii) an extensive range of analytes can be examined; (iii) identical analytes can be desorbed and separated by both GC and HPLC allowing for a comparison of partition coefficients using two different desorption and separation methods; (iv) the proposed microextraction methods are faster than current shake-flask methods; and, (v) depending on the solvent properties of the IL and/or the extent of crosslinking, the aqueous solution can be easily replaced by an organic solvent to form a biphasic system with the IL.

Example B—Example 10

Task-Specific Ionic Liquid (TSIL) Cation/Anion Structural Effects and Extraction Conditions to Analyte Partitioning The unique solvation properties of ILs can be used to develop IL-based extraction devices. TSILs represent a class of ILs in which the cation and/or anion incorporates unique functionality useful for enhancing distinct interactions to perform desired tasks.

Use of TSILs.

Figure 34A:
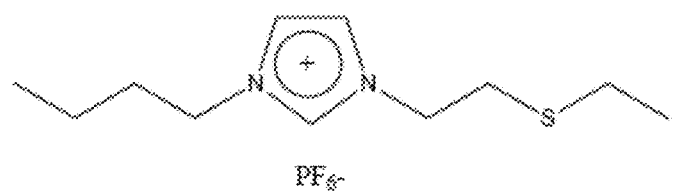
FIGS. 34A-34C: Structures of various task-specific ionic liquids (TSILs).
Figure 34B:
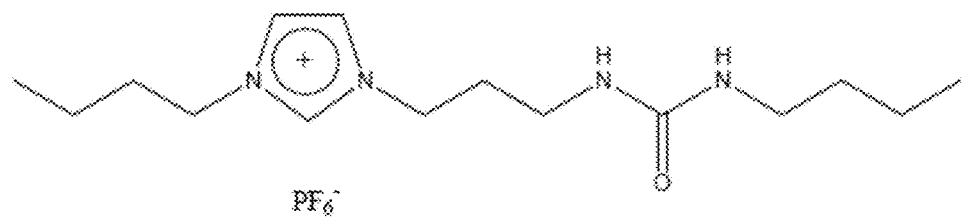
Figure 34C:
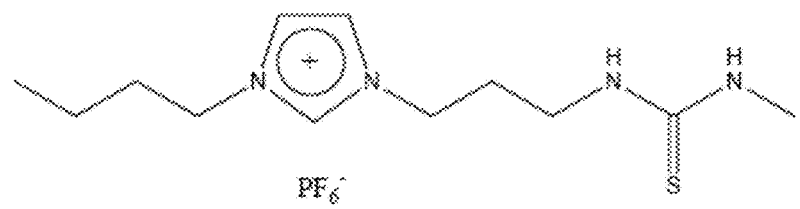

A variety of TSILs, examples of which are can be synthesized. For example, the thioether, thiourea, and urea functionalized ILs (FIGS. 34A-34C) are capable of selectively chelating $Cd^{2+}$ and $Hg^{2+}$. Absorbent coatings of these neat ILs can be examined initially followed by synthesis of their immobilized analogs Immobilization can take place on both the fused silica and stir bar support. This can be accomplished by incorporating vinyl or allyl moieties into the 3 position of the imidazolium cation while retaining the task-specific functionality.

This method of measuring the partition coefficients can allow for the addition of competing molecules in the biphasic system to determine any concentration limits that may affect the overall selectivity the TSIL has for target molecules. In addition, different IL anions can be examined to probe the effect of the anion on the observed extraction efficiency of the metal ion. Other conditions such as aqueous solution temperature, pH, and electrolyte concentration can also be adjusted.

To detect and quantify pre-concentrated metal ions in the IL, a back extraction can be performed followed by detection using atomic absorption spectrophotometry or inductively coupled plasma atomic emission spectrometry.

Figure 35:
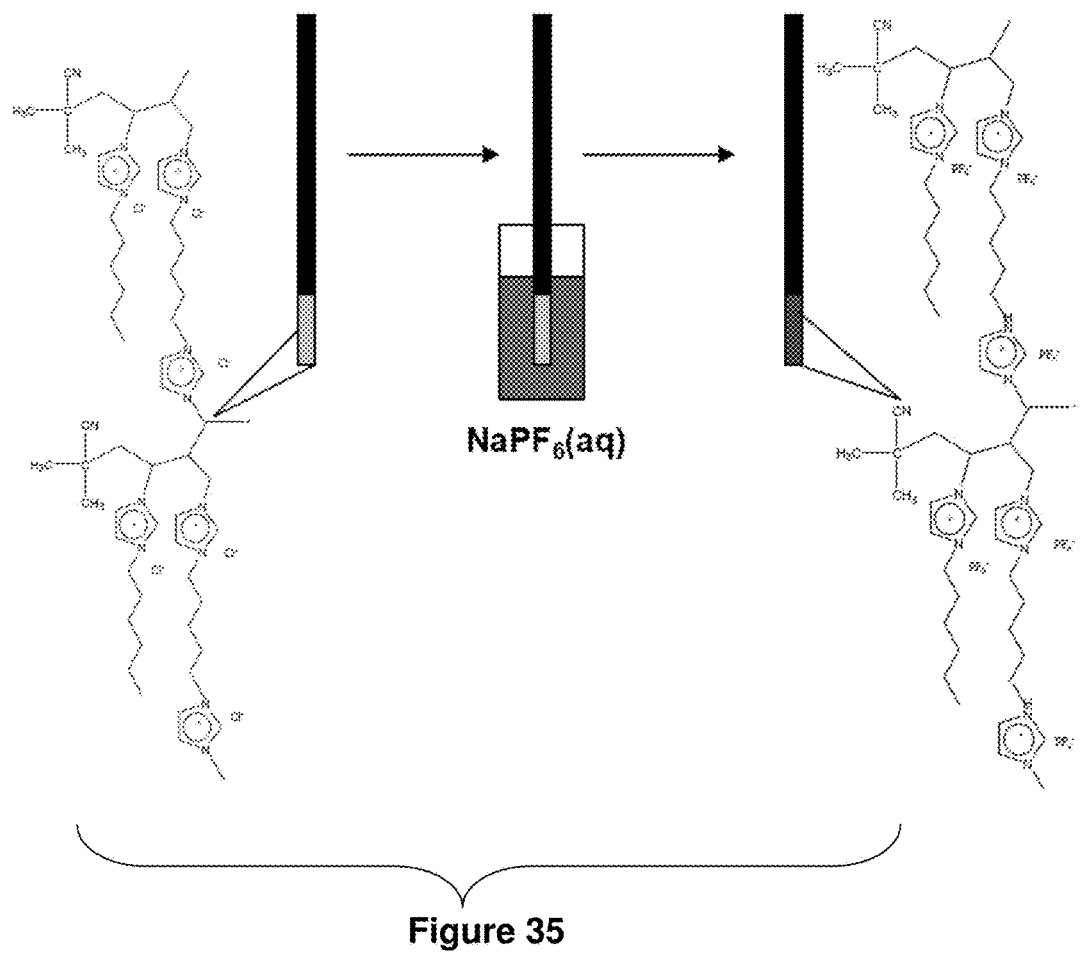
FIG. 35: Schematic illustration of on-fiber metathesis anion exchange using a partially crosslinked IL coating. The Cl⁻ anions (left) are being exchanged and replaced by $PB_6^-$ (right).

FIG. 35 shows a schematic illustration of on-fiber metathesis anion exchange using a partially crosslinked IL coating. The $Cl^-$ anions (left) are being exchanged and replaced by $PB_6^-$ (right).

Example B—Example 11

IL-Based $CO_2$ Selective Absorbent Coating

An intense area of research today lies with the development of new materials and methods for the sequestration of $CO_2$. Sequestration of $CO_2$ is particularly important in the purification of sour natural gas, onboard naval submarines where clean air atmosphere is desired, and in various industrial processes where scrubbers are typically employed.

TSILs can be designed to sequester $CO_2$ through the use of appended amines to the cation core. The molar uptake of $CO_2$ per mole of TSIL approaches 0.5, demonstrating that the TSILs are sequestering $CO_2$ in an analogous manner to the standard employed alkanolamines. The process of $CO_2$ capture is reversible by heating the TSIL to temperatures around 80-100° C.

Similar amine-functionalized TSILs can be used to form coated and immobilized absorbent coatings for the development of task-specific microextraction devices. Following the extraction and capture of $CO_2$, the supports can be desorbed and separated using packed column GC with a thermal conductivity or mass spectrometric detector. Using this approach, the following objectives can be met: (i) examination of TSIL $CO_2$ selectivity in the presence of water vapor; (ii) effect of temperature on $CO_2$ uptake into the TSIL; and (iii) influence of potential contaminating gases (e.g., $H_2S$, CO, COS) which may lengthen the equilibrium uptake time of $CO_2$ into the TSIL. The task-specific extraction device can be incorporated into an industrial process for the detection and quantification of $CO_2$ in gas streams.

BBIM-Taurate IL-Based $CO_2$ Selective Absorbent Coating

Figure 36:
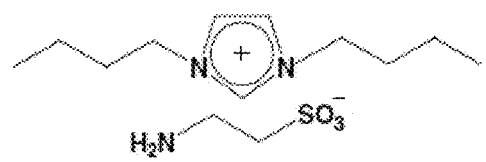
FIG. 36: Structure of -1butyl-3-butylimidazolium taurate (BBIM-taurate).
Figure 37:
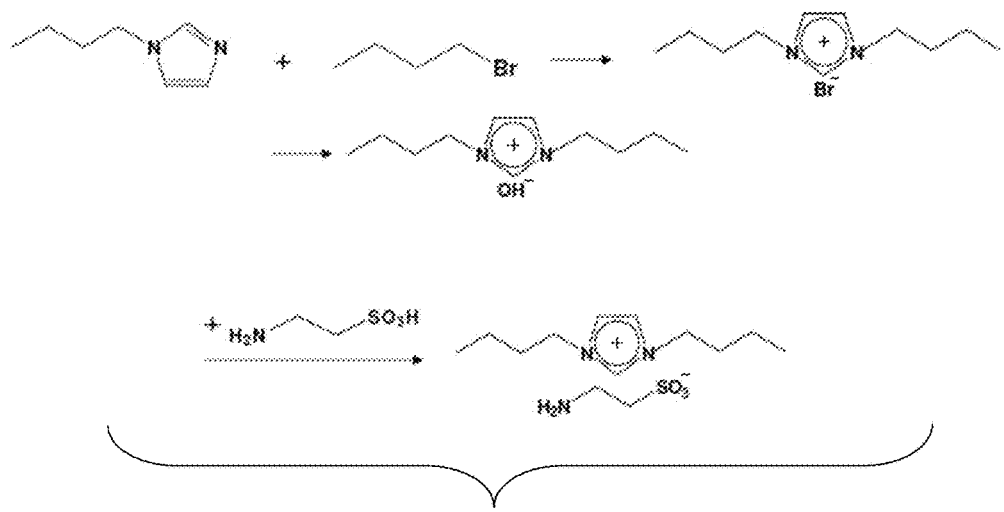
FIG. 37: Synthesis of BBIM-taurate.
Figure 38:
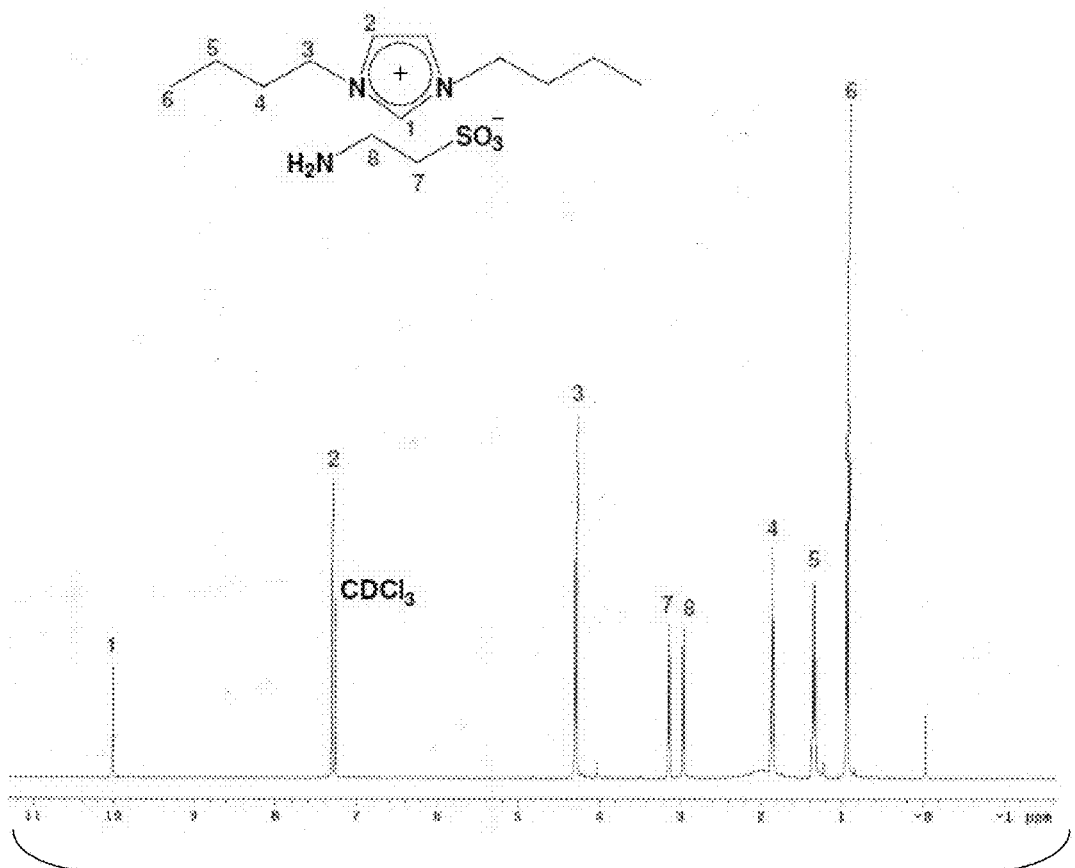
FIG. 38: The gas chromatogram of BBIM-taurate.

FIG. 36 shows the structure of -1butyl-3-butylimidazolium taurate (BBIM-taurate). FIG. 37 show a synthetic route for BBIM-taurate. FIG. 38 is the gas chromatogram of BBIM-taurate.

BBIM-taurate IL was exposed to $CO_2$. FIG. 39 contains photographs showing BBIM-taurate before $CO_2$ exposure (right), and after (left) $CO_2$ exposure. The sorption data of BBIM-taurate (◇) and BBIM-NTf$_2$ (□) is shown in FIG. 40.

Materials

The synthesis of the ionic liquid monomers and polymers involved the use of the following reagents: vinyl imidazole, 1-bromohexane, 2,2'-azo-bis(isobutyronitrile) (AIBN) and taurine, which were purchased from Sigma-Aldrich (St. Louis, Mo., USA). Lithium bis[(trifluoromethyl)sulfonyl] imide was obtained from SynQuest Labs (Alachua, Fla., USA). Deuterated chloroform and dimethylsulfoxide were obtained from Cambridge Isotope Laboratories (Andover, Mass., USA). Deionized water (18.2 MΩ/cm) was obtained from a Milli-Q water-purification system (Millipore, Bedford, Mass., USA). Ethyl acetate, chloroform, 2-propanol, hexane, acetone, methanol, methylene chloride, and sodium hydroxide were obtained from Fisher Scientific (Fairlawn, N.J., USA). Propane and microflame brazing torches were purchased from Sigma-Aldrich. Amberlite IRA-400(OH) ion-exchange resin was obtained from Sigma-Aldrich.

All laboratory-made SPME devices were constructed using a 5-μL syringe purchased from Hamilton (Reno, Nev., USA) and 0.05 mm I.D. fused silica capillary obtained from Supelco (Bellefonte, Pa., USA). Commercial SPME fibers of PDMS (film thickness of 7 μm) and Carboxen™-PDMS (film thickness of 75 μm) were obtained from Supelco. A fiber holder purchased from the same manufacturer was used for manual injection of the commercial fibers. Gas sampling bulbs (250 mL) with Thermogreen™ LB-1 cylindrical septa were obtained from Supelco and used to perform $CO_2$ extraction. A pressure gauge (0-±30 psi), obtained from Fisher Scientific, was used to record the pressure.

Synthesis of VHIM Ionic Liquids (IL) Monomers

The ionic liquid monomers were synthesized, as shown in FIG. 41. Briefly, 1-vinyl-3-hexylimidazolium bromide (VHIM-Br) was produced by mixing 1-vinylimidazole with an equimolar amount of 1-bromohexane in 2-propanol. The mixture was then allowed to react at 60° C. under constant stirring for 24 h. After removal of 2-propanol under vacuum, the product was dissolved in small amount of Milli-Q water and then extracted with ethyl acetate five times to remove any unreacted starting materials. Ethyl acetate was then removed, and product was collected and dried in a vacuum oven. The purity of the VHIM-Br was confirmed by $^1$H-NMR before polymerization or metathesis anion exchange.

Synthesis of VHIM Ionic Liquids Polymers (PIL)

Figure 42:
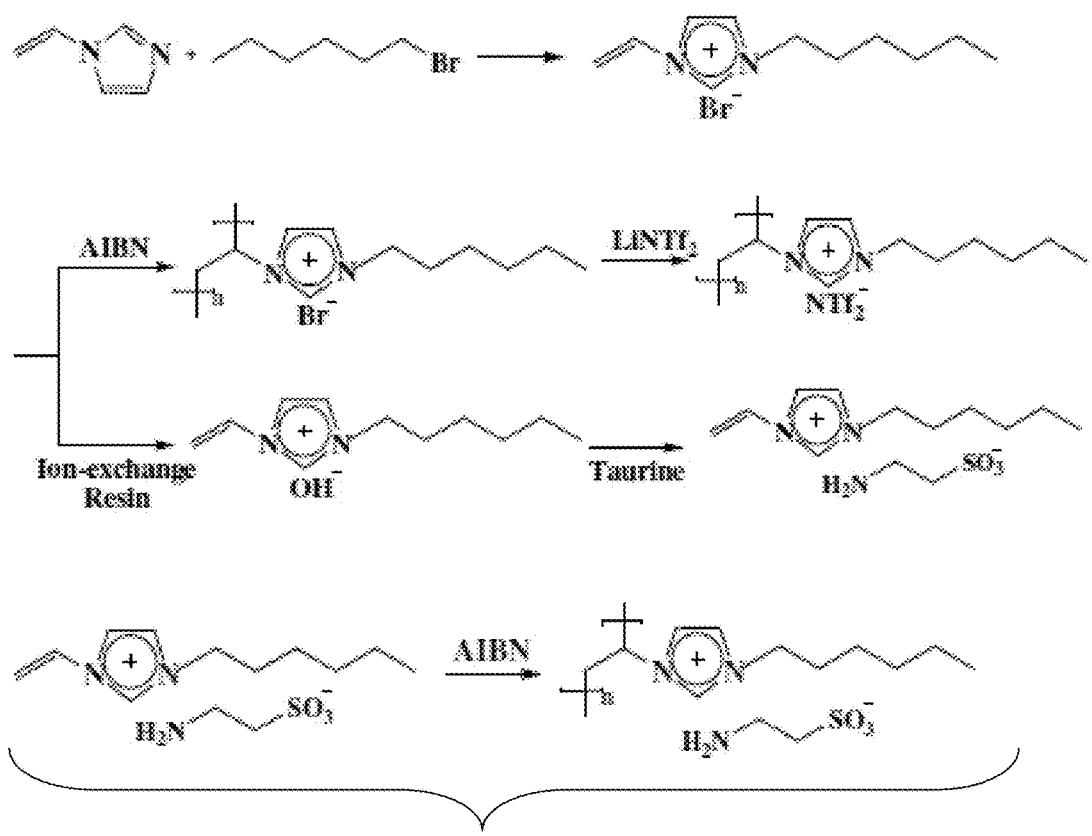
FIG. 42: Schemes demonstrating the synthesis of polymeric ionic liquids used for capturing $CO_2$, including an example of synthesis of taurate-based PIL.

To obtain poly(l-vinyl-3-hexylimidazolium)bis[(trifluoromethyl)sulfonyl]imide (poly(VHIM-NTf$_2$)), polymerization of VHIM-Br was carried out by free radical polymerization, as shown in FIG. 42. Briefly, 5.0 g of the purified VHIM-Br was dissolved in 30 mL of chloroform. Then, 0.1 g (~2%) of the free radical initiator AIBN (2,2'-azo-bis(isobutyronitrile)) was introduced, and the solution was refluxed for 3 h under $N_2$ protection. Chloroform was then removed under vacuum and the product was dried in a vacuum oven. The polymerization step was proved to be completed by the disappearance of the peaks that represent the vinyl group in the $^1$H-NMR. The polymerization was repeated when necessary. The obtained poly(l-vinyl-3-hexylimidazolium) bromide was dissolved in Milli-Q water and equimolar amount of lithium bis[(trifluoromethyl)sulfonyl] imide (LiNTf$_2$) was introduced to this aqueous solution to perform metathesis anion exchange. This solution was stirred overnight, and the resulting polymeric ionic liquid (PIL) precipitate, poly(VHIM-NTf$_2$), was collected and washed with 3 aliquots of water and then dried under vacuum at 70° C. for 2 days.

Synthesis of Poly(VHIM-Taurate)

Figure 43:
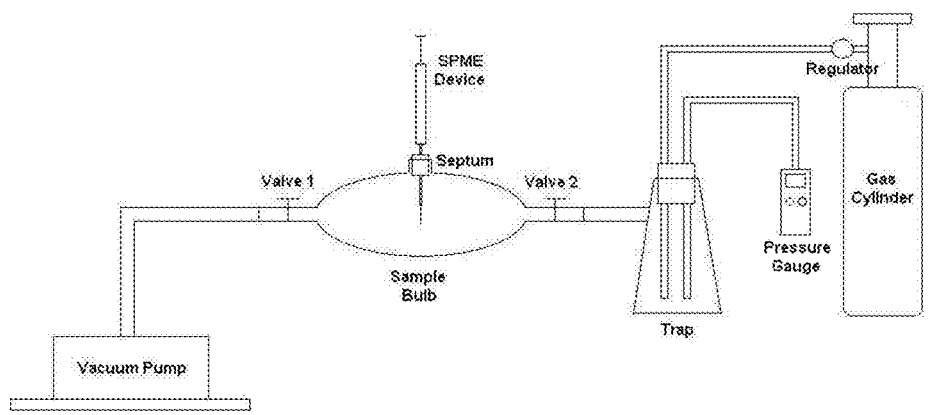
FIG. 43: Apparatus of SPME setup for capture of $CO_2$.

To synthesize poly(l-vinyl-3-hexylimidazolium) taurate, the counter anion of VHIM-Br was changed to hydroxide by passing the monomer through a column packed with ion-exchange resin in the hydroxide ion form, as shown in FIG. 43. Particularly, 100 mL of the regenerated ion-exchange resin was packed into a 50×2 cm column followed by flushing excess 5 M NaOH to ensure the resin was completely switched to the hydroxide ion form. This was verified by adding silver nitrate to a collected fraction of the eluent. White silver bromide precipitate forms if bromide ions persist in the solution. Nitric acid was used to avoid the potential interference of silver oxide, which is a dark precipitate and can be dissolved by introducing nitric acid. After regenerating the resin completely, VHIM-Br was dissolved in water and passed through the ion-exchange resin column with an appropriate flow rate.

The generated hydroxide-based IL was kept in aqueous solution, due to its limited stability. An acid-base titration was applied to determine the concentration of the hydroxide-based IL in the aqueous solution. The final step was a neutralization reaction between VHIM-OH and taurine. An equimolar amount of taurine was dissolved in water and added into the VHIM-OH aqueous solution drop-by-drop to avoid intense reaction. The reaction was completed overnight. Water was consequently removed by rotary evaporation, and the product was dried under vacuum for 48 h. NMR spectra were obtained to verify the structure of VHIM-taurate. Polymerization was performed using the aforementioned conditions to yield the poly(l-vinyl-3-hexylimidazolium) taurate [poly(VHIM-taurate)] PIL.

Preparation of PIL-Coated SPME Fibers

Laboratory-made SPME devices were constructed. Pretreated SPME fibers were coated with the poly(VHIM-NTf$_2$) PIL, poly(VHIM-taurate) PIL, as well as mixtures containing these two PILs. To prepare a binary fiber coating mixture of PILs, poly(VHIM-NTf$_2$) and poly(VHIM-taurate) were mixed in chloroform at the desired weight percentages of each component. The coating solution was shaken for 5 min to ensure that the two PILs were homogeneously mixed. The film thickness of the PIL fibers coating were estimated by scanning electron microscopy.

Extraction of $CO_2$

The apparatus used is shown in FIG. 43. The operation of the SPME set-up was performed according to the following steps:

(1) With the regulator closed, valve 1 and valve 2 were opened, and the entire system evacuated until the pressure reading from the pressure meter was constant.

(2) Valve 1 was closed to isolate the system from the atmosphere. The initial pressure was recorded from the pressure gauge.

(3) The regulator was open to introduce the gas sample to the sample bulb. The reading from the pressure gauge was recorded as the final pressure when the pressure reached a constant value.

(4) Valve 2 was closed and the SPME fiber exposed to the gas sample inside the sample bulb for a desired length of time.

(5) The captured $CO_2$ was released from SPME fiber by high temperature desorption in the GC injection port, and the obtained $CO_2$ peak area normalized by $\Delta P$ (final pressure–initial pressure).

GC Separation

All separation experiments were conducted using an Agilent Technologies 6890N gas chromatograph (Agilent Technologies, Palo Alto, Calif., USA). The gas chromatograph is equipped with thermal conductivity and flame ionization detectors coupled in series. All separations were performed using a Carboxen™ 1010 PLOT capillary column (30 m×0.32 mm I.D.) purchased from Supelco. The following temperature program was used for the separation of $CO_2$: initial temperature of 35° C. held for 10 min and then increased to 225° C. employing a ramp of 12° C./min Helium was used as the carrier gas with a flow rate of 1 mL/min. The inlet temperature was maintained at 250° C. for PDMS, Carboxen™-PDMS and poly(VHIM-$NTf_2$) PIL fibers, and 180° C. for the other fibers. A splitless injection was used, and a purge flow to split vent of 20.0 mL/min at 0.10 min was applied. The thermal conductivity detectors were held at 250° C., reference flow of 20.0 mL/min and the make-up flow of helium at 7.0 mL/min Agilent Chemstation software was used for data acquisition.

Figure 44:
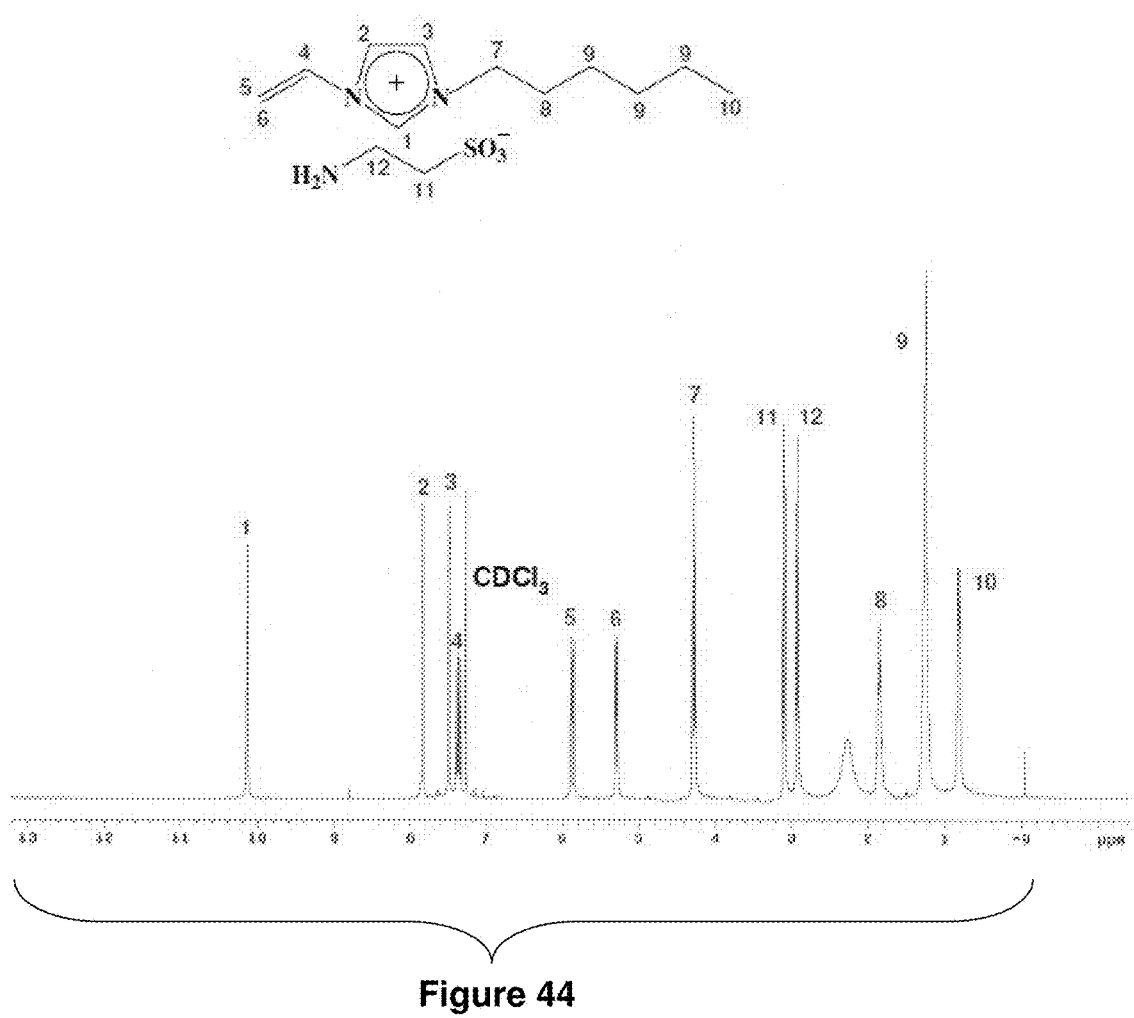
FIG. 44: The gas chromatogram of a taurate-based IL.

FIG. 44: The gas chromatogram of the taurate-based IL.

Figure 45:
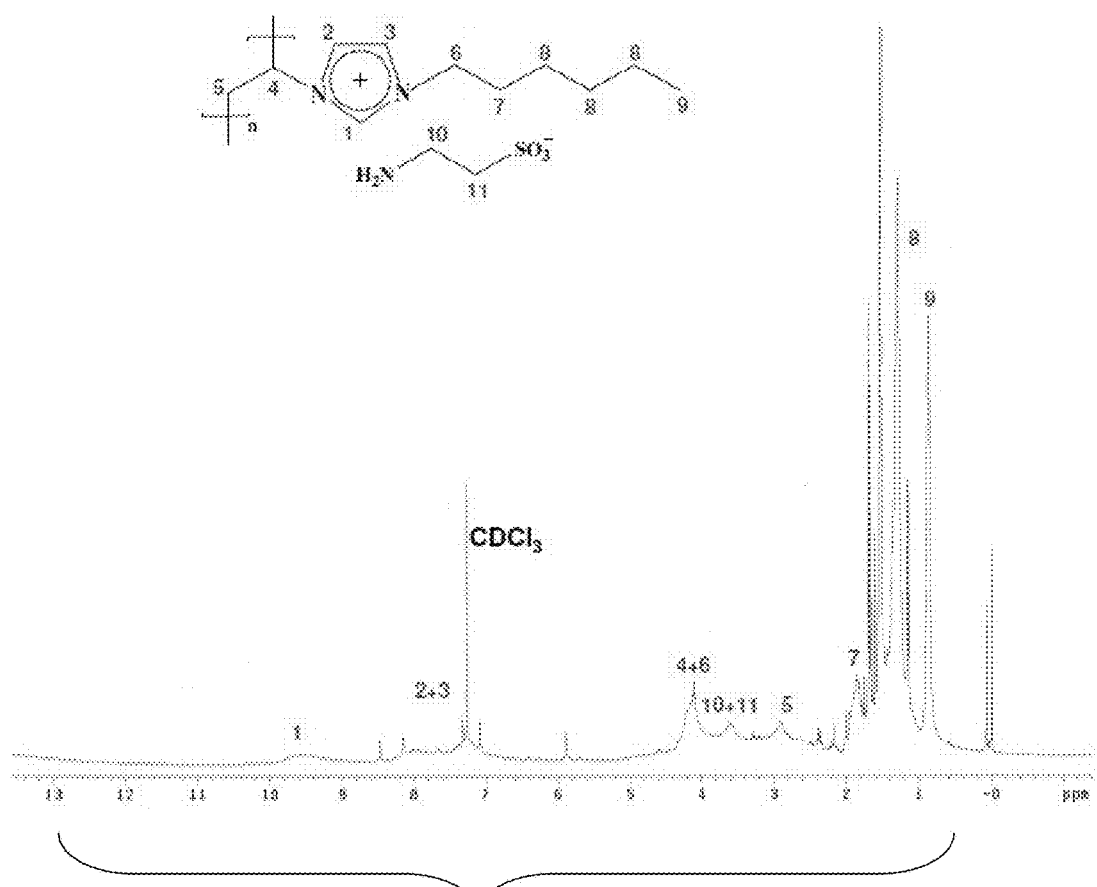
FIG. 45: The gas chromatogram of the taurate-based PIL.
Figure 49:
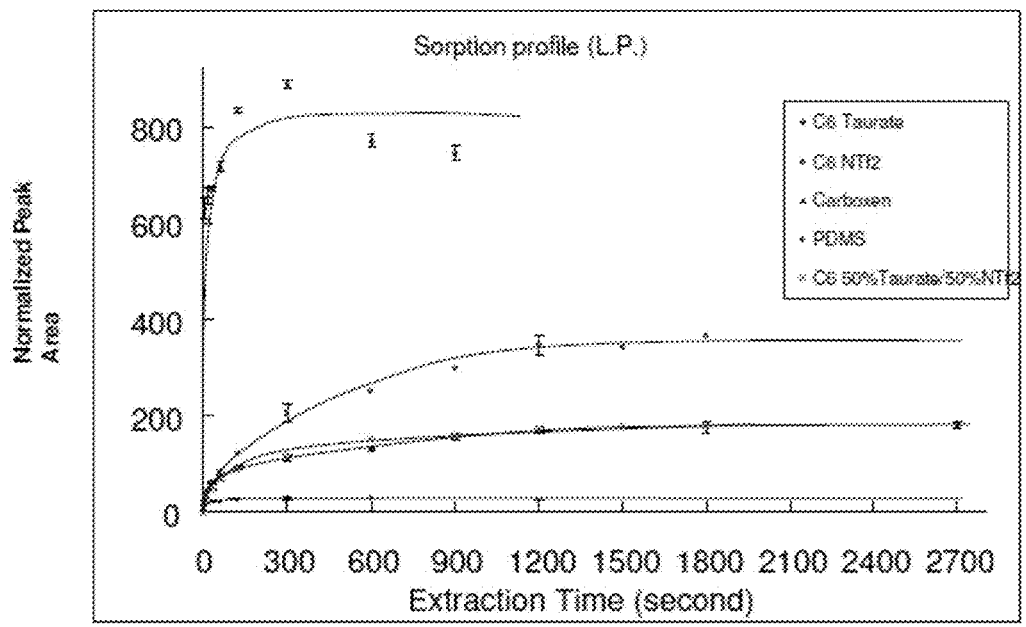
FIG. 49: Sorption-time profile obtained under low pressure of $CO_2$ showing the comparison of different IL-based sorbent coatings to 2 commercial-based coatings (Carboxen and PDMS). The film thickness of the two commercial coatings are approximately six to seven times that of the IL-based systems.

FIG. 45: The gas chromatogram of the taurate-based PIL.

FIG. 46: Scanning electron micrograph of BBIM-taurate coated fiber before exposure to $CO_2$. FIG. 47A and FIG. 47B: Scanning electron micrographs of same BBIM-taurate coated fiber after exposure to $CO_2$.

FIG. 48: Scanning electron micrograph of same BBIM-taurate coated fiber after desorption.

Figure 50:
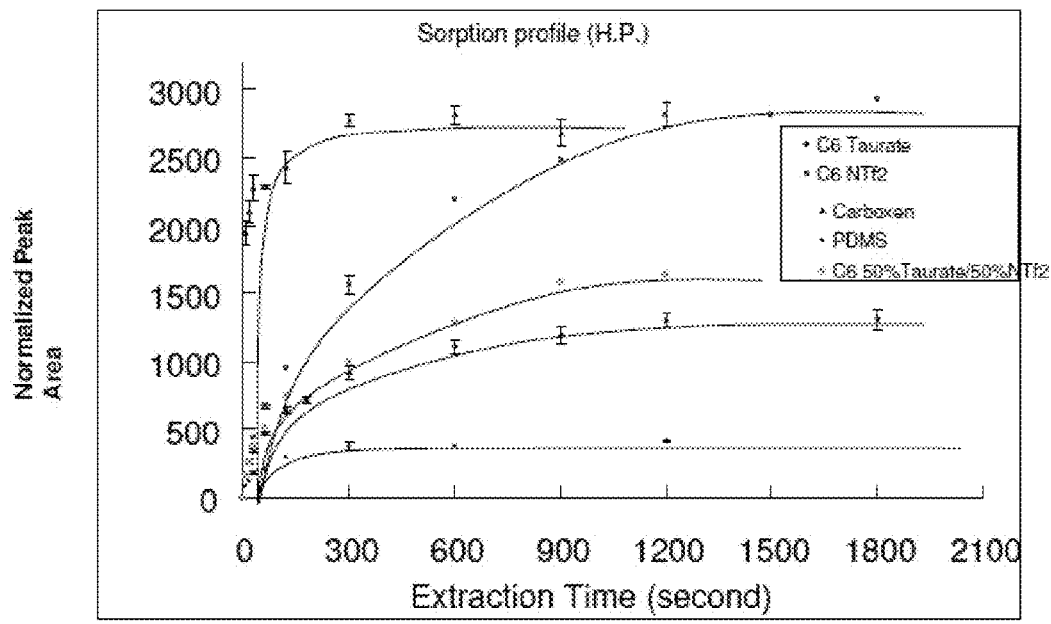
FIG. 50: Sorption-time profile obtained under high pressure of $CO_2$ showing the comparison of different IL-based sorbent coatings to 2 commercial-based coatings (Carboxen and PDMS). The film thickness of the two commercial coatings are approximately six to seven times that of the IL-based systems.

FIG. 50: Sorption-time profile obtained under low pressure of $CO_2$ showing the comparison of different IL-based sorbent coatings to 2 commercial-based coatings (Carboxen and PDMS). The film thicknesses of the two commercial coatings are approximately six to seven times that of the IL-based systems.

Figure 51:
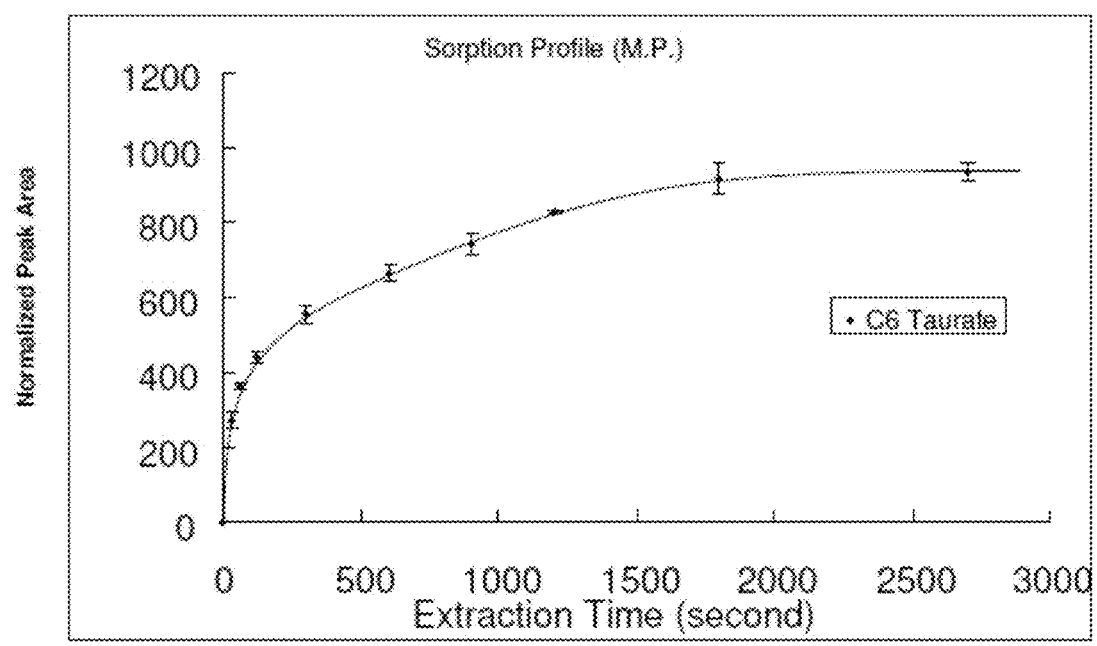
FIG. 51: Sorption-time profile of $CO_2$ under medium pressure using the $C_6$-taurate based ionic liquid polymer.

FIG. 51: Sorption-time profile obtained under high pressure of $CO_2$ showing the comparison of different IL-based sorbent coatings to 2 commercial-based coatings (Carboxen and PDMS). The film thickness of the two commercial coatings are approximately six to seven times that of the IL-based systems.

FIG. 52: Sorption-time profile of $CO_2$ under medium pressure using the $C_6$-taurate based ionic liquid polymer.

Figure 53:
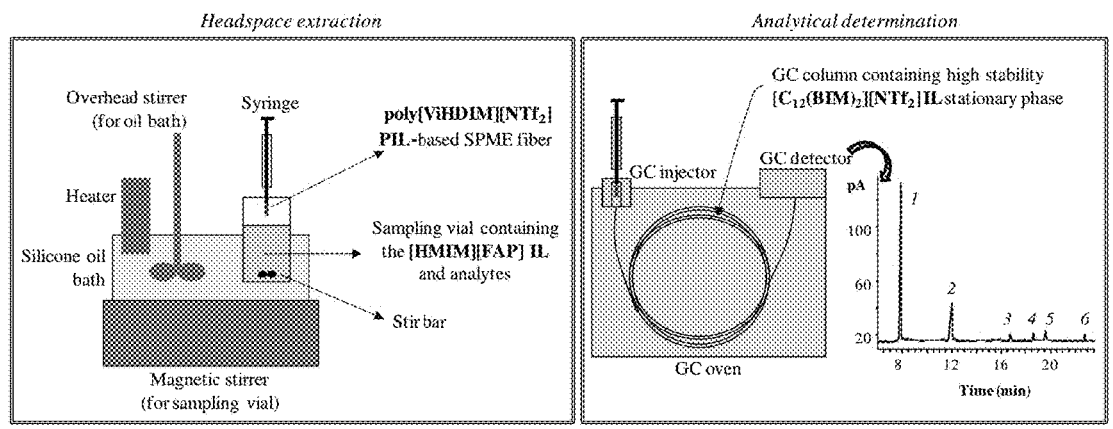
FIG. 53: Schematic diagram demonstrating the use of [HMIM][FAP] as a headspace solvent, the poly[ViHDIM][NTf$_2$] PIL as SPME sorbent coating, and the [$C_{12}$(BIM)$_2$][NTf$_2$] IL as a high stability GC stationary phase. The analytes are (1) tricosane, (2) hexacosane, (3) methyl heneicosanoate, (4) methyl behenate, (5) triacontane, and (6) methyl tetracosanoate.

FIG. 53: Chart showing relative standard deviation values demonstrating the enhanced reproducibility of two IL-based polymer coatings compared to two commercial-based sorbent coatings. The time in parenthesis represents the time during the extraction step in which the fiber was withdrawn and subjected to GC analysis.

Example B—Example 12

Ion Exchange Mechanism in IL-Based Absorbent Coatings for the Tunability of Extraction Selectivity Absorbent coatings comprised completely of ions have interesting properties not observed with traditional SPME and SBSE coating materials. The selectivity and utility of ILs can be realized by understanding the tunability offered by ion exchange processes.

Example B—Example 13

Selectivity Tuning by on-Support Anion Exchange

The cation and anion each contribute unique solvation interactions thereby making ILs among the most complex solvents. In most traditional imidazolium-based ILs, the anion provides the IL its hydrogen-bond basic behavior. The synthesis of ILs can involve the construction of the cationic portion of the molecule followed by metathesis anion exchange. Using this approach, on-fiber metathesis exchange of anions from immobilized absorbents on both stir bar and fused silica supports can be produced.

This method, shown schematically in FIG. 26, requires that the IL coating be partially crosslinked to allow swelling of the polymer for complete metathesis exchange. This can be accomplished using a similar approach that has been used for polymer beads resulting from partially crosslinking vinyl-functionalized IL monomers.

On-fiber anion exchange can allow for high throughput characterization of IL-polymers as well as provide a simple route for altering the extraction selectivity of the absorbent coating.

Example B—Example 14

DNA Extractions Using Ionic Liquids

One of the most commonly employed methods of isolating and concentrating DNA and RNA from aqueous solution is the buffer-saturated phenol/chloroform extraction system. Protein contaminants become denatured in the presence of the organic solvent and typically partition into the organic phase while the nucleic acid resides in the aqueous phase. Recently, the first ever extraction of DNA into the IL BMIM-$PF_6$ (1-butyl-3-methylimidazolium hexafluorophosphate) was demonstrated where 30% of the DNA could be back extracted into an aqueous buffered solution using a single stage extraction. It was also found that the IL used preferentially partitioned the nucleic acid over contaminating proteins and metal species. Using NMR and IR, the interactions between the cationic $BMIM^+$ and phosphate groups within the DNA acted to facilitate the extraction into the IL.

The presently described support-assisted strategy of extracting analytes from solutions, can be used for the partitioning of double-stranded DNA into PILs. For example, imidazolium-based PILs with the hexafluorophosphate and bis[(trifluoromethyl)sulfonyl]imide anions, can be used since most of these PILs are water immiscible. The cation structure can be varied using different lengths of alkyl chains on the 1 and 3 positions of the imidazolium ring (see FIG. 30A) while maintaining liquids at room temperature.

Following extraction of the nucleic acids, the IL can be introduced into an HPLC using a solvent desorption chamber.

The results obtained using the methods and ILs described herein are also useful in ion exchange mechanisms responsible for the extraction of nucleic acids and can extend the realm of ionic liquids and separation science into the mainstream of biology and biochemistry.

Example C—Determination of Volatility

Example C—Example 1

Versatility of Ionic Liquids in Separation Science: Determination of Low Volatility Aliphatic Hydrocarbons and Fatty Acid Methyl Esters Using Headspace Solid-Phase Microextraction Coupled to Gas Chromatography Static headspace-gas chromatography (HS-GC) is a common approach used for the analysis of analytes in the vapor phase that are in equilibrium with a solid or liquid phase. In the sampling of less volatile analytes, it is often necessary to thermostat the liquid or solid phase at elevated temperatures, thereby increasing the equilibrium amount of analyte present in the headspace. However, heating of the sample often causes partial vaporization of the solvent, resulting in increased pressure build-up within the sample vial. For that reason, it has been stated that the vapor pressure of the extracting solvent dramatically affects the enrichment factor achieved in HS-GC.

The inventors herein demonstrate the versatility of ILs in separation science by introducing a HS-SPME-GC extraction/separation method in which carefully designed ILs are used as (1) a sample solvent for hydrocarbons and fatty acid methyl esters (FAMEs) possessing high boiling points (higher than 380° C.) and low vapor pressures, (2) high selectivity SPME sorbent coating for the HS extraction of analytes, and (3) low-bleed, high selectivity stationary phase for GC. Each IL has been independently structurally engineered so that the imparted physical and chemical properties are compatible with the requirements of each component of the method thereby producing a robust method in terms of overall analytical performance. To the inventors' knowledge, this is the first report in which these analytes have been successfully quantified by HS-GC.

Materials

The six analytes determined in this work were purchased from Sigma-Aldrich (Milwaukee, Wis., USA). Their molecular structures, boiling points, and vapor pressures are shown in EXAMPLE C—Table 1.

PTFE stir bars (6 mm long) and silicone oil were obtained from Fisher Scientific (Fair Lawn, N.J., USA). Untreated fused silica capillary tubing (0.25 mm I.D.) and glass vials (2 mL) with PTFE septa caps were purchased from Supelco (Bellefonte, Pa., USA). A model 324 direct immersion heater was purchased from Cole Parmer (Vernon Hills, Ill., USA) and a model Arrow 6000 overhead stirrer was obtained from Arrow Engineering Co., Inc. (Hillside, N.J., USA). A Cimarec magnetic stirrer was acquired from Barnstead Thermolyne (Dubuque, Iowa, USA). The IL 1-hexyl-3-methylimidazolium tris(pentafluoroethyl)trifluorophosphate [HMIM] [FAP] was provided by Merck KGaA (Darmstadt, Germany). The molecular structure of this IL is shown in FIG. 52.

Methods

The coating of the GC column with the high stability IL was performed using the static method on a fifteen-meter capillary column (0.25 mm I.D.). The coating method utilized a 0.25% (w/v) solution of the dicationic IL 1,12-Di-(3-butylimidazolium)dodecane bis[(trifluoromethyl)sulfonyl]imide $[C_{12}(BIM)_2]$ $[NTf_2]$ (shown in FIG. 52) in methylene chloride at 40° C. The synthesis of this dicationic IL was carried out. Coated capillaries were conditioned overnight from 40° C. to 100° C. at 1° C.·min$^{-1}$ using a constant flow of helium at a flow rate of 1.0 mL·min$^{-1}$ Column efficiency was tested with naphthalene at 120° C. The column possessed an efficiency of 1554 plates·m$^{-1}$ at 120° C., and was tested weekly to ensure that the efficiency remained constant.

TABLE 1

EXAMPLE C Structures, boiling points, and vapor pressures of the hydrocarbons and fatty acid methyl esters evaluated in this study.

| Analyte | Structure and Molecular Formula | Boiling Point (at 760 torr)[a] | Vapor Pressure (at 25° C.)[a] |
|---|---|---|---|
| Tricosane | <br>($C_{23}H_{48}$) | 380° C. | $1.24 \times 10^{-5}$ torr |
| Hexacosane | <br>($C_{26}H_{54}$) | 412° C. | $1.26 \times 10^{-6}$ torr |
| Triacontane | <br>($C_{30}H_{62}$) | 450° C. | $7.37 \times 10^{-8}$ torr |
| Methyl heneicosanoate | 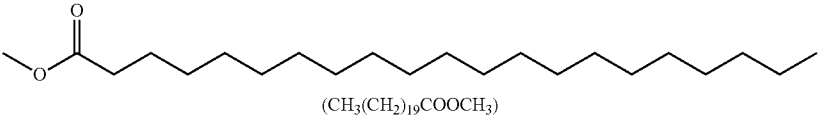 [SMILES: "(CH3(CH2)19COOCH3)" ; CCCCCCCCCCCCCCCCCCCCC(=O)OC]<br>($CH_3(CH_2)_{19}COOCH_3$) | 387° C. | $3.47 \times 10^{-6}$ torr |
| Methyl behenate | 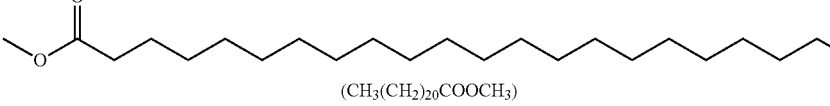<br>($CH_3(CH_2)_{20}COOCH_3$) | 398° C. | $1.52 \times 10^{-6}$ torr |
| Methyl tetracosanoate | 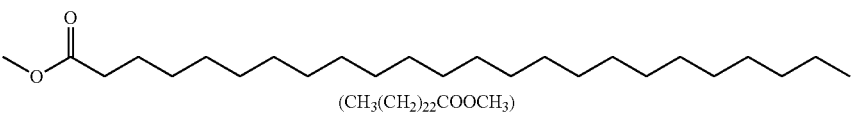 [SMILES: "(CH3(CH2)22COOCH3)" ; CCCCCCCCCCCCCCCCCCCCCCCC(=O)OC]<br>($CH_3(CH_2)_{22}COOCH_3$) | 420° C. | $3.03 \times 10^{-7}$ torr |

[a]Calculated using Advanced Chemistry Development (ACD/Labs) Software V9.04 for Solaris.

All GC experiments were conducted using an Agilent Technologies 6890N gas chromatograph (Palo Alto, Calif., USA). The gas chromatograph was equipped with thermal conductivity (TCD) and flame ionization (FID) detectors coupled in series. Helium was used as the carrier gas with a flow rate of 1 mL·min$^{-1}$. The inlet and detector temperatures were operated at 250° C. Splitless injection was used during all experiments. The make-up flow of helium was maintained at 45 mL·min$^{-1}$, the hydrogen flow at 40 mL·min$^{-1}$, and the air flow at 450 mL·min$^{-1}$ The following temperature program was used in the separation of the analytes: the initial temperature of 150° C. was held for 4 minutes, then raised to 160° C. at a ramp of 10° C.·min' and held for 2 minutes, and then raised to 170° C. at a speed of 10° C.·min$^{-1}$ and held for 5 minutes. Afterwards, a 10° C.·min$^{-1}$ ramp was used to increase the oven temperature to 180° C. and was held for another 5 minutes. Finally, the temperature of the oven was raised to 195° C. using a ramp of 15° C.·min$^{-1}$ and was held for 15 minutes. Agilent ChemStation software was used for data acquisition.

The preparation of the PIL-based SPME coating involved the synthesis of the poly[ViHDIM] [NTf$_2$] PIL (see structure in FIG. 52) followed by the preparation of fibers. The film thickness of the coating was in the range of 10-15 μm, as estimated by optical microscopy. The desorption time for the fiber in the GC injector was fixed at 5 minutes in all experiments.

A stock solution was prepared by dissolving 2 mg of each of the analytes into 40 g of the [HMIM] [FAP] IL, which was dried in a vacuum oven at 70° C. overnight before use. The stock solution was maintained at approximately 60° C. in order to ensure a homogenous mixture. The working solution was prepared by diluting different amounts of the stock solution with pure [HMIM] [FAP] to various concentrations. The total mass of the working solution was maintained at 400 mg in the sample vial and the volume of the headspace was 1.5 mL for all extractions. The sorption-time profiles were obtained by immersion of the PIL coated fiber into the headspace of the working standard solution containing the studied analytes at a concentration of 25 mg of analyte per kg of [HMIM] [FAP], using different extraction times (from 15 to 150 min) while stirring at 170±10° C.

FIG. 53 shows a detailed schematic of the extraction and separation system utilized. Static headspace extractions were performed by first piercing the sampling vial containing the IL/analyte mixture and stir bar with the syringe housing the SPME fiber. The sampling vial was then positioned in the heated silicone oil bath followed by stirring of the IL/analyte mixture using a magnetic stirrer. The SPME fiber was then exposed to the headspace of the sampling mixture. In order to minimize large temperature variations throughout the extraction, an overhead mechanical stirrer was used to stir the oil bath. Following the extraction, the SPME fiber was withdrawn into the syringe, the syringe removed from the vial, and the fiber thermally desorbed in the GC injector thereby subjecting the analytes to the IL-based stationary phase for separation.

Results and Discussion

Component 1: [HMIM] [FAP] IL as Thermally Stable Solvent for High Temperature Extraction To function as an effective solvent in headspace extraction studies, an IL should possess the following features: (1) be chemically unreactive with analytes being examined, (2) exhibit high thermal stability, (3) ability to dissolve the analytes in the concentration range needed for making adequate calibration curves, and (4) exhibit reasonably low viscosity to facilitate the preparation of samples and standards as well as to ensure efficient sample agitation during extraction. Merck KGaA has recently developed a class of hydrophobic ILs that exhibit much lower water uptake than commonly studied NTf$_2^-$ and hexafluorophosphate-based ILs. ILs containing this unique anion exhibit viscosities comparable to the NTf$_2^-$ anions. Thermal gravimetric analysis of this class of ILs has revealed that imidazolium-based ILs decompose at temperatures above 280° C. The solubility of the analytes in the [HMIM] [FAP] IL was found to be acceptable in the range up to 50 mg of analyte per kg of IL.

Component 2: Poly[ViHDIM] [NTf$_2$] PIL as SPME Sorbent Coating for Selective Headspace Extraction of Analytes The polymeric nature of PIL compounds provides them additional thermal stability as well as exceptional film stability, thereby producing high extraction-to-extraction reproducibility and lifetimes comparable to commercially coated fibers. The selectivity of PIL-based coatings can be modulated by introducing functional groups to the cationic portion of the IL or by incorporating different anions to impart desired solvent characteristics.

The poly[ViHDIM] [NTf$_2$] PIL was chosen in the Example as it undergoes stronger dispersion-type interactions with the analytes thus producing high extraction efficiencies.

Component 3: [C$_{12}$(BIM)$_2$] [NTf$_2$] IL as Highly Selective and Low-Bleed GC Stationary Phase ILs have been shown to be highly selective stationary phases for GC. To fulfill the requirements of this component for this study, a relatively nonpolar stationary phase possessing low bleed at elevated temperatures was required. The dicationic IL [C$_{12}$(BIM)$_2$][NTf$_2$] was chosen as it has been shown previously to exhibit high thermal stability, a wide liquid range, and broader selectivities compared to many traditional classes of monocationic ILs.

Synergy of Three IL-Based Components in Extraction/Separation System

The analytes extracted in this work include three hydrocarbons: tricosane, hexacosane, and triacontane; and three fatty acid methyl esters: methyl behenate, methyl heneicosanoate, and methyl tetracosanoate. These analytes were dissolved in the [HMIM] [FAP] IL and then extracted by HS-SPME-GC. In order to achieve adequate extraction efficiencies using the HS-SPME method, high temperature is required for these less volatile analytes. However, the sorption of the analytes to the SPME coating is an exothermic process, and as the temperature increases, the analyte to coating partition coefficient decreases. Therefore, the temperature must be optimized so that the decrease of the partition coefficient is offset by the increase in the equilibrium concentration of the analytes in the headspace to achieve reasonable extraction efficiencies. The optimized extraction temperature was 170±10° C. The extraction time and temperature in several previously reported studies involving headspace applications for less volatile analytes (with by ranging from 152 to 228° C.) are: 10 minutes at 110° C., 15 minutes at 100° C., and 15 minutes at 150 or 180° C., depending on the analyte.

Figure 54:
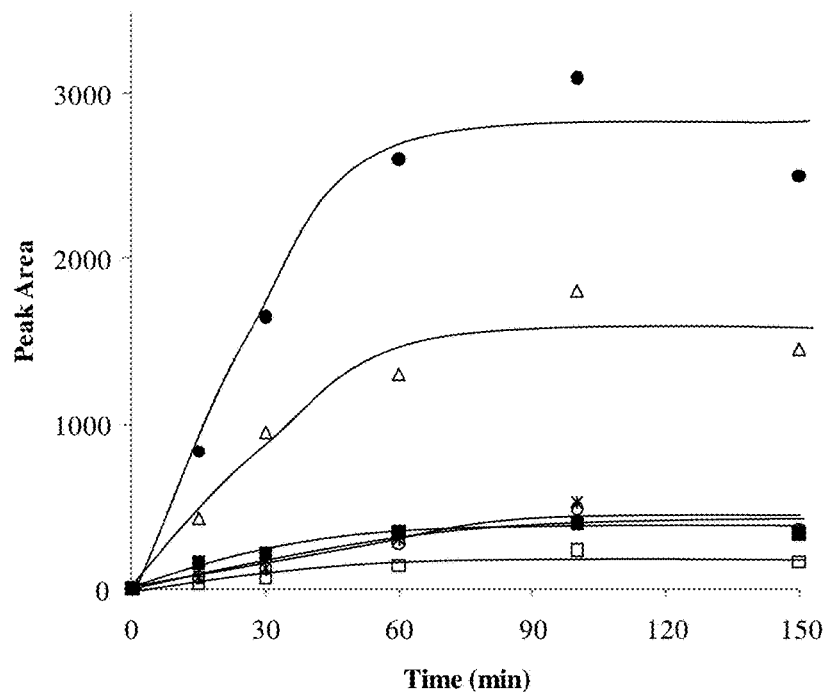
FIG. 54: Sorption-time profiles obtained for the PIL fiber poly[ViHDIM][NTf$_2$] when performing headspace extraction at 170±10° C. using a concentration of 25 mg of analyte per kg of [HMIM] [FAP] IL. The studied analytes are: (●) tricosane, (∆) hexacosane, (*) methyl heneicosanoate, (○) methyl behenate, (■) triacontane, and (☐) methyl tetracosanoate.

Sorption-time profiles were generated by performing the extraction at various time intervals to identify the equilibration time using the optimum temperature. FIG. 54 shows the sorption-time profiles obtained by plotting the analyte peak area versus the extraction time. Tricosane and hexacosane reach equilibrium at around 60 minutes whereas the remaining analytes reach equilibrium in around 100 min. An extraction time of 100 min was considered as the optimum extraction time. The comparison of the extraction efficiencies for the hydrocarbons and FAMEs can also be observed in FIG. 54. With respect to the hydrocarbons, the lightest hydrocarbon (tricosane) exhibits the highest extraction efficiency whereas the lowest extraction efficiency is seen with the heaviest hydrocarbon, triacontane. The same trend is observed with the three FAMEs, although their extraction efficiencies are much lower compared to the studied hydrocarbons. The trend in the extraction efficiency is consistent with the vapor pressures and boiling points of these analytes (see EXAMPLE C Table 1).

Example C—Example 2

Analytical Performance of the Method

Calibration curves were obtained using working standard solutions of analytes in the [HMIM] [FAP] IL at different concentrations while performing the extraction at the optimum extraction time and temperature. The figures of merit for the entire method, shown in EXAMPLE C Table 2, include the sensitivity, calibration range, correlation coefficients, error of the estimate, and limits of detection.

EXAMPLE C TABLE 2

FIGURES of merit of the calibration curves for the overall method using a three component extraction and separation system comprised of ionic liquids.

| Analyte | Calibration range (mg · kg$^{-1}$) | Slope ± SD$^a$ | Error of the estimate | R | LOD$^b$ (mg · kg$^{-1}$) |
|---|---|---|---|---|---|
| Tricosane | 1-45 | 137.7 ± 3.4 | 164 | 0.998 | 0.1 |
| Hexacosane | 1-35 | 123.4 ± 4.6 | 151 | 0.996 | 0.2 |
| Triacontane | 1-30 | 36.8 ± 2.2 | 36.3 | 0.993 | 0.3 |
| Methyl behenate | 2-30 | 25.9 ± 0.5 | 28.3 | 0.998 | 0.4 |
| Methyl heneicosanoate | 1-45 | 13.4 ± 0.7 | 14.7 | 0.994 | 0.4 |
| Methyl tetracosanoate | 2-45 | 12.6 ± 0.7 | 29.6 | 0.990 | 0.6 |

$^a$SD: error of the slope for n = 8 calibration levels.
$^b$LOD: limits of detections calculated as three times the signal to noise ratio.

The obtained linearity of the overall method was found to be acceptable, with correlation coefficients (R) ranging from 0.990 to 0.998. The sensitivity, which can be evaluated by the slope, is higher for the hydrocarbons, particularly for tricosane, than for the FAMEs. It can be clearly observed that the sensitivity decreased with increasing carbon chain length of the hydrocarbons and FAMEs. The limits of detection varied from 0.1 mg·kg$^{-1}$ for tricosane to 0.6 mg·kg$^{-1}$ for methyl tetracosanoate. This constitutes the first report of a headspace extraction approach for these particular analytes. However, other analytes possessing high boiling points have been determined previously by headspace extraction. They include N,N-dimethylformamide (DMF), N-methyl-2-pyrrolidine (NPM), propylene glycol (PG), formamide, tri-n-butylamine (tBA), and 2-ethylhexanoic acid (2EHA). The boiling points for these analytes are in the range 152-228° C. and the reported detection limits for these analytes are 53 mg·L$^{-1}$ or 1-90 mg·L$^{-1}$ depending on the IL solvent for DMF; 2.5 mg·L$^{-1}$ or 1-100 mg·L$^{-1}$ depending on IL solvent for NMP; 13 mg·L$^{-1}$ for formamide; 8 mg·L$^{-1}$ for tBA; and 22 mg·L$^{-1}$ for 2EHA. For comparison, the analytes determined in this method possess boiling points in the range 380-450° C. with detection limits less than 0.6 mg·kg$^{-1}$.

The reproducibility of the method was evaluated by carrying out a series of extractions using working standard solutions of the analytes at two different concentration levels, namely, 4 and 20 mg of analyte per kg of [HMIM] [FAP] IL. The obtained results can be observed in EXAMPLE C—Table 3.

EXAMPLE C TABLE 3

Precision and extraction efficiency at different spiking levels for the overall method.

| Analyte | Spiking level: 4 mg · kg$^{-1}$ | | Spiking level: 20 mg · kg$^{-1}$ | |
|---|---|---|---|---|
| | RSD$^a$ (%) | RR$^b$ (%) | RSD$^a$ (%) | RR$^b$ (%) |
| Tricosane | 15 | 99.1 | 10 | 75.9 |
| Hexacosane | 18 | 78.5 | 5.9 | 69.9 |
| Triacontane | 21 | 114 | 16 | 103 |
| Methyl behenate | 22 | 121 | 15 | 98.3 |
| Methyl heneicosanoate | 21 | 115 | 16 | 78.3 |
| Methyl tetracosanoate | 11 | 122 | 6.9 | 106 |

$^a$RSD: relative standard deviation for n = 4.
$^b$RR: relative recovery for n = 4.

The relative standard deviation ranged from 11 to 22% for the lower spiking level (4 mg·kg$^{-1}$), and from 5.9 to 16% for the higher spiking level (20 mg·kg$^{-1}$). This precision reflects all of the errors in the overall method, including the temperature fluctuations that occur during SPME. The extraction efficiency, expressed as relative recoveries, varied from 78.5 to 122% at the lower spiking level and from 69.9 to 106% at the higher spiking level. Under the extreme extraction temperatures and times used in this study, the fiber lifetime dropped to approximately 30 extractions before the extraction-to-extraction reproducibility decreased dramatically. Finally, the performance of the GC column comprised of the [C$_{12}$(BIM)$_2$] [NTf$_2$] IL stationary phase was evaluated. A sample chromatogram of the six analytes separated on this stationary phase is shown as supporting information. The reproducibility of the analyte retention times during the study produced RSD values ranging from 0.9 to 2.6% (n=60).

CONCLUSIONS

One of the most interesting and useful characteristics of ILs lies with their vast structural tunability which provides a wealth of opportunities in adapting the physical and chemical properties of the material for applications in separation science. Herein, an analytical method utilizing three distinct and separate IL components was used to perform high temperature headspace extraction and separation of six analytes possessing high boiling points and low vapor pressures. The [HMIM] [FAP] IL has been shown to be an excellent solvent in that the hydrophobic and refractory nature of the IL promotes dissolution of the apolar analytes while avoiding pressure build-up within the sample vial under extreme temperatures. As a selective sorbent coating for SPME, the PIL component exhibits acceptable extraction efficiency of the studied analytes under the extreme experimental conditions. Finally, the structural design of the IL-based GC stationary phase produces a thermally stabile material that exhibits high separation selectivity of the analytes while producing minimal column bleed. The overall method nicely demonstrates the versatility of ILs within separation science for the determination of low volatility analytes using headspace extraction mode with detection limits ranging from 0.3 to 0.6 mg·kg$^{-1}$, relative recoveries ranging from 69.9% to 106%, and precision values between 5.9 and 22% as relative standard deviation. This method may be particularly useful for monitoring reaction products formed during catalysis experiments when ILs are used as the reaction solvent. Future work will involve the use of blended ILs and task-specific ILs to further improve the sensitivity and reproducibility of the overall method.

While the specification concludes with the claims particularly pointing out and distinctly claiming the invention, it is believed that the present invention will be better understood from the following description. All percentages and ratios used herein are by weight of the total composition and normal pressure unless otherwise designated. All temperatures are in Degrees Celsius unless specified otherwise. The present invention can comprise (open ended) or consist essentially of the components of the present invention as well as other ingredients or elements described herein. As used herein, "comprising" means the elements recited, or their equivalent in structure or function, plus any other element or elements which are not recited. The terms "having" and "including" are also to be construed as open ended unless the context suggests otherwise. As used herein, "consisting essentially of" means that the invention may include ingredients in addition to those recited in the claim, but only if the additional ingredients do not materially alter the basic and novel characteristics of the claimed invention. Preferably, such additives will not be present at all or only in trace amounts. However, it may be possible to include up to about 10% by weight of materials that could materially alter the basic and novel characteristics of the invention as long as the utility of the compounds (as opposed to the degree of utility) is maintained. All ranges recited herein include the endpoints, including those that recite a range "between" two values. Terms such as "about," "generally," "substantially," and the like are to be construed as modifying a term or value such that it is not an absolute, but does not read on the prior art. Such terms will be defined by the circumstances and the terms that they modify as those terms are understood by those of skill in the art. This includes, at very least, the degree of expected experimental error, technique error and instrument error for a given technique used to measure a value Certain embodiments of the present invention are defined in the Examples herein, in which all parts and percentages are by weight and degrees are Celsius, unless otherwise stated. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various usages and conditions. All publications, including patents and non-patent literature, referred to in this specification are expressly incorporated by reference herein.

While the invention has been described with reference to various and preferred embodiments, it should be understood by those skilled in the art that various changes may be made and equivalents may be substituted for elements thereof without departing from the essential scope of the invention. In addition, many modifications may be made to adapt a particular situation or material to the teachings of the invention without departing from the essential scope thereof.

Therefore, it is intended that the invention not be limited to the particular embodiment disclosed herein contemplated for carrying out this invention, but that the invention will include all embodiments falling within the scope of the claims.

The publication and other material used herein to illuminate the invention or provide additional details respecting the practice of the invention, are incorporated be reference herein, and for convenience are provided in the following bibliography.

Citation of the any of the documents recited herein is not intended as an admission that any of the foregoing is pertinent prior art. All statements as to the date or representation as to the contents of these documents is based on the information available to the applicant and does not constitute any admission as to the correctness of the dates or contents of these documents.

What is claimed is:

1. A polymeric ionic liquid (PIL) comprising: i) a cationic component comprising an ionic liquid (IL) that is polymerized, and ii) one or more anionic components, wherein the anionic components can be the same or different;
   wherein the anionic component comprises a taurate component.

2. The PIL of claim 1, wherein the cationic component comprises least one or more: quaternary ammonium, protonated tertiary amine, thionium, phosphonium, arsonium, carboxylate, sulfate or sulfonate groups which may be substituted or unsubstituted, saturated or unsaturated, linear, branched, cyclic, or aromatic.

3. The PIL of claim 1, wherein the cationic component comprises: a quaternary ammonium, a protonated tertiary amine, imidazolium (IM) or substituted IM, pyrrolidinium or substituted pyrrolidinium, or pyridinium or substituted pyridinium.

4. The PIL of claim 1, wherein the cationic component comprises one or more of: monocationic components, dicationic components, tricationic components, other multicationic components, and mixtures thereof.

5. The PIL of claim 1, wherein the cationic component comprises an IL monomer modified through one or more of: incorporation of alkyl chains having different lengths, aromatic components, and/or hydroxyl-functionality.

6. The PIL of claim 1, wherein the cationic component is described by the general formula of $(XRR'R''H)^+$, where X is N, P, or As; and wherein each of R, R', R" is selected from the group consisting of one or more of: a proton, an aliphatic group, a cyclic group, and an aromatic group.

7. The PIL of claim 1, wherein the cationic component comprises one or more of: $VHIM^+$, $VDDIM^+$, $VHDIM^+$, or $BBIM^+$.

8. A device comprising an absorbent or absorbent coating comprising at least one PIL of claim 1, coated onto a support.

9. The device of claim 8, wherein the support comprises one or more of: a solid fused silica support, a stir bar, a fiber, a film, a membrane, a fibrous mat, or a woven or non-woven material.

10. The device of claim 8, wherein the PIL is at least partially crosslinked.

11. A solid phase microextraction material (SPME) comprising an absorbent material comprising the PIL of claim 1.

12. The solid phase microextraction material of claim 11, wherein the support comprises one or more fibers at least partially coated with the PIL material.

13. A solid phase microextraction (SPME) material comprising an absorbent material comprising a polymeric ionic liquid (PIL) material comprising a PIL, wherein the PIL comprises (i) a cationic component comprising an ionic liquid (IL) that is polymerized, and (ii) one or more anionic components, wherein the anionic components can be the same or different;

wherein the PIL material includes one or more extraction additives or phase modifiers that aid in selectively increasing the extraction efficiency or promoting wetting of glass or metal substrates, wherein the extraction additives or phase modifiers comprise one or more of: micelles, monomer surfactants, cyclodextrins, nanoparticles, or synthetic macrocycles.

\* \* \* \* \*